(12) United States Patent
Kaino

(10) Patent No.: US 11,009,603 B2
(45) Date of Patent: May 18, 2021

(54) RADAR DEVICE AND RADAR DEVICE CONTROL METHOD

(71) Applicant: DENSO TEN Limited, Kobe (JP)

(72) Inventor: Shozo Kaino, Kobe (JP)

(73) Assignee: DENSO TEN Limited, Kobe (JP)

( * ) Notice: Subject to any disclaimer, the term of this patent is extended or adjusted under 35 U.S.C. 154(b) by 225 days.

(21) Appl. No.: 16/275,643

(22) Filed: Feb. 14, 2019

(65) Prior Publication Data
US 2019/0285743 A1 Sep. 19, 2019

(30) Foreign Application Priority Data
Mar. 16, 2018 (JP) .............................. JP2018-049367

(51) Int. Cl.
*G01S 13/931* (2020.01)

(52) U.S. Cl.
CPC ..... *G01S 13/931* (2013.01); *G01S 2013/9322* (2020.01); *G01S 2013/93271* (2020.01)

(58) Field of Classification Search
CPC ................................ G01S 13/931; B60Q 1/00
See application file for complete search history.

(56) References Cited

U.S. PATENT DOCUMENTS

| 4,308,536 | A | * | 12/1981 | Sims, Jr. | .................. | G01S 7/023 342/70 |
| 5,351,032 | A | * | 9/1994 | Latorre | ..................... | G01S 1/68 340/12.32 |
| 5,389,912 | A | * | 2/1995 | Arvin | ........................ | B60Q 1/52 116/67 R |
| 7,409,295 | B2 | * | 8/2008 | Paradie | ..................... | G06T 7/70 701/301 |
| 8,207,836 | B2 | * | 6/2012 | Nugent | .................. | G08G 1/165 340/435 |
| 8,558,733 | B2 | * | 10/2013 | Kamo | ..................... | G01S 7/412 342/70 |
| 9,606,225 | B2 | * | 3/2017 | Okita | ........................ | G01S 13/04 |
| 9,784,820 | B2 | * | 10/2017 | Arage | ..................... | G01S 7/414 |
| 10,031,224 | B2 | * | 7/2018 | Aoki | ..................... | G01S 13/931 |
| 10,048,355 | B2 | * | 8/2018 | Lim | ........................ | G01S 13/34 |
| 2003/0001771 | A1 | * | 1/2003 | Ono | ........................ | G01S 7/411 342/70 |
| 2004/0183661 | A1 | * | 9/2004 | Bowman | ................ | G08G 1/165 340/435 |

(Continued)

FOREIGN PATENT DOCUMENTS

JP 2016-006383 A 1/2016

*Primary Examiner* — Peter M Bythrow
(74) *Attorney, Agent, or Firm* — Oliff PLC

(57) ABSTRACT

A radar device includes: a deriving unit configured to derive detection distances of a target existing in an area near a vehicle equipped with the radar device, based on reception signals acquired by transmitting a radar transmission wave to the area near the vehicle and receiving a reflected wave from the target; an acquiring unit configured to acquire a distance at which a maximum value of reception powers was detected, and a distance at which a minimum value of the reception powers was detected, among the detection distances sequentially derived by the deriving unit; and a determining unit configured to determine whether the target is an upper object which will not collide with the vehicle, based on the distances acquired by the acquiring unit.

8 Claims, 27 Drawing Sheets

(56) References Cited

U.S. PATENT DOCUMENTS

| | | | | |
|---|---|---|---|---|
| 2008/0077327 A1* | 3/2008 | Harris | G01S 13/931 | 701/301 |
| 2009/0002222 A1* | 1/2009 | Colburn | G01C 9/00 | 342/145 |
| 2011/0181407 A1* | 7/2011 | Kole | G01S 17/46 | 340/435 |
| 2011/0221628 A1* | 9/2011 | Kamo | G01S 7/295 | 342/70 |
| 2013/0002470 A1* | 1/2013 | Kambe | G01S 13/867 | 342/55 |
| 2013/0207833 A1* | 8/2013 | Mizutani | B60W 30/14 | 342/70 |
| 2013/0207834 A1* | 8/2013 | Mizutani | G01S 7/411 | 342/70 |
| 2013/0257642 A1* | 10/2013 | Kawabe | G01S 13/584 | 342/70 |
| 2013/0321195 A1* | 12/2013 | Moriuchi | G01S 13/931 | 342/70 |
| 2014/0062762 A1* | 3/2014 | Kurono | G01S 7/4026 | 342/146 |
| 2014/0118186 A1* | 5/2014 | Nakanishi | G01S 13/931 | 342/128 |
| 2014/0159948 A1* | 6/2014 | Ishimori | G01S 7/41 | 342/200 |
| 2014/0247180 A1* | 9/2014 | Moriuchi | G01S 13/42 | 342/70 |
| 2014/0292559 A1* | 10/2014 | Asanuma | G01S 13/931 | 342/133 |
| 2014/0313070 A1* | 10/2014 | Asanuma | G01S 13/02 | 342/200 |
| 2015/0309171 A1* | 10/2015 | Ishimori | B60W 30/09 | 342/27 |
| 2015/0309172 A1* | 10/2015 | Mori | G01S 13/345 | 342/70 |
| 2016/0091603 A1* | 3/2016 | Aoki | G01S 13/931 | 342/70 |
| 2017/0246990 A1* | 8/2017 | Rosenblum | G01S 13/931 | |
| 2017/0363720 A1* | 12/2017 | Moriuchi | G01S 13/536 | |
| 2017/0363735 A1* | 12/2017 | Aoki | G01S 13/08 | |
| 2017/0363738 A1* | 12/2017 | Kaino | G01S 13/32 | |
| 2018/0259634 A1* | 9/2018 | Okamoto | G01S 7/414 | |
| 2018/0348768 A1* | 12/2018 | Prasad | G08G 1/166 | |

* cited by examiner

| DISTANCE R [m] | NORMAL DETECTION | HISTORY NON-EXISTENCE | PEAK NON-EXISTENCE | ANGLE ESTIMATION FAILURE | DISCONTINUITY | OUT OF RANGE (IN BINS) BASED ON ESTIMATED FREQUENCY LOG LIKELIHOOD RATIO | IMPROPER MAHALANOBIS DISTANCE | PAIR NON-EXISTENCE |
|---|---|---|---|---|---|---|---|---|
| | LOG LIKELIHOOD RATIO | LOG LIKELIHOOD RATIO | LOG LIKELIHOOD RATIO | LOG LIKELIHOOD RATIO | LOG LIKELIHOOD RATIO | | LOG LIKELIHOOD RATIO | LOG LIKELIHOOD RATIO |
| STATIONARY VEHICLE ||||||||| 
| 40≤R≤45 | -0.03 | ⋮ | ⋮ | ⋮ | ⋮ | ⋮ | ⋮ | ⋮ |
| 45<R≤55 | ⋮ | ⋮ | ⋮ | ⋮ | ⋮ | ⋮ | ⋮ | ⋮ |
| 55<R≤65 | ⋮ | ⋮ | ⋮ | ⋮ | ⋮ | ⋮ | ⋮ | ⋮ |
| 65<R≤75 | ⋮ | ⋮ | ⋮ | ⋮ | ⋮ | ⋮ | ⋮ | ⋮ |
| 75<R≤85 | ⋮ | ⋮ | ⋮ | ⋮ | ⋮ | ⋮ | ⋮ | ⋮ |
| 85<R≤95 | ⋮ | ⋮ | ⋮ | ⋮ | ⋮ | ⋮ | ⋮ | ⋮ |
| 95<R≤105 | -0.04 | -2.48 | ⋮ | ⋮ | ⋮ | ⋮ | ⋮ | ⋮ |
| 105<R≤115 | ⋮ | ⋮ | ⋮ | ⋮ | ⋮ | ⋮ | ⋮ | ⋮ |
| 115<R≤125 | ⋮ | ⋮ | ⋮ | ⋮ | ⋮ | ⋮ | ⋮ | ⋮ |
| 125<R≤135 | ⋮ | ⋮ | ⋮ | ⋮ | ⋮ | ⋮ | ⋮ | ⋮ |

| DISTANCE R [m] | NORMAL DETECTION | HISTORY NON-EXISTENCE | PEAK NON-EXISTENCE | ANGLE ESTIMATION FAILURE | DISCONTINUITY | OUT OF RANGE (IN BINS) BASED ON ESTIMATED FREQUENCY LOG LIKELIHOOD RATIO | IMPROPER MAHALANOBIS DISTANCE | PAIR NON-EXISTENCE |
|---|---|---|---|---|---|---|---|---|
| | LOG LIKELIHOOD RATIO | LOG LIKELIHOOD RATIO | LOG LIKELIHOOD RATIO | LOG LIKELIHOOD RATIO | LOG LIKELIHOOD RATIO | | LOG LIKELIHOOD RATIO | LOG LIKELIHOOD RATIO |
| UPPER OBJECT |||||||||
| 40≤R≤45 | -0.23 | ⋮ | ⋮ | ⋮ | ⋮ | ⋮ | ⋮ | ⋮ |
| 45<R≤55 | ⋮ | ⋮ | ⋮ | ⋮ | ⋮ | ⋮ | ⋮ | ⋮ |
| 55<R≤65 | ⋮ | ⋮ | ⋮ | ⋮ | ⋮ | ⋮ | ⋮ | ⋮ |
| 65<R≤75 | ⋮ | ⋮ | ⋮ | ⋮ | ⋮ | ⋮ | ⋮ | ⋮ |
| 75<R≤85 | ⋮ | ⋮ | ⋮ | ⋮ | ⋮ | ⋮ | ⋮ | ⋮ |
| 85<R≤95 | ⋮ | ⋮ | ⋮ | ⋮ | ⋮ | ⋮ | ⋮ | ⋮ |
| 95<R≤105 | -0.16 | -1.13 | ⋮ | ⋮ | ⋮ | ⋮ | ⋮ | ⋮ |
| 105<R≤115 | ⋮ | ⋮ | ⋮ | ⋮ | ⋮ | ⋮ | ⋮ | ⋮ |
| 115<R≤125 | ⋮ | ⋮ | ⋮ | ⋮ | ⋮ | ⋮ | ⋮ | ⋮ |
| 125<R≤135 | ⋮ | ⋮ | ⋮ | ⋮ | ⋮ | ⋮ | ⋮ | ⋮ |

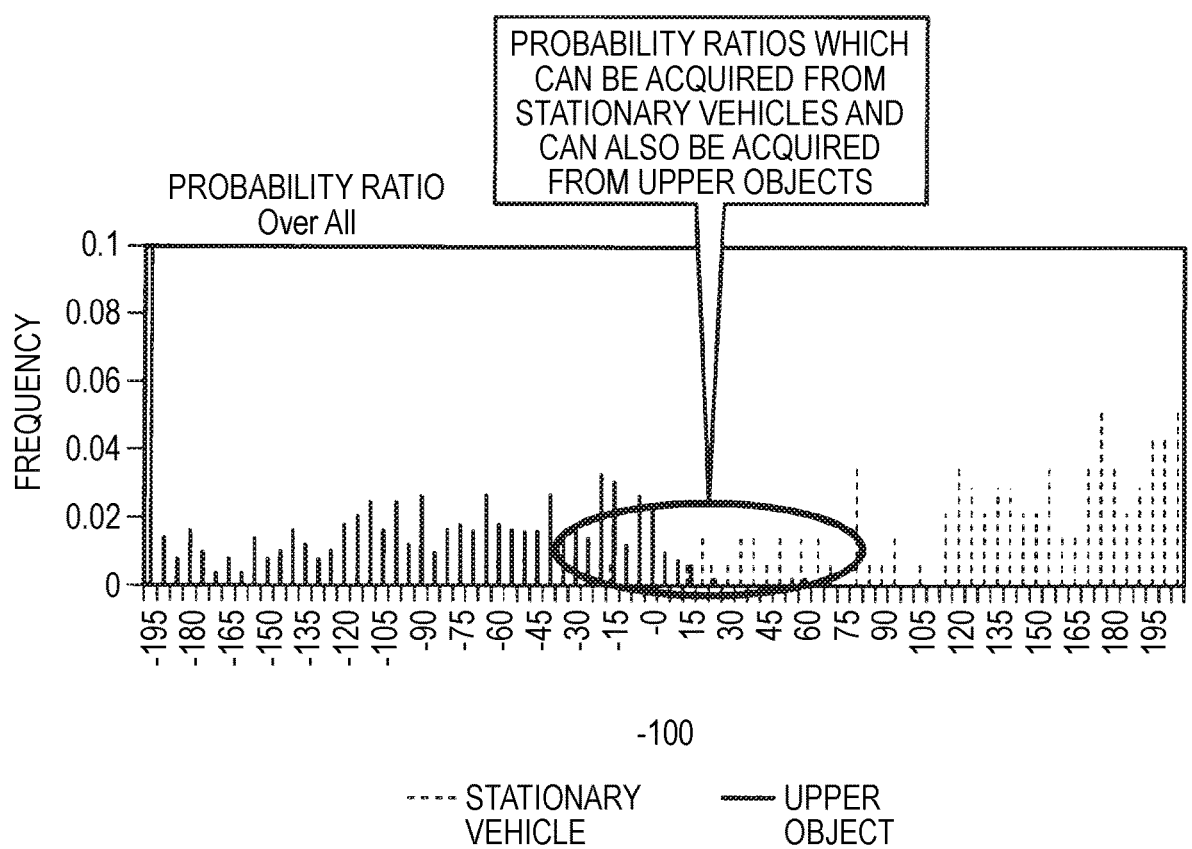

RADAR DEVICE AND RADAR DEVICE CONTROL METHOD

CROSS-REFERENCE TO RELATED APPLICATIONS

This application is based on and claims priority under 35 USC 119 from Japanese Patent Application No. 2018-049367 filed on Mar. 16, 2018.

BACKGROUND

Technical Field

The present disclosure relates to a radar device and a radar device control method.

Related Art

In the related art, a radar device installed on the front side of the vehicle body of a vehicle or the like outputs a transmission wave to a transmission range outside the vehicle, and receives the reflected waves from targets, and derives target data including the location information and so on of the targets, and discriminates stationary objects, such as stationary vehicles and so on, located in front of the vehicle, from the target data. Then, a vehicle control device installed in the vehicle acquires information on the stationary vehicles and so on from the radar device, and controls the behavior of the vehicle on the basis of the acquired information, such that the vehicle avoids collision with, for example, the stationary vehicles and so on, to provide safe and comfortable traveling to the user of the vehicle (see Patent Literature 1 for instance).

[Patent Literature 1] Japanese Patent Application Laid-Open No. 2016-006383

SUMMARY

However, the above-described technology according to the related art has a problem that the accuracy in discriminating between stationary objects and upper objects is not sufficient and upper objects are erroneously detected as still objects.

An object of an example of embodiments of the present invention is to provide a radar device and a radar device control method for discriminating between stationary objects and upper objects with high accuracy.

According to an aspect of the present disclosure, there is provided a radar device including: a deriving unit configured to derive detection distances of a target existing in an area near a vehicle equipped with the radar device, based on reception signals acquired by transmitting a radar transmission wave to the area near the vehicle and receiving a reflected wave from the target; an acquiring unit configured to acquire a distance at which a maximum value of reception powers was detected, and a distance at which a minimum value of the reception powers was detected, among the detection distances sequentially derived by the deriving unit; and a determining unit configured to determine whether the target is an upper object which will not collide with the vehicle, based on the distances acquired by the acquiring unit.

According to exemplary embodiments of the present disclosure, it may be possible to discriminate, for example, between stationary vehicles and upper objects with high accuracy.

BRIEF DESCRIPTION OF THE DRAWINGS

Exemplary embodiment(s) of the present invention will be described in detail based on the following figures, wherein:

FIG. 18 is a view illustrating an extrapolation-cause-based likelihood table according to the embodiment;

FIG. 19 is a view illustrating a probability ratio distribution overlap between stationary vehicles distribution and upper objects;

DETAILED DESCRIPTION

Hereinafter, a radar device and a radar device control method according to exemplary embodiments of the present invention will be described with reference to the accompanying drawings. However, the following embodiments are merely examples, and are not intended to limit the present invention. Also, the following embodiments mainly indicate configurations and processes according to the disclosed technology, and descriptions of other configurations and processes will not be made. Moreover, the embodiments and modifications may be appropriately combined within a consistent range. Also, in the individual embodiments, identical components and identical processes are denoted by the same reference symbols, and descriptions of already-explained components and processes are omitted.

(Outline of Target Detection Performed by Radar Device According to Embodiment)

In the present embodiment, a radar device discriminates stationary objects which are detection targets, such as stationary vehicles and upper objects, from a comparatively long distance. The following description will be made using stationary vehicles as examples of stationary objects; however, stationary objects are not limited to stationary vehicles. In other words, in the case of performing discrimination between stationary vehicles and upper objects on the basis of target data items related to a single parameter, if the distribution of target data items on stationary vehicles and the distribution of target data items on upper objects overlap each other, it is difficult to discriminate between the stationary vehicles and the upper objects on the basis of a threshold.

For this reason, in the present embodiment, a statistical model is constructed from an already-known correlation between the value which a stationary vehicle and an upper object may take as a certain parameter and the probability based on the occurrence frequency of that value, and whenever the radar device performs a scanning operation, with respect to each target, the likelihood of being a stationary vehicle and the likelihood of being an upper object are calculated on the basis of the statistical model. Further, whenever a scanning operation is performed, likelihood updating is performed using a Bayesian filter method in order to improve the reliability, and whether the target is a stationary vehicle or an upper object is performed on the basis of the ratio (logit) between the likelihood of being a stationary vehicle and the likelihood of being an upper object. Herein, since only one parameter is not sufficient to perform discrimination, in the present invention, a plurality of parameters for which statistical models have been defined respectively is used so as to complement their abilities one another.

Figure 1:
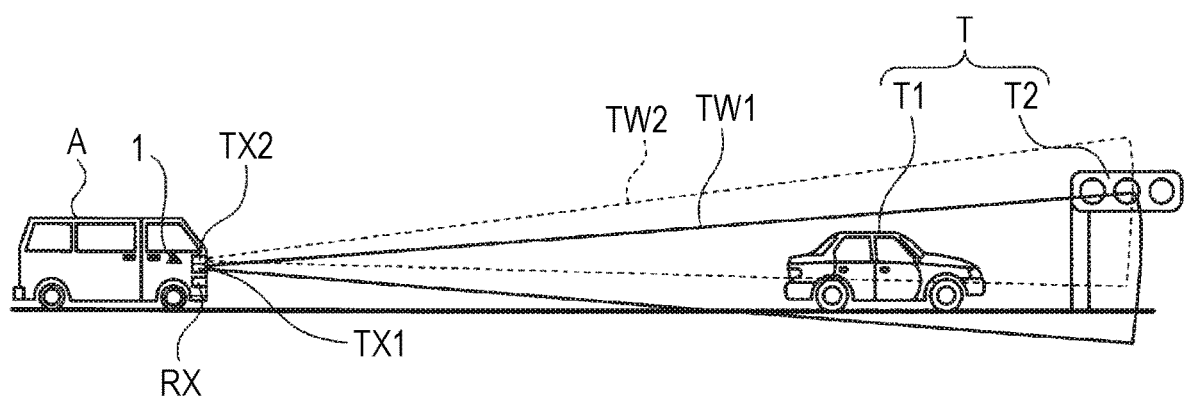
FIG. 1 is a schematic diagram illustrating an outline of target detection which is performed by a radar device according to an embodiment.

FIG. 1 is a schematic diagram illustrating an outline of target detection which is performed by a radar device according to the embodiment. A radar device 1 according to the embodiment is mounted on a front part of a vehicle A, for example, in the front grill, and detects targets T (targets T1 and T2) existing in the traveling direction of the vehicle A. Targets T include moving targets and stationary targets. The target T1 shown in FIG. 1 is, for example, a preceding vehicle moving along the traveling direction of the vehicle A, or a stationary object (including a stationary vehicle) standing still. Also, the target T2 shown in FIG. 1 is, for example, an upper object fixed above in the traveling direction of the vehicle A, such as a traffic light, an overpass, a road sign, an information sign, or the like, other than a vehicle.

The radar device 1 is a scan radar which transmits a downward transmission wave TW1 and an upward transmission wave TW2 alternately at intervals of, for example, 5 msec as shown in FIG. 1 in order to ensure performance even in the case where the radar is inclined with respect to the vertical axis of the vehicle A due to goods loaded or the suspension of the vehicle. The downward transmission wave TW1 is transmitted from a downward transmission unit TX1 of the radar device 1 downward in the traveling direction of the vehicle A. The upward transmission wave TW2 is transmitted from an upward transmission unit TX2 of the radar device 1 upward in the traveling direction of the vehicle A. The downward transmission unit TX1 and the upward transmission unit TX2 are, for example, antennae.

As shown in FIG. 1, since the scan ranges of the downward transmission wave TW1 and the upward transmission wave TW2 overlap partly in the vertical direction of the vehicle A, the radar device 1 detects targets T in a wider range in the vertical direction, as compared to the case of using either of the downward transmission wave TW1 or the upward transmission wave TW2. The radar device 1 receives the reflected waves of the downward transmission wave TW1 and the upward transmission wave TW2 from targets T, by receiving units RX, thereby detecting the targets T.

(Configuration of Radar Device According to Embodiment)

Figure 2:
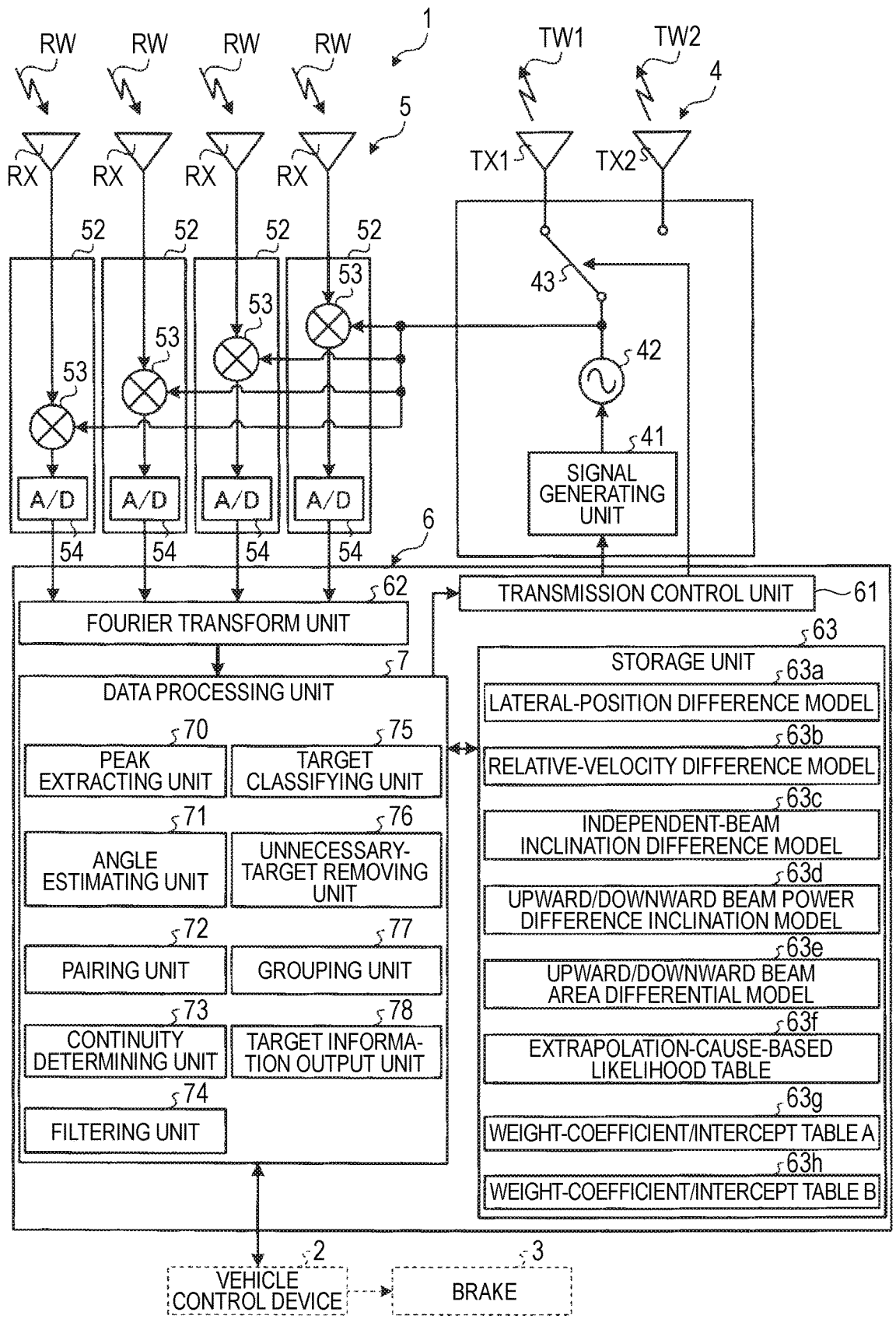
FIG. 2 is a view illustrating the configuration of the radar device according to the embodiment.

FIG. 2 is a view illustrating the configuration of the radar device according to the embodiment. The radar device 1 according to the embodiment uses, for example, a frequency-modulated continuous-wave (FM-CW), among various types of millimeter waves for radars, to detect targets T extending in the vicinity of the vehicle A.

As shown in FIG. 2, the radar device 1 is connected to a vehicle control device 2. The vehicle control device 2 is connected to a brake 3 and so on. For example, in the case where the traveling distance of the reflected wave of a transmission wave of the radar device 1 from the target T1 to the receiving antennae of the radar device 1 is a predetermined distance or less, so the vehicle A is in danger of rear-ending the target T1, the vehicle control device 2 controls the brake 3, the throttle, the gears, and so on, thereby controlling behavior of the vehicle A such that the vehicle A avoids rear-ending the target T1. As an example of a system for performing such vehicle control, there is an adaptive cruise control (ACC) system.

The traveling distance of the reflected wave of a transmission wave of the radar device 1 from the target T1 to the receiving antennae of the radar device 1 is referred to as the "longitudinal distance", and the distance of a target T in the left-right direction (vehicle width direction) of the vehicle A is referred to as the "lateral distance". The left-right direction of the vehicle A is also referred to as the lane width direction of the road on which the vehicle A travels. The "lateral distance" is the distance from the location of the center of the vehicle A, and when the target is on the right side of the vehicle A, the lateral distance is expressed by a positive value, and when the target is on the left side of the vehicle A, the lateral distance is expressed by a negative value. Hereinafter, the lateral distance will also be referred to as the lateral position.

Also, as shown in FIG. 2, the radar device 1 includes a transmitting unit 4, a receiving unit 5, and a signal processing unit 6.

The transmitting unit 4 includes a signal generating unit 41, an oscillator 42, a switch 43, the downward transmission unit TX1, and the upward transmission unit TX2. The signal generating unit 41 generates a modulation signal whose voltage varies in a triangular wave form, and supplies the modulation signal to the oscillator 42. The oscillator 42 generates a transmission signal whose frequency varies as time goes on, by performing frequency modulation on a continuous-wave signal on the basis of the modulation signal generated by the signal generating unit 41, and outputs the transmission signal to the downward transmission unit TX1 and the upward transmission unit TX2.

The switch 43 connects one of the downward transmission unit TX1 and the upward transmission unit TX2 with the oscillator 42. The switch 43 operates at predetermined timings (for example, at intervals of 5 msec) under the control of a transmission control unit 61 to be described below, so as to switch the connection between one of the downward transmission unit TX1 and the upward transmission unit TX2 and the oscillator 42. In other words, the switch 43 connects the downward transmission unit TX1 and the upward transmission unit TX2 alternately to the oscillator 42.

The downward transmission unit TX1 and the upward transmission unit TX2 output the downward transmission wave TW1 and the upward transmission wave TW2 from the vehicle A on the basis of the transmission signal. Hereinafter, the downward transmission unit TX1 and the upward transmission unit TX2 will also be referred to as the transmitting units TX. In FIG. 2, the case where each of the number of downward transmission units TX1 and the number of upward transmission units TX2 is one shown as an example; however, the number of downward transmission units and the number of upward transmission units may be appropriately changed in accordance with design. The transmitting units TX each are configured with a plurality of antennae, and output the downward transmission wave TW1 and the upward transmission wave TW2 to different directions via the plurality of antennae, respectively, so as to cover the scan ranges. Hereinafter, the downward transmission wave TW1 and the upward transmission wave TW2 will also be referred to collectively as the transmission waves TW.

The downward transmission unit TX1 and the upward transmission unit TX2 may be connected to the oscillator 42 via the switch 43. Therefore, from one transmitting unit TX of the transmitting units TX, one of the downward transmission wave TW1 and the upward transmission wave TW2 is output in accordance with the switching operation of the switch 43. Also, the transmission waves TW to be output are switched alternately in accordance with the switching operation of the switch 43.

The receiving unit 5 includes individual receiving units 52 which are connected to four receiving units RX, respectively. The receiving units RX are individual antennae forming an array antenna. In FIG. 2, the case where the number of receiving units RX is four is shown as an example; however, the number of receiving units RX may be appropriately changed in accordance with design. Each receiving unit RX receives the reflected waves RW from targets T. Each individual receiving unit 52 processes the reflected waves RW received via a corresponding receiving unit RX.

Each of the individual receiving unit 52 includes a mixer 53 and an analog-to-digital (A/D) converter 54. Reception signals which are obtained from reflected waves RW received by the receiving units RX are transmitted to the mixers 53. However, between the receiving units RX and the mixers 53, amplifiers may be arranged, respectively.

To the mixers 53, the transmission signal distributed from the oscillator 42 of the transmitting unit 4 is input, and in the mixers 53, the transmission signal and reception signals are mixed. As a result, beat signals representing beat frequencies which are the frequency differences between the frequency of the transmission signal and the frequencies of the reception signals are generated. The beat signals generated by the mixers 53 are converted into digital signals in the A/D converters 54, and then are output to the signal processing unit 6.

The signal processing unit 6 is a microcomputer including a central processing unit (CPU), a storage unit 63, and so on, and controls the whole of the radar device 1. The signal processing unit 6 stores a variety of data to be used in arithmetic operations, target information acquired by a data processing unit 7, and so on in the storage unit 63. Also, the storage unit 63 stores lateral-position difference models 63a, relative-velocity difference models 63b, independent-beam inclination difference models 63c, upward/downward beam power difference inclination models 63d, upward/downward beam area differential models 63e, an extrapolation-cause-based likelihood table 63f, a weight-coefficient/intercept table A 63g, and a weight-coefficient/intercept table B 63h, which are to be described below. As the storage unit 63, for example, an EPROM (Erasable Programmable Read-Only Memory), a flash memory, and the like may be used; however, the storage unit is not limited thereto.

The signal processing unit includes the transmission control unit 61, a Fourier transform unit 62, and the data processing unit 7 as functions which are implemented in a software wise in the microcomputer. The transmission control unit 61 controls the signal generating unit 41 of the transmitting unit 4, and controls switching of the switch 43. The data processing unit 7 includes a peak extracting unit 70, an angle estimating unit 71, a pairing unit 72, a continuity determining unit 73, a filtering unit 74, a target classifying unit 75, an unnecessary-target removing unit 76, a grouping unit 77, and a target information output unit 78.

The Fourier transform unit 62 performs fast Fourier transform (FFT) on the beat signal output from each of the plurality of individual receiving units 52. In this way, the Fourier transform unit 62 converts the beat signal related to the reception signal of each of the plurality of receiving units RX, into a frequency spectrum which is frequency-domain data. The frequency spectrum generated by the Fourier transform unit 62 is output to the data processing unit 7.

From the frequency spectrum generated by the Fourier transform unit 62, the peak extracting unit 70 extracts peaks exceeding a predetermined signal level, with respect to each of an up section in which the frequency of the transmission signal increases and a down section in which the frequency decreases.

Figure 3:
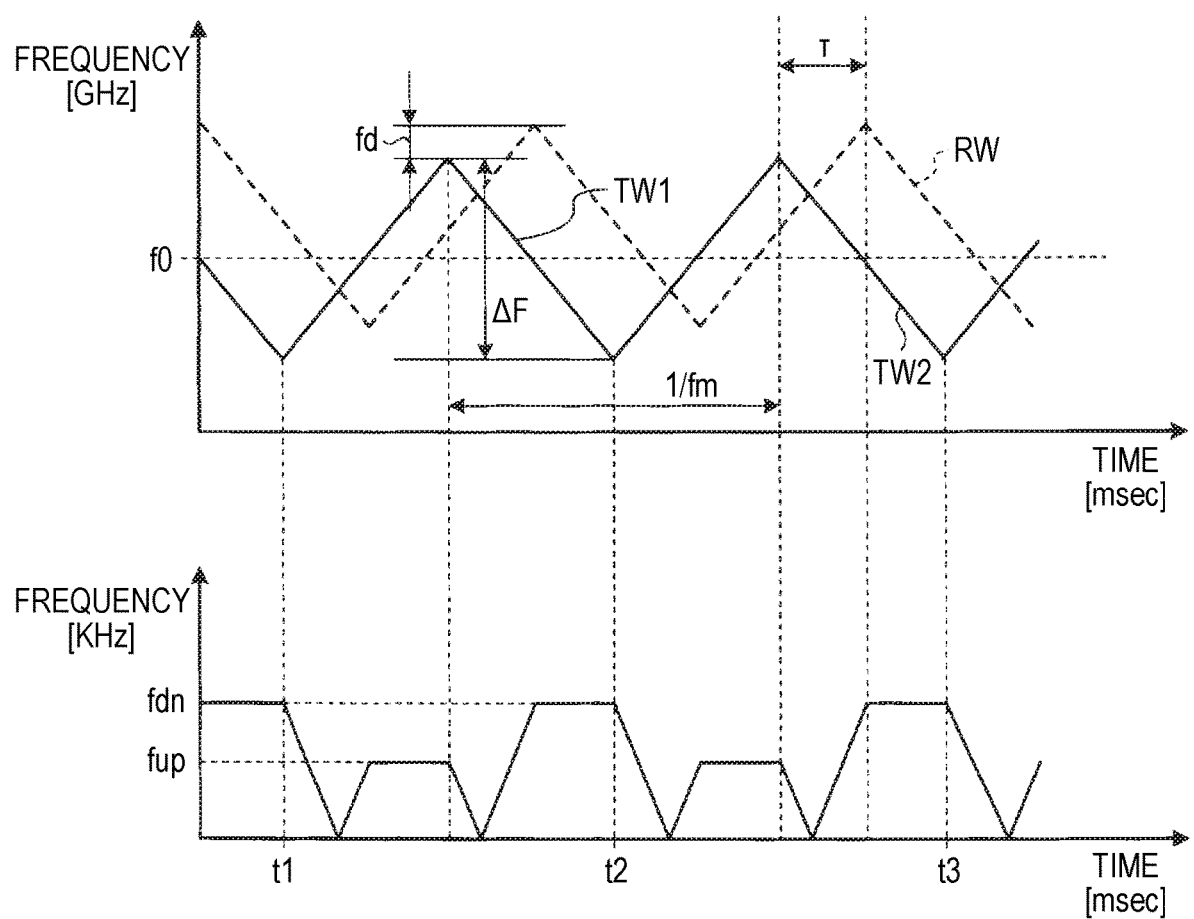
FIG. 3 is a view illustrating the relation between transmission waves and the reflected waves thereof, and the beat signals.
Figure 4A:
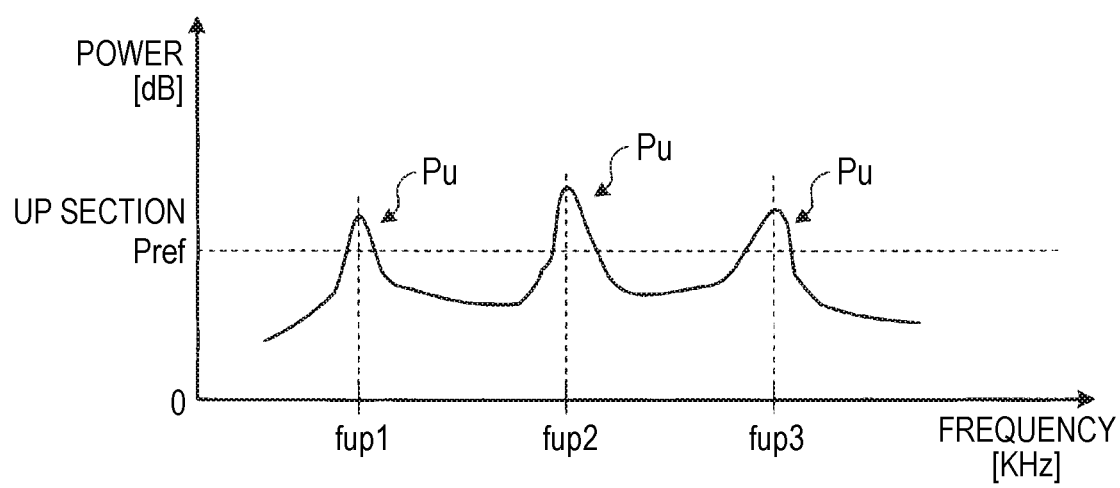
FIG. 4A is a view for explaining peak extraction with respect to an up section.
Figure 4B:
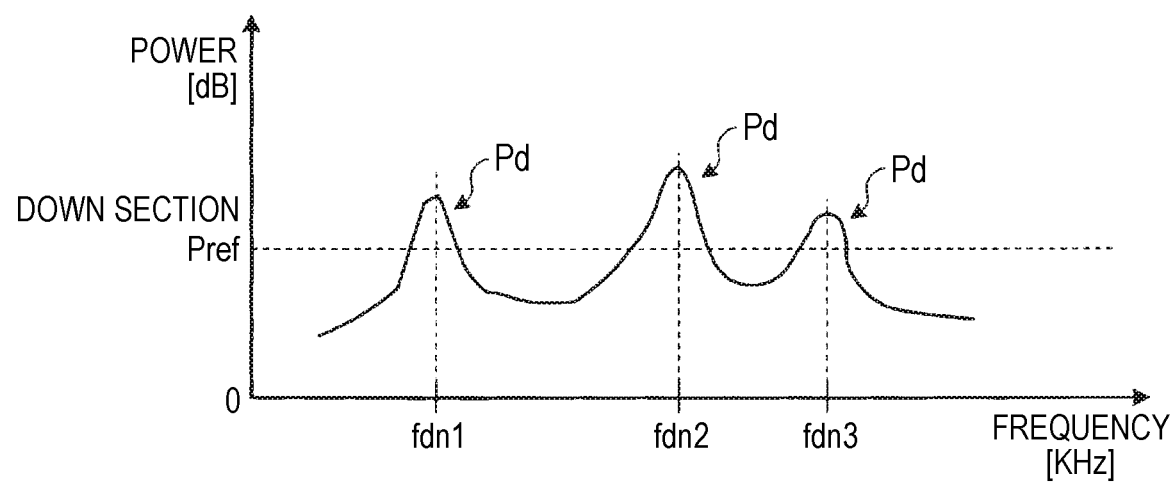
FIG. 4B is a view for explaining peak extraction with respect to a down section.

Now, the process of the peak extracting unit 70 will be described with reference to FIG. 3, FIG. 4A, and FIG. 4B. FIG. 3 is a view illustrating the relation between the transmission waves and the reflected waves, and the beat signals. FIG. 4A is a view for explaining peak extraction with respect to an up section. FIG. 4B is a view for explaining peak extraction with respect to a down section. For ease of explanation, the reflected wave RW shown in FIG. 3 is assumed to be an ideal reflected wave from one target T. Also, in FIG. 3, the transmission wave TW is shown by a solid line, and the reflected wave RW is shown by a broken line.

In the upper part of FIG. 3, the vertical axis indicates frequency in GHz, and the horizontal axis indicates time in msec. Also, in FIG. 3, the downward transmission wave TW1 is assumed to be output in a section between a timing t1 and a timing t2, the upward transmission wave TW2 is assumed to be output in a section between the timing t2 and a timing t3.

As shown in FIG. 3, each of the downward transmission wave TW1 and the upward transmission wave TW2 is a continuous wave whose frequency increases and decreases with a predetermined period having a predetermined frequency as the center, and this frequency varies linearly with respect to time. Herein, the center frequency of the variation width of the downward transmission wave TW1 and the upward transmission wave TW2 is denoted by ΔF, and the center frequency of the variation width is denoted by f0, and the inverse number of one period in which the frequency increases and decreases is denoted by fm.

Since the reflected waves R are the reflected waves of the downward transmission wave TW1 and the upward transmission wave TW2 from the target T, similarly to the downward transmission wave TW1 and the upward transmission wave TW2, each of the reflected waves is a continuous wave whose frequency increases and decreases with a predetermined period having a predetermined frequency as the center. However, the reflected waves RW have a delay with respect to the downward transmission wave TW1 and the like. A delay time τ depends on the longitudinal distance from the vehicle A to the target T.

Also, each of the reflected wave RW has the frequency shifted from that of the transmission wave TW by a frequency fd due to the Doppler effect according to the relative velocity of the target T to the vehicle A.

Like this, the reflected waves RW each have a delay time depending on the longitudinal distance and the frequency shifted depending on the relative velocity, with respect to the downward transmission wave TW1 and the like. Therefore, as shown in the lower part of FIG. 3, in each of the beat signals which are generated by the mixers 53, the frequency of a part corresponding to the up section in which the frequency of the transmission signal increases is different from the frequency of a part corresponding to the down section in which the frequency decreases.

A beat frequency is the frequency difference between the frequency of the downward transmission wave TW1 or TW2 and the frequency of a reflected wave RW. Hereinafter, a beat frequency corresponding to an up section is denoted by fup, and a beat frequency corresponding to a down section is denoted by fdn. In the lower part of FIG. 3, the vertical axis indicates frequency in kHz, and the horizontal axis indicates time in msec.

Also, if Fourier transform is performed by the Fourier transform unit 62, the waveforms in the frequency domains of the beat frequency fup corresponding to the up section and the beat frequency fdn corresponding to the down section are obtained as shown in FIG. 4A and FIG. 4B. In each of FIG. 4A and FIG. 4B, the vertical axis indicates signal power in dB, and the horizontal axis indicates frequency in kHz.

The peak extracting unit 70 extracts peaks Pu and peaks Pd exceeding a predetermined signal power Pref from the waveforms shown in FIG. 4A and FIG. 4B. Here, it is assumed that the peak extracting unit 70 extracts peaks Pu and Pd with respect to each of the downward transmission wave TW1 and the upward transmission wave TW2 shown in FIG. 3. The predetermined signal power Pref may be fixed, or may be variable. Also, the predetermined signal power Pref may be set to differ depending on the up section and the down section.

In the frequency spectrum of the up section shown in FIG. 4A, at the positions of three frequencies fup1, fup2, and fup3, peaks Pu are shown, respectively. Also, in the frequency spectrum of the down section shown in FIG. 4B, at the positions of three frequencies fdn1, fdn2, and fdn3, peaks Pd are shown, respectively. In FIG. 4A and FIG. 4B, the case where each of the number of peaks Pu and the number of peaks Pd is three is shown as an example; however, the number of peaks Pu which may appear is one or more, and the number of peaks Pd which may appear is also one or more. Hereinafter, the frequency will also be represented in a unit of bin. 1 bin corresponds to about 467 Hz.

When only relative velocities are considered, frequencies at which peaks appear in frequency spectra correspond to the longitudinal distances of targets T. 1 bin corresponds to a longitudinal distance of about 0.36 m. Also, for example, in the frequency spectrum of an up section, peak Pu at a certain frequency fup means that there is a target at a longitudinal distance corresponding to that frequency fup. For this reason, the peak extracting unit 70 extracts the frequencies at which the peaks Pu and the peaks Pd having powers exceeding the predetermined signal power Pref, with respect to the up section and the down section. Hereinafter, frequencies which are extracted as described above will be referred to as "peak frequencies".

Frequency spectra of an up section and a down section as shown in FIGS. 4A and 4B are obtained from a reception signal received by one receiving unit RX. Therefore, the Fourier transform unit 62 derives frequency spectra of an up section and a down section from each of reception signals received by the four receiving units RX.

Since the four receiving units RX receive the reflected wave RW from the same target, from the frequency spectra of the four receiving units RX, the same peak frequencies are extracted. However, since the positions of the four receiving units RX are different from one another, the phase of a reflected wave RW differs depending on the receiving units RX. For example, phase information items of reception signals corresponding to the same bin differ depending on the receiving units RX. Also, in the case where a plurality of targets is at the same bin but at different angles, information on the plurality of targets is included in one peak-frequency signal in the frequency spectrum.

The angle estimating unit 71 separates the information items on the plurality of targets existing at the same bin from signals having one peak frequency, with respect to each of the up section and the down section, by an azimuth calculating process, and estimates the angle of each of the plurality of targets. The targets existing at the same bin are targets having substantially the same longitudinal distance. The angle estimating unit 71 estimates the angles of the targets on the basis of the phase information items of the reception signals, with a focus on the reception signals corresponding to the same bin, in all of the frequency spectra of the four receiving units RX.

As a method of estimating the angles of targets as described above, well-known angle estimation methods such as ESPRIT (Estimation of Signal Parameters via Rotational Invariance Techniques), MUSIC (Multiple Signal Classification); and PRISM (Panchromatic Remote-sensing Instrument for Stereo Mapping) may be used. In the above-mentioned way, the angle estimating unit 71 calculates the plurality of peak angles, and the powers of signals corresponding to those angles, from signals having one frequency.

Figure 5:
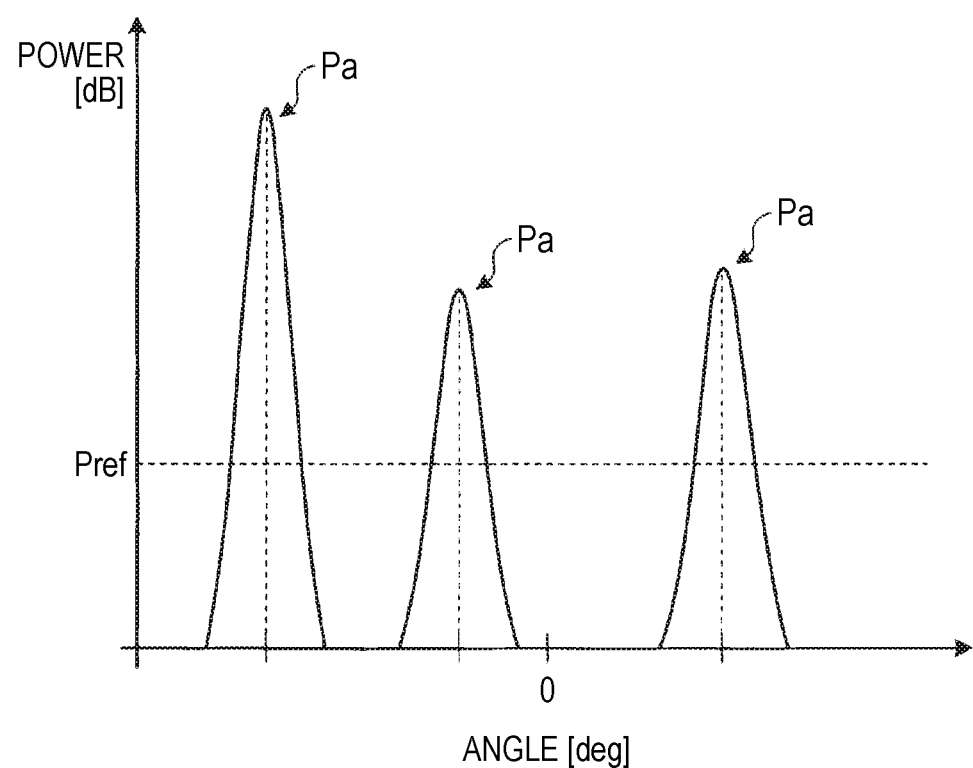
FIG. 5 is a view conceptually illustrating angles estimated by an azimuth calculating process, as an azimuth spectrum.

FIG. 5 is a view conceptually illustrating the angles estimated by the azimuth calculating process, as an angle spectrum. In FIG. 5, the vertical axis indicates signal power in dB, and the horizontal axis indicates angle in degrees. In the angle spectrum, the angles estimated by the azimuth calculating process are shown as peaks Pa exceeding the predetermined signal power Pref Hereinafter, the angles estimated by the azimuth calculating process will be referred to as the "peak angles". Like this, the plurality of peak angles derived from the signals having one peak frequency represents the angles of the plurality of targets existing at the same bin.

The angle estimating unit 71 performs peak angle derivation as described above, with respect to all of peak frequencies in the frequency spectra of the up section and the down section.

By the above-described process, the peak extracting unit 70 and the angle estimating unit 71 derive peak data items corresponding to the plurality of targets existing in front of the vehicle A, with respect to each of the up section and the down section. Each peak data item includes parameters such as the peak frequency, the peak angle, and the signal power corresponding to the peak angle (hereinafter, referred to as the "angle power") described above.

Figure 6A:
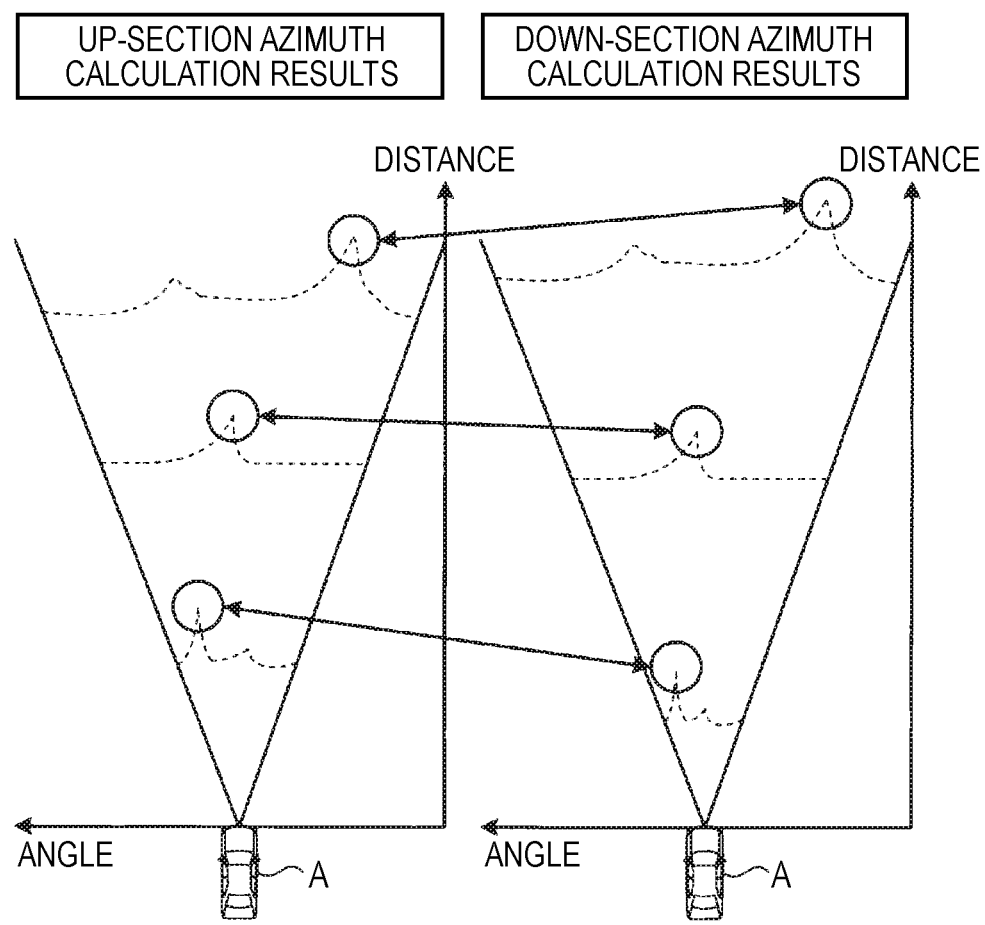
FIG. 6A is a view for explaining pairing based on azimuth angles and angle powers corresponding to the up section and the down section.
Figure 6B:
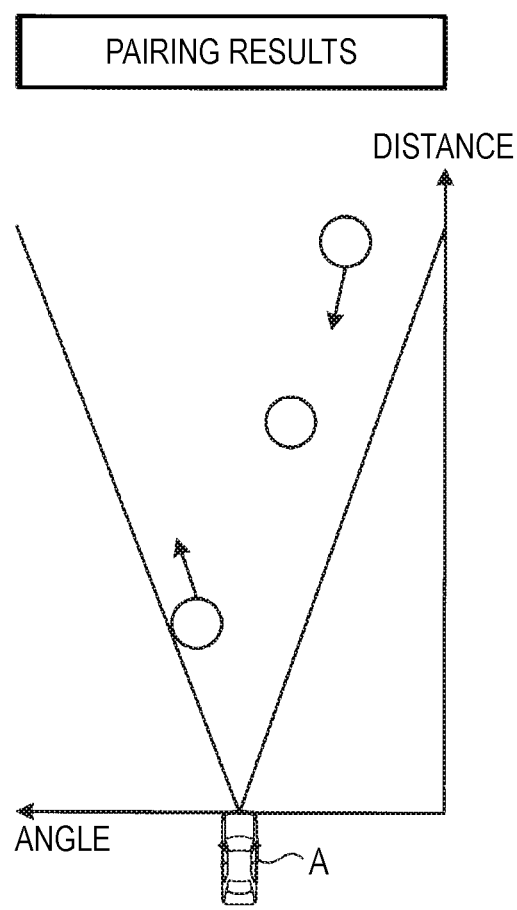
FIG. 6B is a view for explaining a pairing result.

The pairing unit 72 performs pairing for associating the peaks Pu corresponding to the up section with the peaks Pd corresponding to the down section, on the basis of the degrees of coincidence between the peak angles and the angle powers calculated with respect to the up section by the angle estimating unit 71 and the peak angles and the angle powers calculated with respect to the down section, and so on. FIG. 6A is a view for explaining pairing based on the azimuth angles and the angle powers corresponding to the up section and the down section. FIG. 6B is a view for explaining a pairing result. In FIG. 6A and FIG. 6B, each horizontal axis indicates "angle (azimuth)", and each vertical axis indicates "distance (longitudinal distance)".

As shown in FIG. 6A, if a peak angle and an angle power of a peak obtained by performing peak azimuth calculation with respect to the up section and a peak angle and an angle power of a peak obtained by performing peak azimuth calculation with respect to the down section have small differences in predetermined ranges, the pairing unit 72 pairs the corresponding peaks. In other words, for example, the pairing unit 72 calculates Mahalanobis distances using the peak angles and angle powers corresponding to the frequency peaks corresponding to the up section and the down section. To calculate Mahalanobis distances, a well-known technology is used. The pairing unit 72 associates a peak corresponding to the up section and a peak corresponding to the down section, having the minimum Mahalanobis distance, with each other.

As described above, the pairing unit 72 associates peaks related to the same target T, with each other. In this way, the pairing unit 72 derives a target data item on each of the plurality of targets T existing in front of the vehicle A. Since each target data item is obtained by associating two peaks, it is referred to as a pair data item.

Subsequently, as shown in FIG. 6B, the pairing unit 72 calculates the relative velocity and distance of each target T with respect to the vehicle A, from the pairs of peaks (shown by "○" in FIG. 6B) of the up section and the down section. For example, the pairing unit 72 may derive parameters (the longitudinal distance, the lateral distance, and the relative velocity) of each target data item (each pair data item), using two peak data items of the up section and the down section which are the origin of the corresponding target data item. The radar device 1 detects the presence of targets T by pairing.

The downward transmission unit TX1 and the upward transmission unit TX2 perform irradiation with a beam (a scanning operation) in turn, and whenever reflected waves RW are received in response to irradiation with a beam, the above-described processes of the peak extracting unit 70, the angle estimating unit 71, and the pairing unit 72 are performed to derive the instantaneous values of the parameters (the longitudinal distance, the lateral distance, and the relative velocity) from each target data item.

The continuity determining unit 73 performs determination on temporal continuity between target data items derived in the past process and target data items derived in the last process. In other words, the continuity determining unit 73 determines whether a target data item derived in the past process and a target data item derived in the last process are target data items on the same target. For example, the past process is the previous target data derivation process, and the last process is the current target data derivation process. Specifically, the continuity determining unit 73 estimates the position of the current target data item on the basis of each target data item derived in the previous target data derivation process, and determine one of target data items which is closest to the estimated position, among the target data items which are derived in the current target data derivation and which are included in a predetermined range determined on the basis of the estimated position, as a target data item closest to the corresponding target data item derived in the past process. At this time, the continuity determining unit 73 determines the target data item closest to the corresponding target data item as a target data item having continuity with the corresponding target data item derived in the past process.

Also, in the case where any target data item having continuity with a target data item derived in the past process has not been derived in the last process, in other words, in the case where it has been determined that a target data item derived in the past process does not have continuity, the continuity determining unit 73 performs an extrapolation process of virtually deriving a target data item which has not been derived in the last process, on the basis of the parameters (the longitudinal distance, the lateral distance, and the relative velocity) of the target data item derived in the past process.

The extrapolation data item derived by the extrapolation process is treated as a target data item derived in the last process. Also, if the extrapolation process is performed a plurality of times consecutively or at a comparatively high frequency with respect to a target data item, it is considered that the corresponding target has been lost, and the corresponding target data item is deleted from a predetermined storage area of the storage unit 63. Specifically, the information on the parameters corresponding to a target number indicating the corresponding target is deleted, and in association with that target number, a value indicating that the parameters have been deleted (a value indicating that a deletion flag is in an OFF state) is set. Target numbers are indexes identifying individual target data items, and different numbers are given to target data items, respectively.

The filtering unit 74 smoothes the parameters (the longitudinal distances, the lateral distances, and the relative velocities of each pair of target data items derived in the past process and the last process, in a time axis direction, thereby deriving a target data item. Target data items subjected to such a filter process are also referred to as "internal filter data items" in contrast to pair data items representing instantaneous values.

The target classifying unit 75 classifies the individual targets into preceding vehicles, stationary objects (including stationary vehicles), and oncoming vehicles, on the basis of their relative velocities. For example, the target classifying unit 75 classifies targets which have relative velocities having the same direction as that of the velocity of the vehicle A and having magnitudes larger than that of the velocity of the vehicle, into "preceding vehicles". Further, for example, the target classifying unit 75 classifies targets which have relative velocities having substantially the opposite direction to that of the vehicle A, into "stationary objects". Moreover, for example, the target classifying unit 75 classifies targets which have relative velocities having the opposite direction to that of the velocity of the vehicle A and having magnitudes larger than that of the velocity of the vehicle A, into "oncoming vehicles". However, "preceding vehicles" may be targets which have relative velocities having the same direction as that of the velocity of the vehicle A and having magnitudes smaller than that of the velocity of the vehicle A. Also, "oncoming vehicles" may be targets which have relative velocities having the opposite direction to that of the vehicle A and having magnitudes smaller than that of the velocity of the vehicle A.

The unnecessary-target removing unit 76 determines upper objects, lower objects, rain, rectangular wave ghosts, and so on among the individual targets, as unnecessary objects, and excludes the unnecessary objects from output targets. A process of discriminating upper objects from among the unnecessary objects will be described below in detail.

The grouping unit 77 groups a plurality of target data items on the same target into one target data item. For example, the grouping unit 77 considers target data items having detection positions and velocities having small differences in predetermined ranges, as target data items on the same targets, and integrates them into one target data item to be output, thereby reducing the number of target data items to be output.

The target information output unit 78 selects a predetermined number of (for example, ten) target data items as output objects from the plurality of target data items derived or estimated by extrapolation, and outputs the selected target data items to the vehicle control device 2. On the basis of the longitudinal distances and lateral distances of the target data items, the target information output unit 78 preferentially selects target data items on targets existing in the lane of the vehicle A and closer to the vehicle A. Herein, in the case where the vehicle A travels substantially along the middle of a lane, a traveling lane having the width of about 1.8 m from each of both ends of the lane is defined as the lane of the vehicle A. However, the width which defines the lane of the vehicle A may be appropriately changed in accordance with design.

The target data items derived in the above-described target data derivation process are stored, as parameters corresponding to target numbers indicating the individual target data items, in the predetermined storage area of the storage unit 63, and are used, as target data items derived in the past process, in the subsequent target data derivation processes.

In other words, the target data items derived in the past target data derivation processes are saved as "histories". For example, with reference to a "peak frequency" stored as a "history" in the predetermined storage area of the storage unit 63, the peak extracting unit 70 estimates a "peak frequency" having temporal continuity with that "history", and extracts a frequency from a range based on from the estimated "peak frequency", for example, from a range between "[Estimated Peak Frequency]−3 (bins)" and "[Estimated Peak Frequency]+3 (bins)". In this way, the radar device 1 may quickly select "peak frequencies" corresponding to targets which needs to be preferentially output to the vehicle control device 2. The peak frequency of a target data item estimated in the current process is referred to as the "estimate bin".

(First Discriminating Process of Discriminating Between Stationary Vehicles and Upper Objects According to Embodiment)

Hereinafter, details of the process of discriminating between stationary vehicles and upper objects which is performed by the unnecessary-target removing unit 76 according to the embodiment will be described in the order of STEP 1 to STEP 3 with reference to FIG. 7A to FIG. 18.

<STEP 1: Calculation of Probability Ratios>

From the parameters based on each of the target data items acquired by each scanning operation, and probability distribution models corresponding to the parameters, the unnecessary-target removing unit 76 calculates six probability ratios (log likelihood ratios) related to the corresponding target on the basis of the following Expression 1. With respect to each of detection distances set at intervals of, for example, 10 m, probability distribution models to be used to calculate the six probability ratios are defined or constructed, in advance, on the basis of actual measurement data. With respect to the distances in the detection distance intervals, probability distribution models obtained by liner interpolation are used.

Also, the probability distribution models which are used to calculate probability ratios include the lateral-position difference models 63a, the relative-velocity difference models 63b, the independent-beam inclination difference models 63c, the upward/downward beam power difference inclination models 63d, the upward/downward beam area differential models 63e, and the extrapolation-cause-based likelihood table 63f as described above with reference to FIG. 2. Details of the lateral-position difference models 63a will be described below with reference to FIG. 8. Details of the relative-velocity difference models 63b will be described below with reference to FIG. 10. Details of the independent-beam inclination difference models 63c will be described below with reference to FIG. 12. Details of the upward/downward beam power difference inclination models 63d will be described below with reference to FIG. 14. Details of the upward/downward beam area differential models 63e will be described below with reference to FIG. 17. Details of the extrapolation-cause-based likelihood table 63f will be described below with reference to FIG. 18.

$$[\text{Probability Ratio } n] = \qquad [\text{Expression 1}]$$
$$\log([\text{Likelihood } n \text{ of being Stationary Vehicle}]/$$
$$([\text{Likelihood } n \text{ of being Upper Object}]) =$$
$$\log([\text{Likelihood } n \text{ of being Stationary Vehicle}] -$$
$$\log([\text{Likelihood } n \text{ of being Upper Object}])$$

(wherein n=1, 2, 3, . . . , 6)

A probability ratio 1 which is obtained when "n" in Expression 1 is 1 is the logarithm of the ratio of the likelihood of being a stationary vehicle to the likelihood of being an upper object which is derived on the basis of a parameter "lateral-position difference" to be described below. A probability ratio 2 which is obtained when "n" in Expression 1 is 2 is the logarithm of the ratio of the likelihood of being a stationary vehicle to the likelihood of being an upper object which is derived on the basis of a parameter "relative-velocity difference" to be described below. A probability ratio 3 which is obtained when "n" in Expression 1 is 3 is the logarithm of the ratio of the likelihood of being a stationary vehicle to the likelihood of being an upper object which is derived on the basis of a parameter "independent-beam inclination difference" to be described below. A probability ratio 4 which is obtained when "n" in Expression 1 is 4 is the logarithm of the ratio of the likelihood of being a stationary vehicle to the likelihood of being an upper object which is derived on the basis of a parameter "upward/downward beam power difference inclination" to be described below. A probability ratio 5 which is obtained when "n" in Expression 1 is 5 is the logarithm of the ratio of the likelihood of being a stationary vehicle to the likelihood of being an upper object which is derived on the basis of a parameter "upward/downward beam area differential" to be described below. A probability ratio 6 which is obtained when "n" in Expression 1 is 6 is the logarithm of the ratio of the likelihood of being a stationary vehicle to the likelihood of being an upper object which is derived on the basis of based on a parameter "Extrapolation Cause" to be described below.

STEP 1-1: Log Likelihood Ratio Calculation based on "Lateral-Position Difference"

From the current lateral position acquired by the current scanning operation and the previous lateral position acquired by the previous scanning operation, the unnecessary-target removing unit 76 calculates the lateral-position difference on the basis of the following Expression 2.

$$[\text{Lateral-Position Difference}]=[\text{Current Lateral Position}]-[\text{Previous Lateral Position}] \qquad [\text{Expression 2}]$$

Figure 7A:
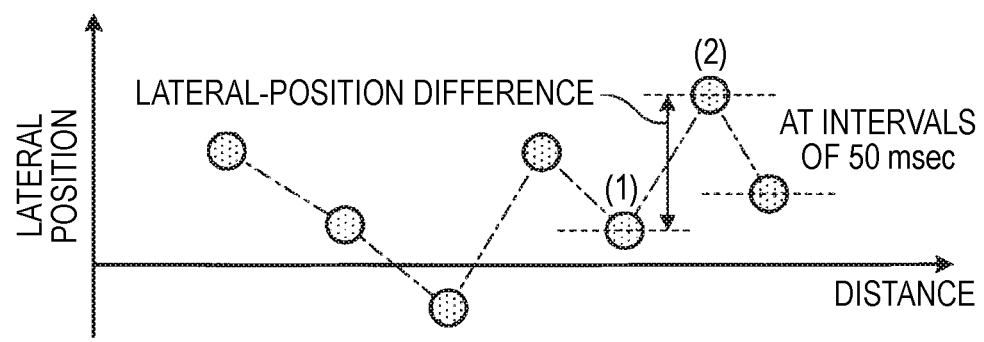
FIG. 7A is a view for explaining a lateral-location difference calculating method according to the embodiment.

FIG. 7A is a view for explaining the lateral-location difference calculating method according to the embodiment. In FIG. 7A, the horizontal axis indicates distance (detection distance), and the vertical axis indicates lateral position. As shown in FIG. 7A, for example, in the case where the lateral positions of a target have been acquired at intervals of 50 msec, the lateral-position difference is calculated by subtracting the previous lateral position (corresponding to, for example, (2) shown in FIG. 7A) from the current lateral position (corresponding to, for example, (1) shown in FIG. 7A).

Figure 7B:
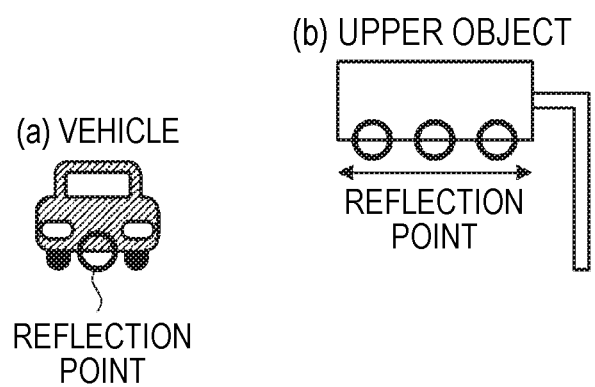
FIG. 7B is a view for explaining the background of lateral-location difference calculation according to the embodiment.

FIG. 7B is a view for explaining the background of the lateral-position difference calculation according to the embodiment. As shown in FIG. 7B, the lateral-position difference calculation is based on the fact that (a) in the case of vehicles, the positions of reflection points are stable; whereas (b) in the case of upper objects, since the positions of reflection points are unstable due to their lateral widths and the lateral positions may shift, lateral-position differences tend to be large.

Figure 8:
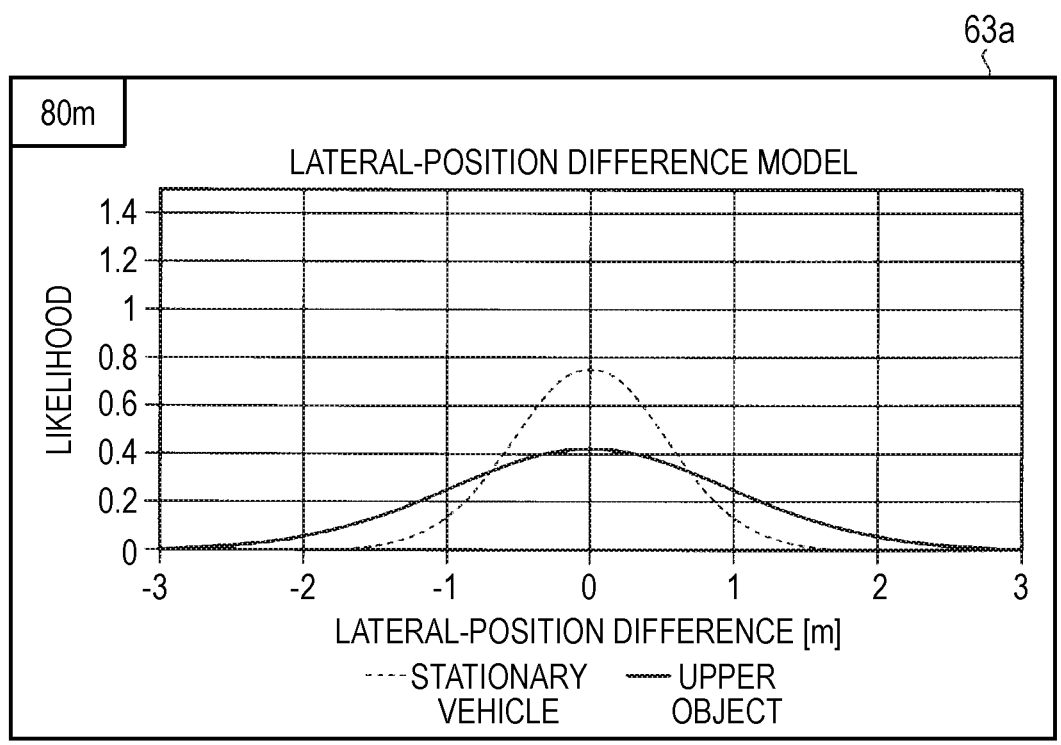
FIG. 8 is a view illustrating a lateral-location difference model according to the embodiment.

Next, from an example of the lateral-position difference models 63a shown in FIG. 8 and the lateral-position difference calculated on the basis of Expression 2, the unnecessary-target removing unit 76 calculates the "probability ratio 1" on the basis of Expression 1. FIG. 8 is a view illustrating a lateral-position difference model according to the embodiment. The lateral-position difference model 63a is a probability distribution model which has a horizontal axis indicating lateral-position difference in meters and a vertical axis indicating the likelihood and represents the relation between the lateral-position difference and the likelihood of being a stationary vehicle and the relation between the lateral-position difference and the likelihood of being an upper object. The probability distribution model of FIG. 8 representing the likelihood of being a stationary vehicle and the likelihood of being an upper object is a model constructed, for example, on the basis of normal distributions, in advance by a maximum likelihood estimation method and an experimental design method. In the lateral-position difference model 63a, the parameter which characterizes the model may be adjusted for stationary vehicles and upper objects, respectively, in order to improve the accuracy of determination.

Also, in FIG. 8, as an example of the lateral-position difference model 63a, the lateral-position difference model applicable in the case where the distance from the vehicle A to a target is 80 m which is one of distances set at intervals of 10 m from 10 m to about 150 m is shown. Lateral-position difference models applicable in the case where the distance from the vehicle A to the target is another of the distances are not shown.

For example, it is assumed that the "lateral-position difference" calculated on the basis of Expression 2 is "1". In this case, in FIG. 8, when the lateral distance on the horizontal axis is "1", the likelihood of being a stationary vehicle and the likelihood of being an upper object on the vertical axis are "0.13" and "0.27", respectively. Therefore, by substituting "0.13" and "0.27" for the terms "Likelihood 1 of being Stationary Vehicle" and "Likelihood 1 of being Upper Object" in Expression 1 "[Probability Ratio 1]=log (Likelihood 1 of being Stationary Vehicle)−log(Likelihood 1 of being Upper Object)" (Expression 1 when "n" is 1), the probability ratio 1 may be calculated.

STEP 1-2: Log Likelihood Ratio Calculation Based on "Relative-Velocity Difference"

From the differential of the distance difference between the current distance acquired by the current scanning operation and the previous distance acquired by the previous scanning operation, and the current relative velocity, the unnecessary-target removing unit 76 calculates the relative-velocity difference on the basis of the following Expression 3.

$$[\text{Relative-Velocity Difference}] = -1 \times \frac{[\text{Current Distance}] - [\text{Previous Distance}]}{[\text{Update Interval}]} + [\text{Current Relative Velocity}] \quad [\text{Expression 3}]$$

Figure 9A:
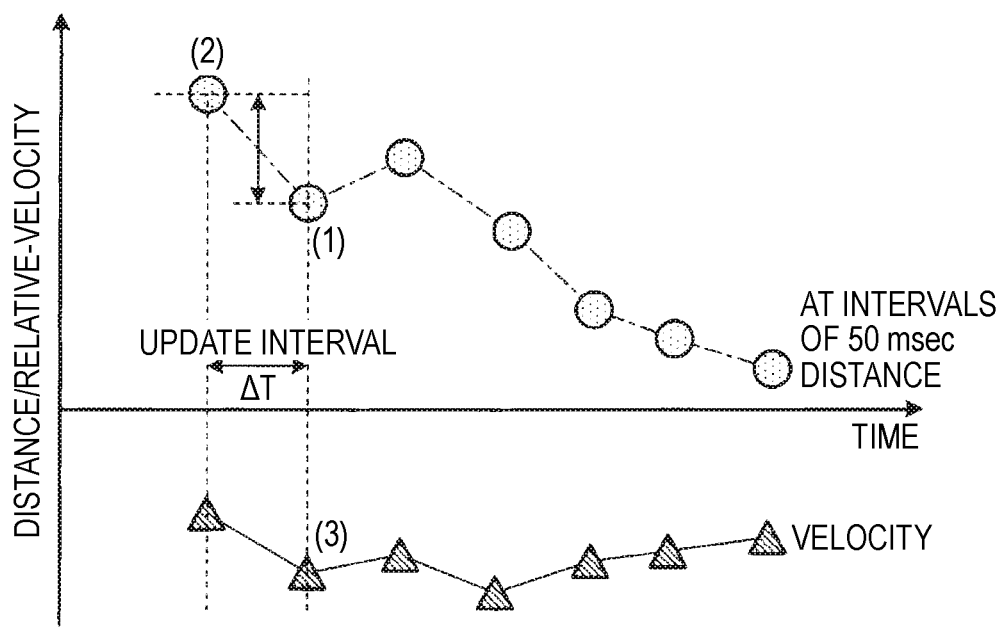
FIG. 9A is a view for explaining a relative-velocity difference calculating method according to the embodiment.

FIG. 9A is a view for explaining the relative-velocity difference calculating method according to the embodiment. As shown in FIG. 9A, for example, in the case where the distances of a target have been acquired at intervals of 50 msec, the differential in the distance difference between the current distance and the previous distance is calculated by subtracting the previous distance (corresponding to, for example, (2) shown in FIG. 9A) from the current distance (corresponding to, for example, (1) shown in FIG. 9A) and dividing the obtained difference (=[Current Distance]−[Previous Distance]) by the update interval (corresponding to ΔT (for example, 50 msec) in FIG. 9A). Subsequently, the differential of the distance difference between the current distance and the previous distance is converted into the opposite sign, and then is added to the current relative velocity (corresponding to, for example, (3) shown in FIG. 9A). In this way, the relative-velocity difference is calculated.

Figure 9B:
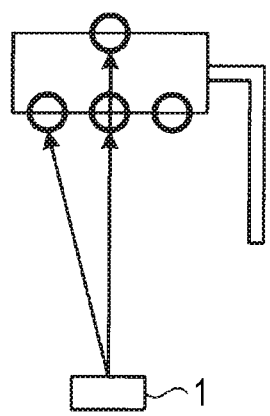
FIG. 9B is a view for explaining the background of relative-velocity difference calculation according to the embodiment.

FIG. 9B is a view for explaining the background of the relative-velocity difference calculation according to the embodiment. As shown in FIG. 9B, in the case of upper objects, since they have longitudinal and lateral widths, the positions of reflection points are unstable and may shift in the longitudinal and lateral directions. Therefore, the distances from the radar device 1 tend to change significantly, resulting in an increase in the value of the differential of the detection distance with respect to time. The above-described relative-velocity difference calculation is based on this fact.

Figure 10:
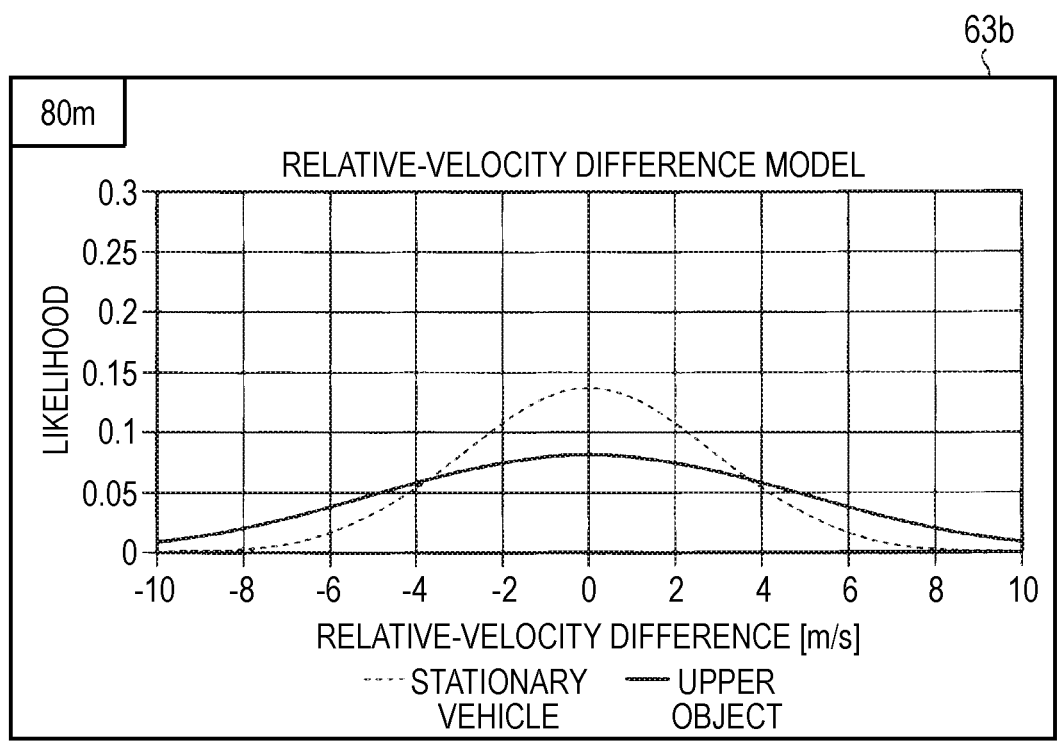
FIG. 10 is a view illustrating a relative-velocity difference model according to the embodiment.

Next, from an example of the relative-velocity difference models 63b shown in FIG. 10 and the relative-velocity difference calculated on the basis of Expression 3, the unnecessary-target removing unit 76 calculates the "probability ratio 2" on the basis of Expression 1. FIG. 10 is a view illustrating a relative-velocity difference model according to the embodiment. The relative-velocity difference model 63b is a probability distribution model which has a horizontal axis indicating relative-velocity difference in m/s and a vertical axis indicating likelihood and represents the relation between the relative-velocity difference and the likelihood of being a stationary vehicle and the relation between the relative-velocity difference and the likelihood of being an upper object. The probability distribution model of FIG. 10 representing the likelihood of being a stationary vehicle and the likelihood of being an upper object is a model constructed, for example, on the basis of normal distributions, in advance by a maximum likelihood estimation method and an experimental design method. In the relative-velocity difference model 63b, the parameter which characterizes the model may be adjusted for stationary vehicles and upper objects, respectively, in order to improve the accuracy of determination.

Also, in FIG. 10, as an example of the relative-velocity difference models 63b, the relative-velocity difference model applicable in the case where the distance from the vehicle A to a target is 80 m which is one of the distances set at intervals of 10 m from 10 m to about 150 m is shown. Relative-velocity difference models applicable in the case where the distance from the vehicle A to the target is another of the distances are not shown.

For example, it is assumed that the "relative-velocity difference" calculated on the basis of Expression 3 is "2". In this case, in FIG. 10, when the relative-velocity difference on the horizontal axis is "2", the likelihood of being a stationary vehicle and the likelihood of being an upper object on the vertical axis are "0.11" and "0.75", respectively. Therefore, by substituting "0.11" and "0.75" for the terms "Likelihood 2 of being Stationary Vehicle" and "Likelihood 2 of being Upper Object" in Expression 1 "[Probability Ratio 2]=log(Likelihood 2 of being Stationary Vehicle)−log(Likelihood 2 of being Upper Object)" (Expression 1 when "n" is 2), the probability ratio 2 may be calculated.

STEP 1-3: Log Likelihood Ratio Calculation based on "Independent-Beam Inclination Difference"

From the current distance and the current angle power acquired by the current scanning operation and the previous distance and the previous angle power acquired by the previous scanning operation, the unnecessary-target removing unit 76 calculates the independent-beam inclination difference on the basis of the following Expression 4. This calculation is based on the fact that since independent-beam inclination differences have relation to power fluctuations which are caused by multipath, it is possible to discriminate stationary vehicles and upper objects on the basis of independent-beam inclination differences.

[Independent-Beam Inclination Difference]=[Current Upward-Beam (Downward-Beam) Inclination]−[Previous Upward-Beam (Downward-Beam) Inclination]    [Expression 4]

Figure 11:
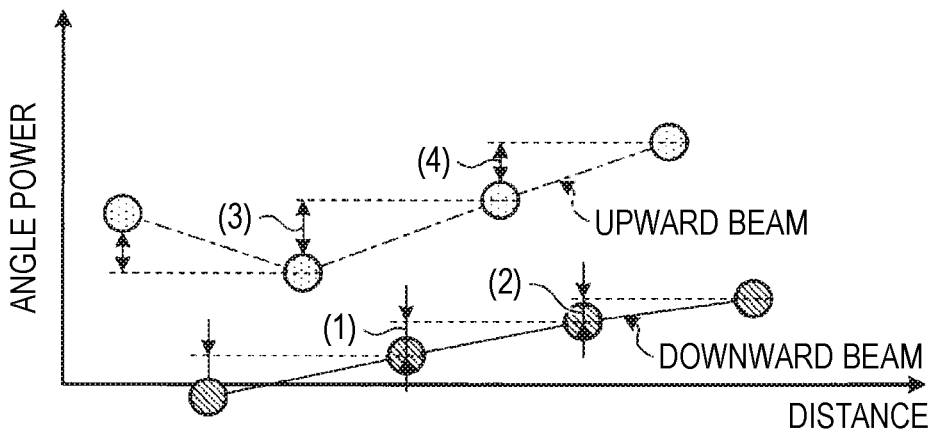
FIG. 11 is a view for explaining calculation of an upward-beam inclination and a downward-beam inclination to be parameters for calculating an independent-beam inclination difference according to the embodiment.

FIG. 11 is a view for explaining calculation of the upward-beam inclination and the downward-beam inclination which are to be parameters for calculating the independent-beam inclination difference according to the embodiment. As shown in FIG. 11, for example, in the case of acquiring the angle power of a target by transmitting the upward beam and the downward beam at intervals of 50 msec, with respect to the downward beam, the downward-beam inclination is calculated by subtracting the previous angle power difference (corresponding to, for example, (2) shown in FIG. 11) from the current angle power difference (corresponding to, for example, (1) shown in FIG. 11) and dividing the subtraction result by the distance difference (=[Previous distance]−[Current Distance]). Also, with respect to the upward beam, the upward-beam inclination is calculated by subtracting the previous angle power difference (corresponding to, for example, (4) shown in FIG. 11) from the current angle power difference (corresponding to, for example, (3) shown in FIG. 11) and dividing the subtraction result by the distance difference (=[Previous distance]−[Current Distance]). Then, the independent-beam inclination difference of the upward beam is calculated by subtracting the previous upward-beam inclination from the current upward-beam inclination. Also, the independent-beam inclination difference of the downward beam is calculated by subtracting the previous downward-beam inclination from the current downward-beam inclination.

Figure 12:
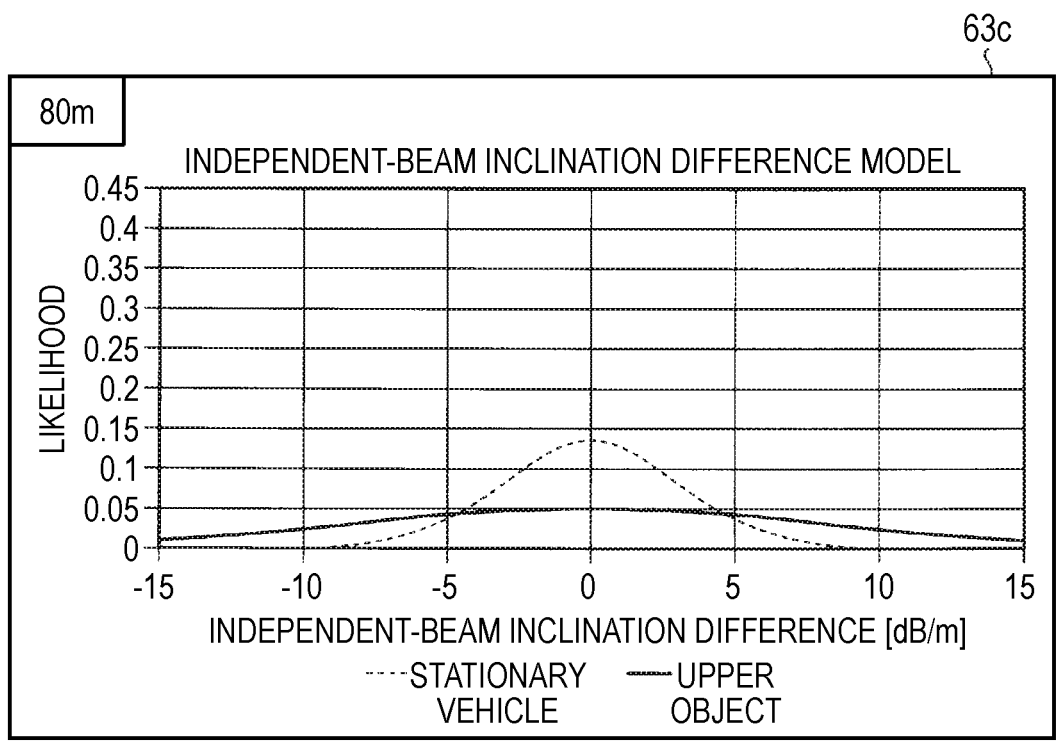
FIG. 12 is a view illustrating an independent-beam inclination difference model according to the embodiment.

Next, from an example of the independent-beam inclination difference models 63*c* shown in FIG. 12 and the independent-beam inclination difference calculated on the basis of Expression 4, the unnecessary-target removing unit 76 calculates the "probability ratio 3" on the basis of Expression 1. FIG. 12 is a view illustrating an independent-beam inclination difference model according to the embodiment. The independent-beam inclination difference model 63*c* is a probability distribution model which has a horizontal axis indicating independent-beam inclination difference in dB/m and a vertical axis indicating the likelihood and represents the relation between the independent-beam inclination difference and the likelihood of being a stationary vehicle and the relation between the independent-beam inclination difference and the likelihood of being an upper object. The probability distribution model of FIG. 12 representing the likelihood of being a stationary vehicle and the likelihood of being an upper object is a model constructed, for example, on the basis of normal distributions, in advance by a maximum likelihood estimation method and an experimental design method. In the independent-beam inclination difference model 63*c*, the parameter which characterizes the model may be adjusted for stationary vehicles and upper objects, respectively, in order to improve the accuracy of determination.

Also, in FIG. 12, as an example of the independent-beam inclination difference models 63*c*, the independent-beam inclination difference model applicable in the case where the distance from the vehicle A to a target is 80 m which is one of distances set at intervals of 10 m from 10 m to about 150 m is shown. Independent-beam inclination difference models applicable in the case where the distance from the vehicle A to a target is another of the distances are not shown.

For example, it is assumed that the "independent-beam inclination difference" calculated on the basis of Expression 4 is "0". In this case, in FIG. 12, when the independent-beam inclination difference on the horizontal axis is "0", the likelihood of being a stationary vehicle and the likelihood of being an upper object on the vertical axis are "0.14" and "0.05", respectively. Therefore, by substituting "0.14" and "0.05" for the terms "Likelihood 3 of being Stationary Vehicle" and "Likelihood 3 of being Upper Object" in Expression 1 "[Probability Ratio 3]=log(Likelihood 3 of being Stationary Vehicle)−log(Likelihood 3 of being Upper Object)" (Expression 1 when "n" is 3), the probability ratio 3 may be calculated.

STEP 1-4: Log Likelihood Ratio Calculation based on "Upward/Downward Beam Power Difference Inclination"

The unnecessary-target removing unit 76 calculates the upward/downward beam power difference inclination on the basis of the following Expression 5. This calculation is based on the fact that since upward/downward beam power difference inclinations have relation to power fluctuations which are caused by multipath, it is possible to discriminate stationary vehicles and upper objects on the basis of upward/downward beam power difference inclinations.

[Upward/Downward Beam Power Difference [Expression 5]
Inclination]

$$\text{Inclination} = \frac{\text{[Current Angle Power Difference]} - \text{[Previous Angle Power Difference]}}{[d1 - d2]}$$

Figure 13:
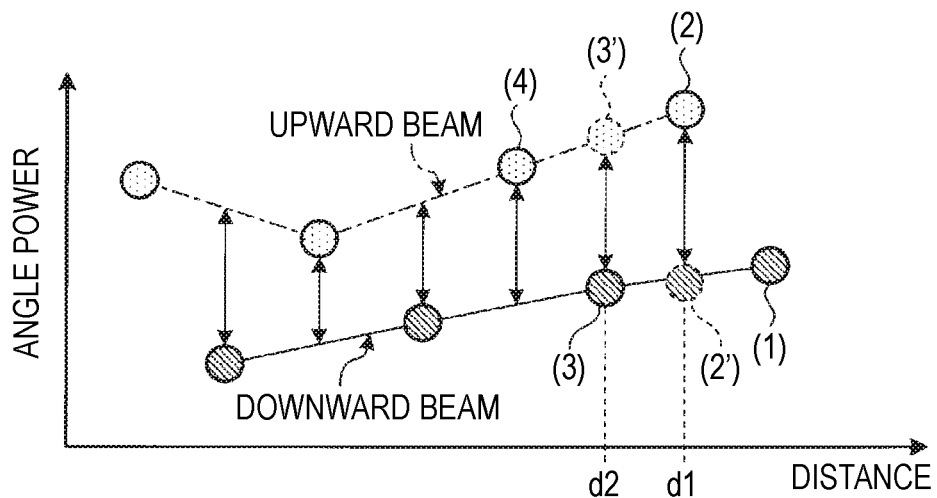
FIG. 13 is a view for explaining an upward/downward beam power difference inclination calculating method.

Here, the term "[Current Angle Power Difference]" may be written as "[Interpolated Upward-Beam Angle Power (see (3') of FIG. 13 for instance)]−[Current Downward-Beam Angle Power (see (3) of FIG. 13 for instance)]", and the term "[Previous Angle Power Difference]" may be written as "[Previous Upward-Beam Angle Power (see (2) of FIG. 13 for instance)]−[Downward-Beam Angle Power Interpolation Value (see (2') of FIG. 13 for instance)]".

FIG. 13 is a view for explaining the upward/downward beam power difference inclination calculating method according to the embodiment. As shown in FIG. 13, for example, in the case of acquiring the angle power of a target by transmitting the upward beam and the downward beam at intervals of 50 msec, linear interpolation is performed on the previous downward-beam angle power (corresponding to, for example, (1) shown in FIG. 13) and the current downward-beam angle power (corresponding to, for example, (3) shown in FIG. 13), whereby a downward-beam angle power interpolation value (corresponding to, for example, (2') shown in FIG. 13) corresponding to a distance d1 corresponding to the previous upward-beam angle power (corresponding to, for example, (2) shown in FIG. 13) is calculated. Also, liner interpolation is performed on the previous upward-beam angle power (corresponding to, for example, (2) shown in FIG. 13) and the current upward-beam angle power (corresponding to, for example, (4) shown in FIG. 13), whereby an upward-beam angle power interpolation value (corresponding to, for example, (3') shown in FIG. 13) corresponding to a distance d2 corresponding to the current downward-beam angle power (corresponding to, for example, (3) shown in FIG. 13) is calculated.

Since the upward beam and the downward beam are alternately transmitted at intervals of 50 msec, there are time lags between the timings when angle powers are acquired by transmitting the upward beam and the timings when angle powers are acquired by transmitting the downward beam. For this reason, such interpolation values are used to calculate more accurate angle power differences at appropriate timings.

Next, the unnecessary-target removing unit 76 calculates the current angle power difference by subtracting the current downward-beam angle power (corresponding to, for example, (3) shown in FIG. 13) from the upward-beam angle power interpolation value (corresponding to, for example, (3') shown in FIG. 13). Also, the unnecessary-target removing unit 76 calculates the current angle power difference by subtracting the downward-beam angle power interpolation value (corresponding to, for example, (2') shown in FIG. 13) from the current upward-beam angle power (corresponding to, for example, (2) shown in FIG. 13). Then, the unnecessary-target removing unit 76 calculates the upward/downward beam power difference inclination on the basis of Expression 5. In Expression 5, "d1" and "d2" are "d1" and "d2" shown in FIG. 13.

Figure 14:
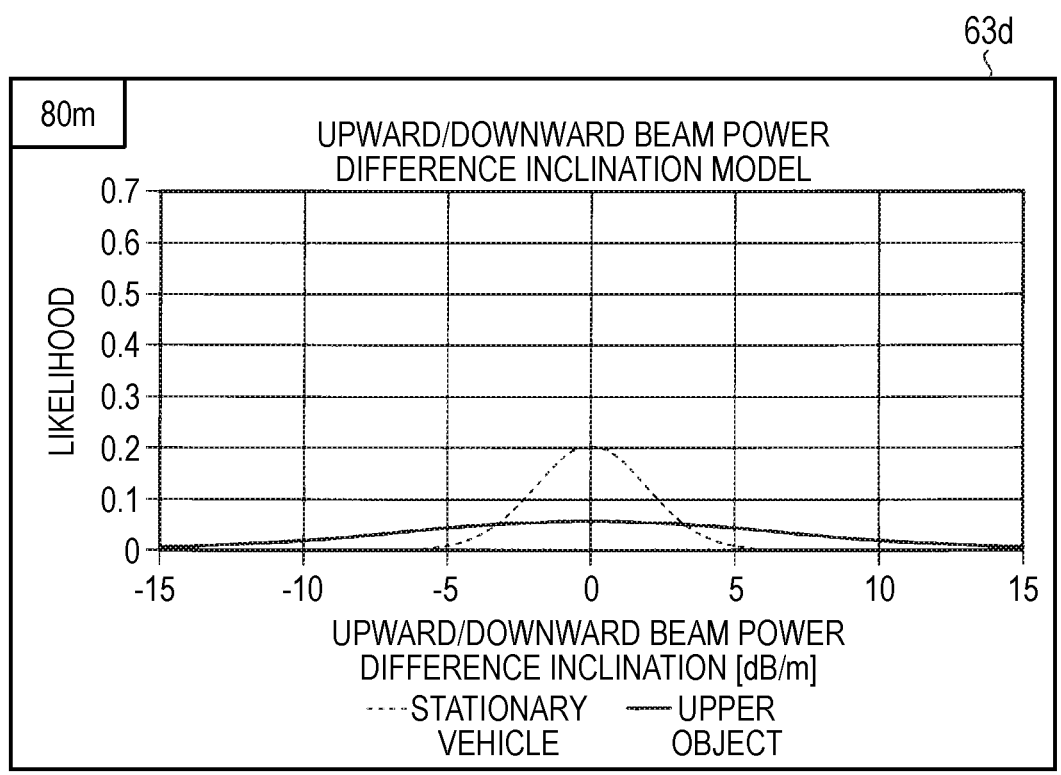
FIG. 14 is a view illustrating an upward/downward beam power difference inclination model according to the embodiment.

Next, from an example of the upward/downward beam power difference inclination models 63*d* shown in FIG. 14 and the upward/downward beam power difference inclination calculated on the basis of Expression 5, the unnecessary-target removing unit 76 calculates the "probability ratio 4" on the basis of Expression 1. FIG. 14 is a view illustrating an upward/downward beam power difference inclination model according to the embodiment. The upward/downward beam power difference inclination model 63d is a probability distribution model which has a horizontal axis indicating upward/downward beam power difference inclination in dB/m and a vertical axis indicating the likelihood and represents the relation between the upward/downward beam power difference inclination and the likelihood of being a stationary vehicle and the relation between the upward/downward beam power difference inclination and the likelihood of being an upper object. The probability distribution model of FIG. 14 representing the likelihood of being a stationary vehicle and the likelihood of being an upper object is a model constructed, for example, on the basis of normal distributions, in advance by a maximum likelihood estimation method and an experimental design method. In the upward/downward beam power difference inclination model 63d, the parameter which characterizes the model may be adjusted for stationary vehicles and upper objects, respectively, in order to improve the accuracy of determination.

Also, in FIG. 14, as an example of the upward/downward beam power difference inclination models 63d, the upward/downward beam power difference inclination model applicable in the case where the distance from the vehicle A to a target is 80 m which is one of distances set at intervals of 10 m from 10 m to about 150 m is shown. Upward/downward beam power difference inclination models applicable in the case where the distance from the vehicle A to the target is another of the distances are not shown.

For example, it is assumed that the "upward/downward beam power difference inclination" calculated on the basis of Expression 5 is "0". In this case, in FIG. 14, when the upward/downward beam power difference inclination on the horizontal axis is "0", the likelihood of being a stationary vehicle and the likelihood of being an upper object on the vertical axis are "0.2" and "0.06", respectively. Therefore, by substituting "0.2" and "0.06" for the terms "Likelihood 4 of being Stationary Vehicle" and "Likelihood 4 of being Upper Object" in Expression 1 "[Probability Ratio 4]=log(Likelihood 4 of being Stationary Vehicle)−log(Likelihood 4 of being Upper Object)" (Expression 1 when "n" is 4), the probability ratio 4 may be calculated.

STEP 1-5: Log Likelihood Ratio Calculation based on "Upward/Downward Beam Area Differential"

Multipath of reflected waves has an influence on angle power, and the influence of multipath depends on the heights of targets. In the case of detecting a stationary vehicle and an upper object existing at a long distance from the vehicle, the influence of multipath on the angle power of the upper object is more apparent than the influence of multipath on the angle power of the stationary vehicle. Also, distances at which nulls attributable to multipath appear (and the number of such nulls appearing at each distance) are unlikely to be influenced by the installation angle of the radar device with respect to the vertical direction, in other words, the parameter "upward/downward beam area differential" which is obtained by normalizing change in the upward/downward beam power difference with distance is unlikely to be influenced by the radar installation condition. A null means an area in the antenna radiation pattern between lobes which are concave up near their maximum points and whose shapes near their minimum points are similar to the shape of a cycloid curve near its minimum point.

Figure 15A:
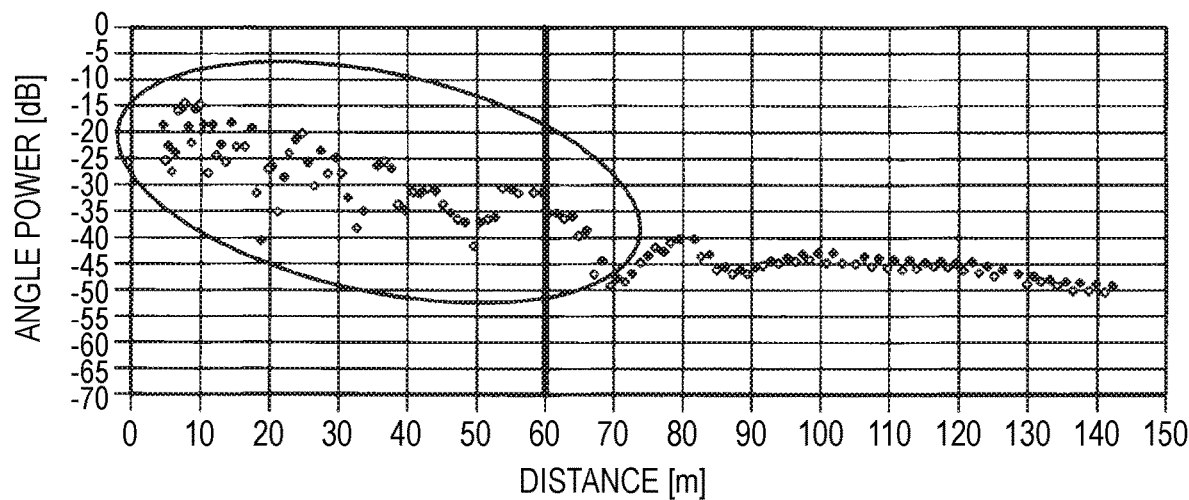
FIG. 15A is a view illustrating the relation between the angle powers and distances of a stationary vehicle according to the embodiment.
Figure 15B:
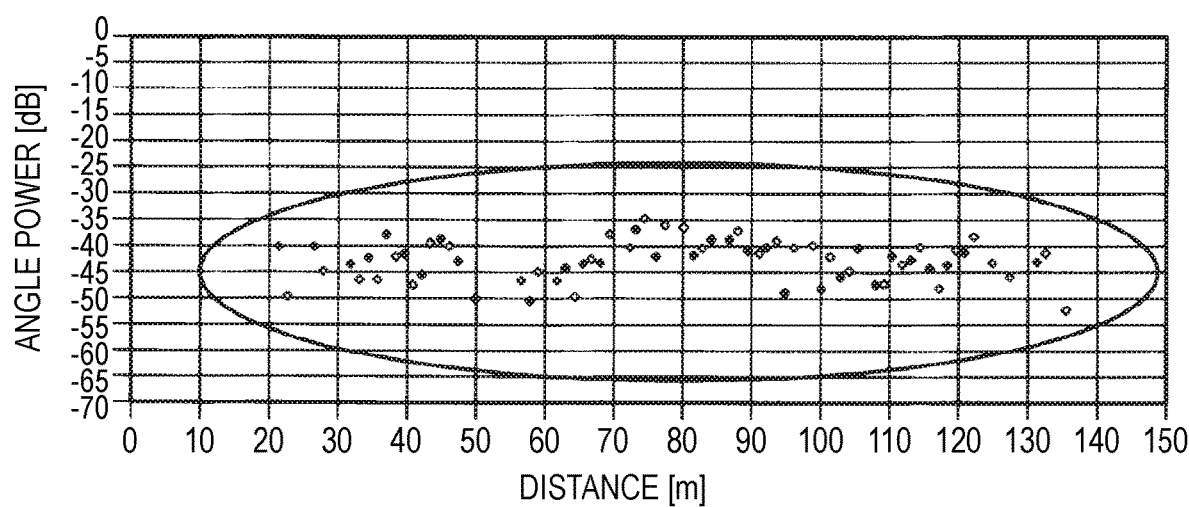
FIG. 15B is a view illustrating the angle powers and distances of an upper object according to the embodiment.

FIG. 15A is a view illustrating the relation between the angle power and distance of a stationary vehicle. FIG. 15B is a view illustrating the relation between the angle power and distance of an upper object. From a part in a circle shown in FIG. 15A, it may be seen that in the distance range less than about 70 m or 80 m, since the influence of multipath on the stationary vehicle is strong, the angle power distribution is wide and the amount of change is large. Meanwhile, from a part in a circle shown in FIG. 15B, it may be seen that regardless of the distance, since the influence of multipath on the upper object is less, the angle power distribution is narrow and the amount of change is small.

Figure 16:
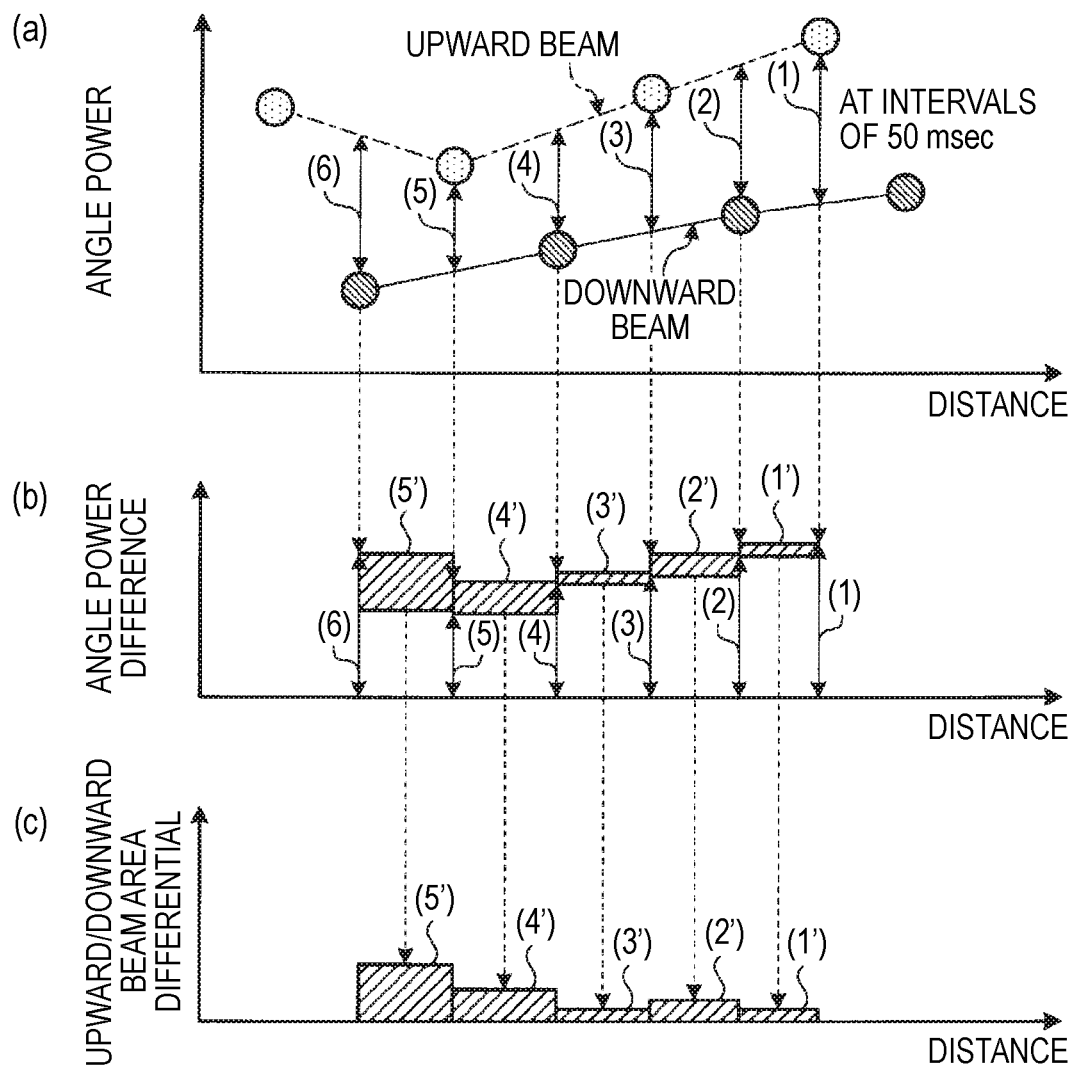
FIG. 16 is a view for explaining an upward/downward beam area differential calculating method according to the embodiment.

For this reason, the unnecessary-target removing unit 76 calculates the upward/downward beam area differential by a method shown in FIG. 16. FIG. 16 is a view for explaining the upward/downward beam area differential calculating method according to the embodiment. As shown in FIG. 16, for example, in the case of acquiring the angle power of a target by transmitting the upward beam and the downward beam at intervals of 50 msec, with respect to each angle power acquired by transmitting one of the upward beam and the downward beam, linear interpolation is performed on angles powers acquired by transmitting the other beam, thereby estimating an angle power corresponding to the distance corresponding to the acquired angle power, and with respect to the individual distances, angle power differences between the upward beam and the downward beam (corresponding to (1) to (6) shown in (a) of FIG. 16) are calculated.

Since the upward beam and the downward beam are alternately transmitted at intervals of 50 msec, there are time lags between the timings when angle powers are acquired by transmitting the upward beam and the timings when angle powers are acquired by transmitting the downward beam. For this reason, such interpolation values which are obtained with respect to individual distances by liner interpolation are used to calculate more accurate angle power differences at appropriate timings.

Next, as shown in (b) of FIG. 16, the unnecessary-target removing unit 76 calculates the "upward/downward beam power difference" by |[Angle Power Difference of (1)]−[Angle Power Difference of (2)]|, and calculates the "distance difference" by |[Distance of (1)]−[Distance of (2)]|, and obtains the area of (1') by multiplying the "upward/downward beam power difference" and the "distance difference". The notation |*| means the absolute value of *.

Similarly, the unnecessary-target removing unit calculates the area of (2'), the area of (3'), the area of (4'), and the area of (5') by "|[Angle Power Difference of (2)]−[Angle Power Difference of (3)]|×{[Distance of (2)]−[Distance of (3)]}", "|[Angle Power Difference of (3)]−[Angle Power Difference of (4)]|×{[Distance of (3)]−[Distance of (4)]}", "|[Angle Power Difference of (4)]−[Angle Power Difference of (5)]|×{[Distance of (4)]−[Distance of (5)]}", and "|[Angle Power Difference of (5)]−[Angle Power Difference of (6)]|×{[Distance of (5)]−[Distance of (6)]}", respectively.

In FIG. 16, (c) shows the areas of the individual cycles calculated by the above-method. Next, the unnecessary-target removing unit 76 calculates the "upward/downward beam area differential" by dividing the sum of the areas of the individual cycles (the upward/downward beam power differences) calculated with respect to the same target as described above by the sum of the individual distance differences.

$$[\text{Upward/Downward Beam Area Differential}] = \frac{\sum [\text{Upward/Downward Beam Power Differences}]}{\sum [\text{Distance Differences}]} \quad \text{[Expression 6]}$$

Figure 17:
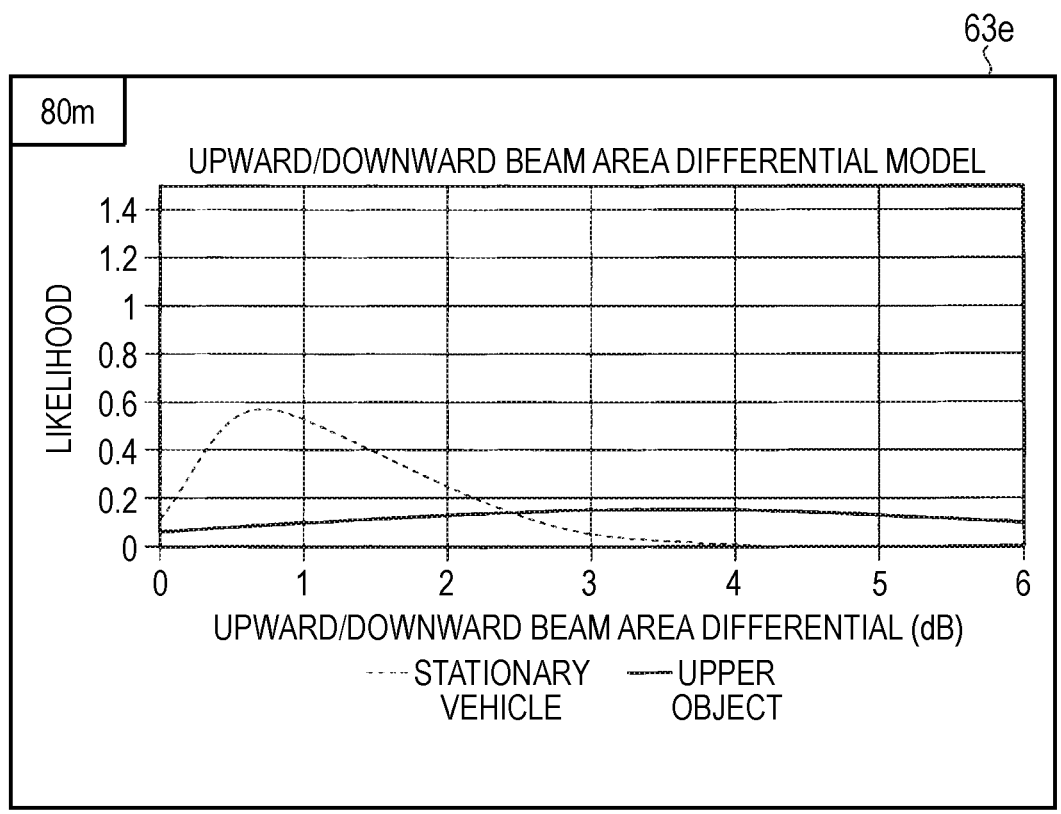
FIG. 17 is a view illustrating an upward/downward beam area differential model according to the embodiment.

Next, from an example of the upward/downward beam area differential models 63e shown in FIG. 17 and the "upward/downward beam area differential" calculated as described above, the unnecessary-target removing unit 76 calculates the "probability ratio 5" on the basis of Expression 1. FIG. 17 is a view illustrating an upward/downward beam area differential model according to the embodiment. The upward/downward beam area differential model 63e is a probability distribution model which has a horizontal axis indicating upward/downward beam area differential in dB and a vertical axis indicating the likelihood and represents the relation between the upward/downward beam area differential and the likelihood of being a stationary vehicle and the relation between the upward/downward beam area differential and the likelihood of being an upper object. The probability distribution model of FIG. 17 representing the likelihood of being a stationary vehicle and the likelihood of being an upper object is a model constructed, for example, on the basis of normal distributions. In the upward/downward beam area differential model 63e, the parameter which characterizes the model may be adjusted for stationary vehicles and upper objects, respectively, in order to improve the accuracy of determination.

Also, in FIG. 17, as an example of the upward/downward beam area differential models 63e, the upward/downward beam area differential model applicable in the case where the distance from the vehicle A to a target is 80 m which is one of the distances set at intervals of 10 m from 10 m to about 150 m is shown. Relative-velocity difference models applicable in the case where the distance from the vehicle A to the target is another of the distances are not shown.

For example, it is assumed that the "upward/downward beam area differential" calculated on the basis of Expression 6 is "1". In this case, in FIG. 17, when the upward/downward beam area differential on the horizontal axis is "1", the likelihood of being a stationary vehicle and the likelihood of being an upper object on the vertical axis are "0.52" and "0.1", respectively. Therefore, by substituting "0.52" and "0.1" for the terms "Likelihood 5 of being Stationary Vehicle" and "Likelihood 5 of being Upper Object" in Expression 1 "[Probability Ratio 5]=log(Likelihood 5 of being Stationary Vehicle)−log(Likelihood 5 of being Upper Object)" (Expression 1 when "n" is 5), the probability ratio 5 may be calculated.

STEP 1-6: Log Likelihood Ratio Calculation based on "Extrapolation Causes"

In the case of upper objects, reflection is unstable due to the influence of multi-point reflection, shift of reflection points, power attenuation attributable to multipath, and so on, so extrapolation is often applied. For this reason, on the basis of the features of extrapolation, the likelihood of being a stationary vehicle and the likelihood of being an upper object are calculated. In other words, with respect to each target, whether any extrapolation has been performed is determined in the current scanning operation, and if extrapolation has been performed, the cause of the extrapolation is identified. Then, on the basis of whether any extrapolation has been performed and the cause of extrapolation, the log likelihood ratios are determined from the extrapolation-cause-based likelihood table 63f. FIG. 18 is a view illustrating the extrapolation-cause-based likelihood table according to the embodiment. In FIG. 18, ellipses " . . . " are used to indicate omissions of specific numeric values. For example, if the continuity determining unit 73 performs an extrapolation process, it stores information on whether extrapolation has been performed and the extrapolation cause in the predetermined storage area of the storage unit 63.

As extrapolation causes, for example, there are seven causes "History Non-existence", "Peak Non-existence", "Angle Estimation Failure", "Discontinuity", "Out of Range (in bins) based on Estimated Frequency", "Improper Mahalanobis Distance", and "Pair Non-existence".

The cause "History Non-existence" means the case where it is impossible to acquire any history corresponding to an extracted current peak frequency or there is no history corresponding to an extracted current peak frequency. The cause "Peak Non-existence" means the case where the peak extracting unit 70 cannot extract any peak from a frequency spectrum generated by the Fourier transform unit 62. The cause "Angle Estimation Failure" means the case where although the peak extracting unit 70 has extracted a peak, the angle estimating unit 71 cannot estimate any target angle.

The cause "Discontinuity" means the case where although the pairing unit 72 has succeeded in pairing, the continuity determining unit 73 determines that the corresponding target data item does not have continuity with any target data item derived in the last process.

The cause "Out of Range (in bins) based on Estimated Frequency" means the case where the actual position of a current target data item is not within the predetermined range based on the estimated position for the current target data item (for example, in a range between "[Estimated Peak Frequency]−3 (bins)" and "[Estimated Peak Frequency]+3 (bins)").

The cause "Improper Mahalanobis Distance" means the case where since the minimum value of Mahalanobis distances is larger than the predetermined value, the pairing unit 72 fails in pairing. The cause "Pair Non-existence" means the case where the pairing unit 72 fails in pairing due to a cause other than the causes "History Non-existence", "Pair Non-existence", "Angle Estimation Failure", "Discontinuity", "Out of Range (in bins) based on Estimated Frequency", and the "Improper Mahalanobis Distance".

In the case where it is determined in the current scanning operation that any extrapolation does not have been performed, i.e. in the case where normal detection has been performed, the unnecessary-target removing unit 76 reads the log likelihood of being a stationary vehicle and the log likelihood of being an upper object corresponding to the detection distance, from a column of the extrapolation-cause-based likelihood table 63f of FIG. 18 representing the log likelihood related to "Normal Detection". Referring to the row "95<R≤105", for example, in the case where the detection distance R is 100 m, the log likelihood of being a stationary vehicle is −0.14, and the log likelihood of being an upper object is −0.16. Therefore, by substituting "−0.14" and "−0.16" for the terms "log(Likelihood 6 of being Stationary Vehicle)" and "log(Likelihood 6 of being Upper Object)" in Expression 1 "[Probability Ratio 6]=log(Likelihood 6 of being Stationary Vehicle)−log(Likelihood 6 of being Upper Object)" (Expression 1 when "n" is 6), the probability ratio 6 may be calculated.

Also, in the case where it is determined in the current scanning operation that extrapolation has been performed, and the cause extrapolation is "History Non-existence", the unnecessary-target removing unit 76 reads the log likelihood of being a stationary vehicle and the log likelihood of being an upper object corresponding to the detection distance, from a column of the extrapolation-cause-based likelihood table 63f of FIG. 18 representing the log likelihood related to the cause "History Non-existence". Referring to the row "95<R≤105", for example, in the case where the detection distance R is 100 m, the log likelihood of being a stationary vehicle is −2.48, and the log likelihood of being an upper object is −1.13. Therefore, by substituting "−2.48" and "−1.13" for the terms "log(Likelihood 6 of being Stationary Vehicle)" and "log(Likelihood 6 of being Upper Object)" in Expression 1 "[Probability Ratio 6]=log(Likelihood 6 of being Stationary Vehicle)−log(Likelihood 6 of being Upper Object)" (Expression 1 when "n" is 6), the probability ratio 6 may be calculated. The same is true for the other extrapolation causes.

<STEP 2: Calculation of Probability Ratio OverAll>

The unnecessary-target removing unit 76 calculates the sum of the probability ratio 1 to the probability ratio 6 calculated in STEP 1-1 to STEP 1-6 described above, as the probability ratio OverAll, on the basis of the following Expression 7.

[Probability Ratio OverAll]=[Probability Ratio 1]+
[Probability Ratio 2]+[Probability Ratio 3]+
[Probability Ratio 4]+[Probability Ratio 5]+
[Probability Ratio 6]    [Expression 7]

<STEP 3: Process of Discriminating Between Stationary Vehicles and Upper Objects>

The unnecessary-target removing unit 76 compares the probability ratio OverAll calculated in STEP 2 described above with a predetermined threshold, thereby determining whether the target is a stationary vehicle or an upper object. In other words, in the case where the probability ratio OverAll is equal to or larger than the predetermined threshold, the unnecessary-target removing unit 76 determines that the target is a stationary vehicle; whereas in the case where the probability ratio OverAll is smaller than the predetermined threshold, the unnecessary-target removing unit determines that the target is an upper object.

As described above, in the first discriminating process, with respect to each of the plurality of parameters, probability density functions representing the relation between values which a stationary vehicle may take and the occurrence frequencies of the values and the relation between values which an upper object may take and the occurrence frequencies of the values are defined, respectively, and from the current values, the probability of being a stationary vehicle (the likelihood of being a stationary vehicle) and the probability of being an upper object (the likelihood of being an upper object) are calculated on the basis of the probability density functions related to the plurality of parameters.

Further, in the first discriminating process, whenever data acquisition is performed, Bayesian updating is performed for updating prior probabilities with posterior probabilities. By repeating the above-mentioned process, whether each target is a stationary vehicle or an upper object is determined in the Bayesian filter manner using the logarithmic ratio between the probability of being a stationary vehicle and the probability of being an upper object.

Therefore, according to the first discriminating process, it is possible to determine whether a target detected in the traveling direction of the vehicle is likely to collide with the vehicle (for example, whether a detected target is a target for which control on the vehicle such as brake control is required), from a comparatively long distance (about 80 m) from the target, and it is possible to improve the detection rate such that control on the vehicle based on target detection may be performed at appropriate timing by appropriate instructions.

Also, in the first discriminating process, the probability ratios 1 to 6 are parameters unlikely to be influenced by the installation height of the radar device 1 on the vehicle A and the installation angle of the radar device with respect to the vertical direction, and regardless of the radar installation condition, it is possible to discriminate between stationary vehicles and upper objects with high accuracy.

(Second Discriminating Process of Discriminating Between Stationary Vehicles and Upper Objects According to Embodiment)

There is the case where the first discriminating process described above cannot discriminate between stationary vehicles and upper objects with high accuracy. In other words, as shown in FIG. 19, some of probability ratios OverAll based on the plurality of parameters may be acquired from stationary vehicles and may also be acquired from upper objects. FIG. 19 is a view illustrating a probability ratio distribution including a range common to stationary vehicles and upper objects. For this reason, in the following second discriminating process, a method of separating probability ratios OverAll will be described.

Hereinafter, causes $H_i$ (wherein i is 1 or 2) are defined as the following Table 1.

TABLE 1

| Cause | Definition |
| --- | --- |
| $H_1$ | Target is Stationary Vehicle. |
| $H_2$ | Target is Upper Object. |

Also, parameters $D_j$ (wherein j is a value between 1 and 7) are defined as the following Table 2. Also, all of the parameters $D_1$ to D7 in the following Table 2 are assumed to be independent.

TABLE 2

| Parameter | Definition |
| --- | --- |
| $D_1$ | Probability Ratio calculated on the basis of Lateral-Position Difference in Current Scanning Operation (Probability Ratio 1) |
| $D_2$ | Probability Ratio calculated on the basis of Relative-Velocity Difference in Current Scanning Operation (Probability Ratio 2) |
| $D_3$ | Probability Ratio calculated on the basis of Independent-Beam Inclination Difference in Current Scanning Operation (Probability Ratio 3) |
| $D_4$ | Probability Ratio calculated on the basis of Upward/Downward Beam Power-Difference Inclination in Current Scanning Operation (Probability Ratio 4) |
| $D_5$ | Probability Ratio calculated on the basis of Upward/Downward Beam Area Differential in Current Scanning Operation (Probability Ratio 5) |

TABLE 2-continued

| Parameter | Definition |
|---|---|
| $D_6$ | Probability Ratio calculated on the basis of Extrapolation Cause in Current Scanning Operation (Probability Ratio 6) |
| $D_7$ | Probability Ratio calculated on the basis of Upward/Downward Beam Comprehensive-Variation in Current Scanning Operation (Probability Ratio 7) |

In this case, the posterior probability $P(H_1/D)$ which is the probability that the target is a stationary vehicle given parameters D ($D_1$ to $D_7$) is expressed as the following Expression 8-1. Also, the posterior probability $P(H_2/D)$ which is the probability that the target is an upper object given parameters D ($D_1$ to $D_7$) is expressed as the following Expression 8-2.

$$P(H_1|D)=P(H_1|D_1,D_2,D_3,D_5,D_6,D_7) \quad \text{[Expression 8-1]}$$

$$P(H_2|D)=P(H_2|D_1,D_2,D_3,D_5,D_6,D_7) \quad \text{[Expression 8-2]}$$

In the case of using a naive Bayesian filter, whether a target is a stationary vehicle or an upper object is determined by the logit which is the logarithm of the ratio of the likelihood of being a stationary vehicle to the likelihood of being an upper object, like the following Expression 9.

$$Logit = \log\{P(H_1 \mid D)/P(H_2 \mid D)\} = \quad \text{[Expression 9]}$$
$$\log\{P(D \mid H_1)P(H_1)/P(D \mid H_2)P(H_2)\}$$

Herein, because the parameters D ($D_1$ to $D_7$) have been assumed to be independent, $P(D|H_1)$ and $P(D|H_2)$ are expressed as the following Expressions 10-1 and 10-2, respectively.

$$P(D|H_1)=P(D_1|H_1)P(D_2|H_1)P(D_3|H_1)P(D_4|H_1)P(D_5|H_1)P(D_6|H_1)P(D_7|H_1) \quad \text{[Expression 10-1]}$$

$$P(D|H_2)=P(D_1|H_2)P(D_2|H_2)P(D_3|H_2)P(D_4|H_2)P(D_5|H_2)P(D_6|H_2)P(D_7|H_2) \quad \text{[Expression 10-2]}$$

Using Expressions 10-1 and 10-2, Expression 9 is converted into the following Expressions 11-1 and 11-2.

[Expression 11]

$$Logit = \log\{(P(H_1 \mid D)/P(H_2 \mid D)\} = \quad (11\text{-}1)$$

| | |
|---|---|
| $\log\{P(D_1 \mid H_1)\} - \log\{P(D_1 \mid H_2)\} +$ | (referred to as a part $x_1$) |
| $\log\{P(D_2 \mid H_1)\} - \log\{P(D_2 \mid H_2)\} +$ | (referred to as a part $x_2$) |
| $\log\{P(D_3 \mid H_1)\} - \log\{P(D_3 \mid H_2)\} +$ | (referred to as a part $x_3$) |
| $\log\{P(D_4 \mid H_1)\} - \log\{P(D_4 \mid H_2)\} +$ | (referred to as a part $x_4$) |
| $\log\{P(D_5 \mid H_1)\} - \log\{P(D_5 \mid H_2)\} +$ | (referred to as a part $x_5$) |
| $\log\{P(D_6 \mid H_1)\} - \log\{P(D_6 \mid H_2)\} +$ | (referred to as a part $x_6$) |
| $\log\{P(D_7 \mid H_1)\} - \log\{P(D_7 \mid H_2)\} +$ | (referred to as a part $x_7$) |
| $\log\{P(H_1)\} - \log\{P(H_2)\}$ | (referred to as a part $x_8$) (11-2) |

If the first to eighth parts of Expression 11-2 are denoted by $x_1$, $x_2$, $x_3$, $x_4$, $x_5$, $x_6$, $x_7$, and $x_0$ respectively as shown in Expression 11-2, the Expression 11-2 is expressed as the following Expression 12.

$$Logit=(x_1+x_2+x_3+x_4+x_5+x_6+x_7)+x_0 \quad \text{[Expression 12]}$$

In Expression 12, the part in the parentheses can be interpreted as a generalized linear model using $x_1$ to $x_7$ as predictor variables. Therefore, in the second discriminating process, regression coefficients and intercepts are determined from multivariate analysis on the part in the parentheses of Expression 12, whereby the accuracy in discriminating between stationary vehicles and upper objects improves.

Target data which is used in determining whether a target is a stationary vehicle or an upper object is qualitative data, for example, data on stationary vehicles and upper objects. Also, it is impossible to assume that all of the predictor variables (the probability ratio 1 ($x_1$) to the probability ratio 7 ($x_7$)) have normality. Therefore, as a method for multivariate analysis, logistic regression analysis is used, and in view of multicollinearity and Akaike's information criterion (AIC), selection and integration of the predictor variables is performed to determine a regression coefficient (weight coefficient) and an intercept at each of the detection distances set at intervals of 10 m. In this case, with respect to each distance in the detection distance intervals, a regression coefficient (weight coefficient) and an intercept are calculated by linear interpolation.

In the second discriminating process, for example, in the case where the first detection distance of a target is a first distance between 80 m and 110 m, the weight-coefficient/intercept table A 63g (to be described below) is used to determine whether the target is a stationary vehicle or an upper object, and in the case where the first distance at which a target has been detected for the first time is not the first distance, the weight-coefficient/intercept table B 63h (to be described below) is used. As a result, the accuracy in discriminating between stationary vehicles and upper objects improves.

In the second discriminating process, the weight-coefficient/intercept table A 63g for recursively estimating individual probability ratios on the basis of a first detection distance at which a target is detected, and the weight-coefficient/intercept table B 63h for recursively estimating individual probability ratios on the basis of a first detection distance are used.

Figure 20A:
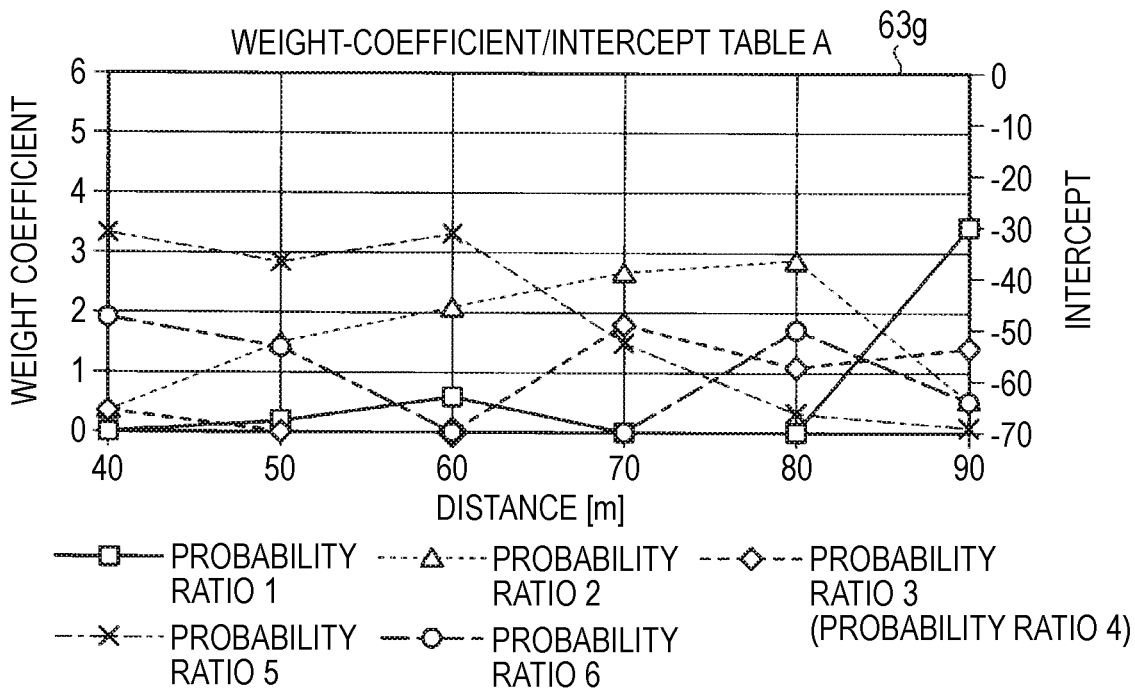
FIG. 20A is a view illustrating a weight-coefficient/intercept table A for recursively estimating individual probability ratios according to a first detection distance according to the embodiment.

FIG. 20A is a view illustrating the weight-coefficient/intercept table A for recursively estimating individual probability ratios on the basis of a first detection distance according to the embodiment.

Figure 20B:
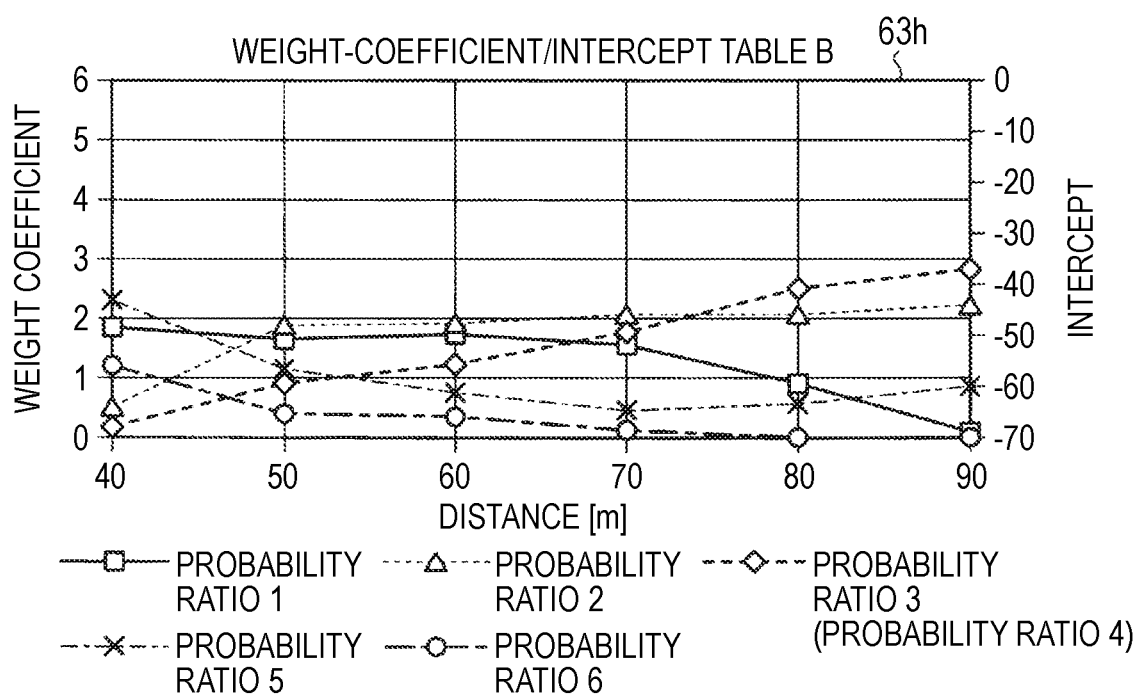
FIG. 20B is a view illustrating a weight-coefficient/intercept table B for recursively estimating individual probability ratios according to a first detection distance according to the embodiment.

FIG. 20B is a view illustrating the weight-coefficient/intercept table B for recursively estimating individual probability ratios on the basis of a first detection distance according to the embodiment.

In the weight-coefficient/intercept table A 63g shown in FIG. 20A, weight coefficients αi and intercepts β to be used to correct probability ratios i (wherein i is 1, 2, 3, 5, and 6) in the case where the first detection distance of a target is, for example, the first distance between 80 m and 110 m are stored in association with each detection distance. In the weight-coefficient/intercept table B 63h shown in FIG. 20B, weight coefficients αi and intercepts β to be used to correct probability ratios i (wherein i is 1, 2, 3, 5, and 6) in the case where the first detection distance of a target is a distance other than the first distance range are stored in association with each detection distance.

In FIG. 20A and FIG. 20B, by predictor variable (parameter) selection based on multicollinearity and AIC mentioned above, the parameters $D_1$ to $D_6$, i.e. the probability ratios 1 to 6 have been selected, and the probability ratio corresponding to the parameter $D_7$ has been excluded. Also, in FIG. 20A and FIG. 20B, the parameters $D_3$ and $D_4$, i.e. probability ratios 3 and 4 have been integrated into one by predictor variable (parameter) integration. Therefore, in FIG. 20A and FIG. 20B, weight coefficients αi (wherein i is 1, 2, 3, 5, and 6) and intercepts β corresponding to probability ratios 1 to 3 and probability ratios 5 and 6 are stored in association with each detection distance.

The unnecessary-target removing unit 76 performs regression correction on the probability ratios i (wherein i is 1 to 6) calculated in the same way as that of the first discriminating process described above, using weight coefficients and intercepts read from the weight-coefficient/intercept table A 63g or the weight-coefficient/intercept table B 63h, and calculates a corrected probability ratio OverAll on the basis of the following Expression 13.

[Corrected Probability Ratio OverAll] =     [Expression 13]

$$(\alpha_1 \times [\text{Probability Ratio 1}] + \beta) +$$
$$(\alpha_2 \times [\text{Probability Ratio 2}] + \beta) +$$
$$\alpha_3 \times \left(\frac{[\text{Probability Ratio 3}] + [\text{Probability Ratio 4}]}{2}\right) +$$
$$\beta + \alpha_5 \times [\text{Probability Ratio 5}] +$$
$$\beta + \alpha_6 \times [\text{Probability Ratio 6}] + \beta$$

In the case where the first detection distance is the above-mentioned first distance, the unnecessary-target removing unit 76 reads weight coefficient αi and intercepts β for the individual probability ratios i (wherein i is 1 to 6), corresponding to each distance at which a scanning operation has been performed, from the weight-coefficient/intercept table A 63g. Meanwhile, in the case where a first detection distance is not the above-mentioned first distance, the unnecessary-target removing unit 76 reads weight coefficients αi and intercepts β for the individual probability ratios i (wherein i is 1 to 6), corresponding to each distance at which a scanning operation has been performed, from the weight-coefficient/intercept table B 63h. Variations in weight coefficients αi (wherein i is 1 to 6) and intercepts β which are read according to target detection distances from the weight-coefficient/intercept table A 63g in the case where the first detection distance is the first distance, are relatively larger than variations in weight coefficients αi (wherein i is 1 to 6) and intercepts β which are read from the weight-coefficient/intercept table B 63h according to target detection distances in the case where the first detection distance is not the first distance. From the read weight coefficients αi and the read intercepts β for the individual probability ratios i (wherein i is 1 to 6) and the individual probability ratios i, the unnecessary-target removing unit 76 calculates the corrected probability ratio OverAll on the basis of Expression 13.

In the second discriminating process, with respect to probability ratios which are updated by Bayesian updating whenever a scanning operation is performed, when a probability ratio OverAll is calculated from the individual parameters (probability ratios 1 to 6), weighting using weight coefficients and intercepts depending on the first detection distance of a target and obtained by logistic regression analysis is performed. Therefore, in the second discriminating process, it is possible to improve the accuracy in discriminating between stationary vehicles and upper objects.

Also, as described above, the probability ratio 1 is the logarithm of the ratio of the likelihood of being a stationary vehicle to the likelihood of being an upper object obtained on the basis of the parameter "Lateral-Position Difference". The probability ratio 2 is the logarithm of the ratio of the likelihood of being a stationary vehicle to the likelihood of being an upper object obtained on the basis of the parameter "Relative-Velocity Difference". The probability ratio 3 is the logarithm of the ratio of the likelihood of being a stationary vehicle to the likelihood of being an upper object on the basis of the parameter "Independent-Beam Inclination Difference". The probability ratio 4 is the logarithm of the ratio of the likelihood of being a stationary vehicle to the likelihood of being an upper object obtained on the basis of the parameter "Upward/Downward Beam Power Difference Inclination". The probability ratio 5 is the logarithm of the ratio of the likelihood of being a stationary vehicle to the likelihood of being an upper object on the basis of the parameter "Upward/Downward Beam Area Differential". The probability ratio 6 is the logarithm of the ratio of the likelihood of being a stationary vehicle to the likelihood of being an upper object obtained on the basis of the parameter "Extrapolation Cause".

Now, features of the weight coefficients for the probability ratios included in the weight-coefficient/intercept table A 63g shown in FIG. 20A will be described. Weight coefficients al for the probability ratio 1 to be used in the case where the distance is relatively short (for example, 80 m or less) are larger than weight coefficients al to be used in the case where the distance is relatively long (for example, a distance longer than 80 m). As compared to the case where the distance of the target is relatively short, in the case where the distance is relatively long, since the lateral-position differences of upper objects become larger, in determining whether a target is a stationary vehicle or an upper object, the importance of the parameter "Lateral-Position Difference" becomes higher. For this reason, a weight coefficient α1 for the probability ratio 1 to be used in the case where the distance of the target is longer is set to be larger than a weight coefficient al for the probability ratio 1 to be used in the case where the distance is relatively shorter.

Also, weight coefficients α2 for the probability ratio 2 to be used in the case where the distance is relatively short are larger than weight coefficients α2 to be used in the case where the distance is relatively long. The reason is that as the distance decreases, since the intensities of the reflected waves from the target increase, and it is possible to more accurately calculate the relative-velocity difference of the target, the importance of the parameter "Relative-Velocity Difference" in determining whether the target is a stationary vehicle or an upper object becomes higher. However, if the distance of the target further decreases (for example, if the distance becomes 60 m or less), smaller weight coefficients α2 are used. The reason is that as the distance further decreases, the target disappears from the transmission range of the transmission wave of the radar device 1, so any reflected wave is not received.

Further, weight coefficients α5 for the probability ratio 5 to be used in the case where the distance is relatively short are larger than weight coefficients α5 to be used in the case where the distance is relatively long. The reason is that as the distance decreases, it is possible to acquire more area differentials, so the importance of the parameter "Upward/Downward Beam Area Differential" in determining whether the target is a stationary vehicle or an upper object becomes higher. As described above, with a focus on variations in the values of the various parameters according to the distance of a stationary vehicle and variations in the values of various parameters according to the distance of an upper object, weight coefficients for the various parameters are set to vary depending on target distances. Therefore, it is possible to accurately discriminate between stationary vehicles and upper objects.

Also, in the case where a distance (a first detection distance) at which the radar device 1 has detected a target of an object for the first time is not the first distance (for example, between 80 m and 110 m), weight coefficients αi are calculated on the basis of the weight-coefficient/intercept table B 63$h$ shown in FIG. 20B. Meanwhile, when the first detection distance of a target is the first distance, weight coefficients αi are calculated on the basis of the weight-coefficient/intercept table A 63$g$ shown in FIG. 20A. Like this, in calculating weight coefficients αi, weight coefficients αi are calculated on the basis of the weight-coefficient/intercept table B 63$h$ shown in FIG. 20B, and if the distance of a target becomes a specific distance like the first distance, weight coefficients αi are calculated on the basis of another table (for example, the weight-coefficient/intercept table A 63$g$ shown in FIG. 20A) having different weight coefficients for the same parameters. Therefore, on the basis of the distance of a target, optimum weighting may be performed on the parameters which are used to determine the type of the target, and the type of the target may be reliably determined.

[Modification of First and Second Discriminating Processes]

(1) Regarding Probability Ratio OverAll

In the first discriminating process, in the case where the probability ratio OverAll of a target is equal to or larger than the threshold, it is determined that the target is a stationary vehicle; whereas in the case where the probability ratio OverAll is smaller than the threshold, it is determined that the target is an upper object. The same is true for each corrected probability ratio OverAll of the second discriminating process. However, determination on whether a target is a stationary vehicle or an upper object is not limited thereto. In the case of performing determination by comparing the certainty of being a stationary vehicle with a predetermined threshold, a value based on a probability ratio OverAll may be used as a magnification ratio C by which the certainty of being a stationary vehicle is multiplied. In other words, the product of the magnification ratio C and the certainty of being a stationary vehicle is calculated as the certainty of being a stationary vehicle to be compared with the predetermined threshold for determination, and in the case where the certainty is equal to or larger than the predetermined threshold, it is determined that the corresponding target is a stationary vehicle.

Herein, the certainty of being a stationary vehicle is an index which indicates whether the target data item is a data item on a stationary vehicle and may take a value, for example, between 0 and 100, and as the value of the certainty increases, the likelihood of being a stationary vehicle increases. The certainty of being a stationary vehicle is calculated using a plurality of information items included in a target data item (such as the longitudinal distance, the angle power, the extrapolation frequency, and so on).

For example, it is assumed that two thresholds, i.e. a first threshold and a second threshold (smaller than the first threshold) are provided. In the case where the probability ratio OverAll is equal to or larger than the first threshold, the magnification ratio C is set to 1. Since it is possible to determine that the certainty of being a stationary vehicle is high, the certainty of being a stationary vehicle will be compared with the predetermined threshold, without any change, in order to determine whether the target is a stationary vehicle. Meanwhile, in the case where a probability ratio OverAll is equal to or smaller than the second threshold, the magnification ratio C is set to 0. Since it is possible to determine that the certainty of being a stationary vehicle is low, 0 is set so as to make the certainty of being a stationary vehicle 0 in order to prevent the target from being determined as being a stationary vehicle.

Also, in the case where the probability ratio OverAll is smaller than the first threshold and larger than the second threshold, the magnification ratio C is calculated by "([Probability Ratio OverAll]−[Second Threshold])/([First Threshold]−[Second Threshold])". In other words, the magnification ratio C indicates the ratio of the excess of the probability ratio OverAll over the second threshold to the excess of the first threshold over the second threshold. For example, the case where the magnification ratio C is 0.5 represents that the product of 0.5 and the certainty of being a stationary vehicle will be compared with the predetermined threshold to determine whether the target is a stationary vehicle.

As described above, the probability ratio OverAll is converted into a magnification ratio C by which the certainty of being a stationary vehicle is multiplied in order to broaden the line of determining whether a target is a stationary vehicle. Therefore, it is possible to more comprehensively discriminate stationary vehicles in view of various factors.

(2) Regarding Discriminating Between Stationary Vehicles and Targets Other than Stationary Vehicles The first and second discriminating processes use the Bayesian filter method of updating the logarithm of the ratio of the likelihood of being a stationary vehicle to the likelihood of being an upper object, corresponding to each of the various parameters, on the basis of the likelihood models constructed by calculating the various parameters related to each of stationary vehicles and upper objects detected by each target detection operation and representing the correlation between the corresponding parameter and the likelihood of being a stationary vehicle and the correlation between the corresponding parameter and the likelihood of being an upper object with respect to each detection distance, and determining whether a target is a stationary vehicle or an upper object. However, the Bayesian filter method is not limited thereto, and may also be applied to discriminate between stationary vehicles and targets other than stationary vehicles (for example, lower objects and the like).

For example, likelihood models representing the correlation between each of various parameters and the likelihood of being a stationary vehicle and the correlation between the corresponding parameter and the likelihood of being a target other than stationary vehicles with respect to each detection distance are constructed in advance by calculating the various parameters related to each of stationary vehicles and targets other than stationary vehicles whenever target detection is performed. These likelihood models may be used to update the logarithm of the ratio of the likelihood of being a stationary vehicle to the likelihood of being an upper object, corresponding to each of the various parameters, and determine whether a target is a stationary vehicle or a target other than stationary vehicles.

(Third Discriminating Process of Discriminating Between Stationary Vehicles and Upper Objects According to Embodiment)

Now, a third discriminating process of discriminating between stationary vehicles and upper objects according to the embodiment will be described. Hereinafter, the differences from the first discriminating process will be mainly described, and a description of some parts will not be made to avoid duplicate content.

In the above-described first discriminating process, in the unnecessary-target removing process, a probability ratio OverAll is used as an index to determine whether a target is a stationary vehicle or an upper object (hereinafter, also referred to as determination on a target). Also, a probability ratio OverAll is an example of a first index.

As described above with respect to FIG. 19, some probability ratios OverAll may be acquired from stationary vehicles and may also be acquired from upper objects. For this reason, in the third discriminating process, an index different from a probability ratio OverAll is additionally used in order to perform determination on a target.

Therefore, in the third discriminating process, for example, even in the case where it is difficult to clearly determine whether a target is a stationary vehicle or an upper object on the basis of a probability ratio OverAll, it is possible to perform determination on the target with high accuracy.

Specifically, in the case where a target (a target T) is, for example, a stationary vehicle (the target T1), as the vehicle A equipped with the radar device 1 (see FIG. 1) gets closer to the stationary vehicle, the reflected wave from the stationary vehicle more easily enters the front surface of the receiving unit RX. Therefore, in the radar device, the angle power which is the reception power of the reflected wave tends to increase.

Meanwhile, in the case where a target is an upper object (the target T2), as the vehicle gets closer to the upper object, the upper object gradually disappears from the main transmission range of the transmission wave. Therefore, in the radar device 1, the angle power tends to attenuate or rarely change.

For this reason, in the third discriminating process, in view of the feature that in the case where a target is an upper object, the angle power is likely to attenuate, a second index representing the amount of attenuation in the angle power according to the detection distance of each target (the longitudinal distance to the target) is calculated, and on the basis of the second index, determination on the corresponding target is performed. As the second index, for example, an attenuation amount area A1 (see FIG. 21A and so on) may be used, and this case will be described below.

Also, in the third discriminating process, in view of the feature that in the case where a target is a stationary vehicle, the angle power is likely to increase, a third index representing the amount of increase in the angle power according to the detection distance of each target is calculated, and on the basis of the third index, determination on the corresponding target is performed. As the third index, for example, an increase amount area A2 (see FIG. 22A and so on) to be described below may be used.

Hereinafter, first, an attenuation amount area A1 which is the second index will be described. The unnecessary-target removing unit 76 calculates an attenuation amount area A1 on the basis of the following Expression 14.

[Attenuation Amount Area A1]=Σ{([Current Angle Power]−[Reference Power])×[Difference between Previous Distance and Current Distance]}    [Expression 14]

Figure 21A:
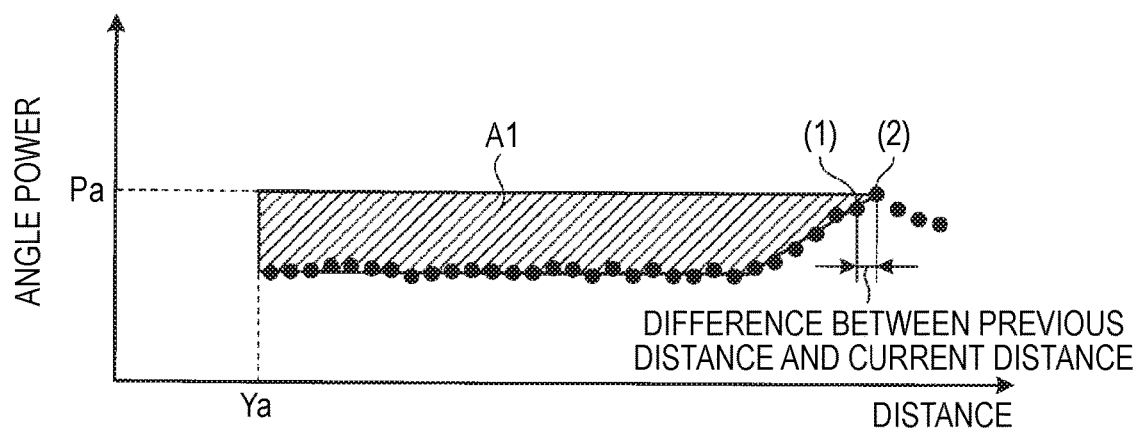
FIG. 21A is a view for explaining an attenuation-amount area calculating method according to the embodiment.
Figure 21B:
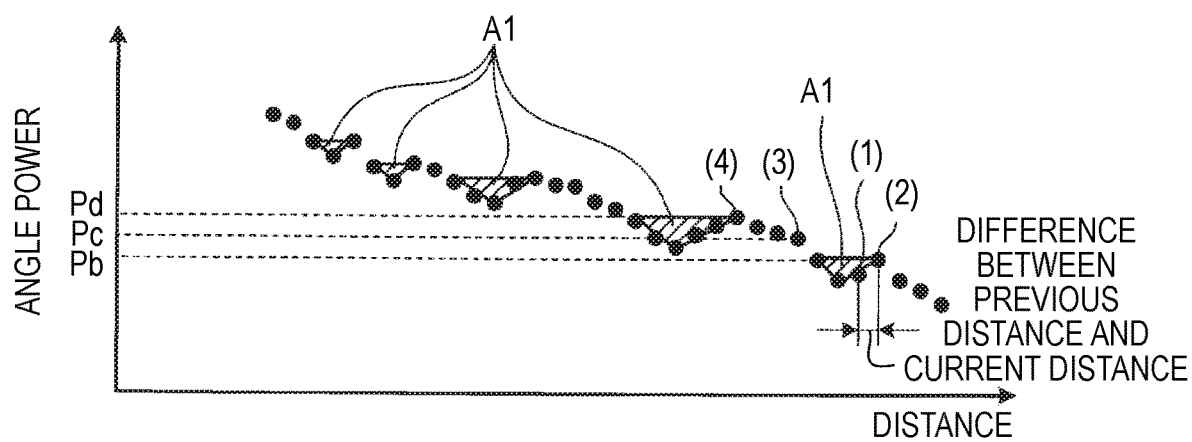
FIG. 21B is a view for explaining the attenuation-amount area calculating method according to the embodiment.

FIGS. 21A and 21B are views for explaining a method of calculating an attenuation amount area A1 according to the embodiment. Also, FIGS. 21A and 21B are graphs having horizontal axes indicating distance (detection distance) and vertical axes indicating angle power. Also, FIG. 21A is an example of a graph which may be obtained in the case where a target is an upper object, and FIG. 21B is an example of a graph which may be obtained in the case where a target is a stationary vehicle.

In the case where an angle power obtained in the current process corresponds to (1) shown in FIG. 21A, the unnecessary-target removing unit 76 sets the maximum value of the angle powers obtained in the past and current processes is set as a reference power. In the example shown in FIG. 21A, an angle power Pa (corresponding to (2) shown in FIG. 21A) obtained in the previous process is the maximum value. Therefore, the unnecessary-target removing unit 76 sets the angle power Pa as a reference power.

Then, the unnecessary-target removing unit 76 subtracts the reference power (corresponding to (2) shown in FIG. 21A) from the angle power acquired in the current process (corresponding to (1) shown in FIG. 21A) and obtains the product of the calculated difference and the distance difference between the distance detected in the previous process and the distance detected in the current process (the difference between the previous distance and the current distance). As shown in Expression 14, the unnecessary-target removing unit 76 performs such a calculation whenever the angle power of the same target is obtained, and calculates the sum of the results of such calculations as the attenuation amount area A1. In other words, the unnecessary-target removing unit 76 calculates the attenuation amount area A1, for example, using sectional mensuration.

As shown in FIG. 21A, in the case where a target is an upper object, as the vehicle is getting closer to the upper object, the angle power attenuates. Therefore, whenever the process of calculating Expression 14 is repeated, the attenuation amount area A1 increases. In FIG. 21A, the hatched part represents the attenuation amount area A1 which is obtained when the target is at a distance Ya.

In contrast with this, in the case where a target is a stationary vehicle, as shown in FIG. 21B, the attenuation amount area A1 is more unlikely to increase as compared to the case of an upper object. Specifically, in the case where the angle power obtained in the current process corresponds to, for example, (1) shown in FIG. 21B, since an angle power Pb obtained in the previous process (corresponding to (2) shown in FIG. 21B) is the maximum value, the unnecessary-target removing unit 76 sets the angle power Pb as a reference power.

Then, the unnecessary-target removing unit 76 calculates the attenuation amount area A1 by subtracting the reference power (corresponding to (2) shown in FIG. 21B) from the angle power acquired in the current process (corresponding to (1) shown in FIG. 21B) and obtaining the product of the calculated difference and the distance difference between the distance detected in the previous process and the distance detected in the current process (the difference between the previous distance and the current distance), and adding the product to the previous attenuation amount area.

In the case where a target is a stationary vehicle, the angle power may temporarily attenuate for a certain reason such as the influence of multipath; however, basically, the angle power increases as the vehicle is getting closer to the stationary vehicle. Therefore, in the example of FIG. 21B, for example, in the case where an angle power Pc (corresponding to (3) shown in FIG. 21B) has been obtained in the current process, since the angle power Pc is larger than the angle power Pb set as the reference power, the unnecessary-target removing unit 76 updates the reference power with the angle power Pc which is the new maximum value.

In this case, since both of the terms "[Current Angle Power]" and "[Reference Power]" in Expression 14 become the angle power Pc, the value of the part "[Current Angle Power]−[Reference Power]" becomes zero. Therefore, the attenuation amount area A1 does not increase.

Also, in the example of FIG. 21B, until an angle power Pd shown by (4) in FIG. 21B is obtained, since the angle power continuously increases, the reference power is continuously updated, so the attenuation amount area A1 does not increase. In the case where a target is a stationary vehicle, for example, in the example of FIG. 21B, after the angle power Pd shown by (4) is obtained, only when the angle power temporarily attenuates for a certain reason such as the influence of multipath, the attenuation amount area A1 increases only slightly.

Next, the unnecessary-target removing unit 76 compares the attenuation amount area A1 calculated as described above, with a threshold A1a, and in the case where the attenuation amount area A1 is equal to or larger than the threshold A1a, the unnecessary-target removing unit determines that the target is an upper object. Meanwhile, in the case where the attenuation amount area A1 is smaller than the threshold A1a, the unnecessary-target removing unit 76 determines that the target is not an upper object, i.e. the probability of being a stationary vehicle is high.

As described above, in the third discriminating process, since the attenuation amount area A1 representing the amount of attenuation in the angle power according to the target detection distance is used, it is possible to determine whether the target is a stationary vehicle or an upper object, with high accuracy. In other words, since determination is performed on the basis of the sum of the amounts of attenuation in the signal power obtained with respect to the target in a plurality of target detecting processes, as compared to the case of performing determination on the basis of the instantaneous value of the amount of attenuation in the signal power obtained with respect to the target in one target detecting process, it is possible to more accurately determine whether the target is a stationary vehicle or an upper object.

Also, in the third discriminating process, in the case where the angle power obtained in the current process is larger than the reference power used in the previous process, the reference power is updated with the angle power obtained in the current process.

Therefore, for example, in the case where a target is a stationary vehicle and the angle power shows a tendency to continuously increase (see FIG. 21B), it is possible to prevent the attenuation amount area A1 from easily increasing. Therefore, when the attenuation amount area A1 is compared with the threshold A1a, if the attenuation amount area A1 is smaller than the threshold A1a, it is possible to determine that the probability that the target is a stationary vehicle is high.

Now, an increase amount area A2 which is a third index will be described. The unnecessary-target removing unit 76 calculates an increase amount area A2 on the basis of the following Expression 15.

$$[\text{Increase Amount Area A2}] = \Sigma\{([\text{Current Angle Power}] - [\text{Reference Value}]) \times [\text{Difference between Previous Distance and Current Distance}]\} \quad [\text{Expression 15}]$$

Figure 22A:
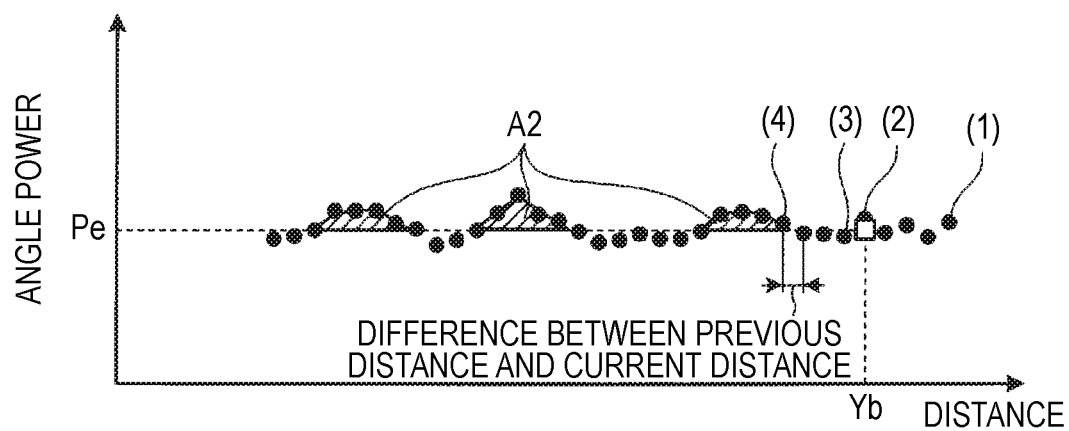
FIG. 22A is a view for explaining an increase-amount area calculating method according to the embodiment.
Figure 22B:
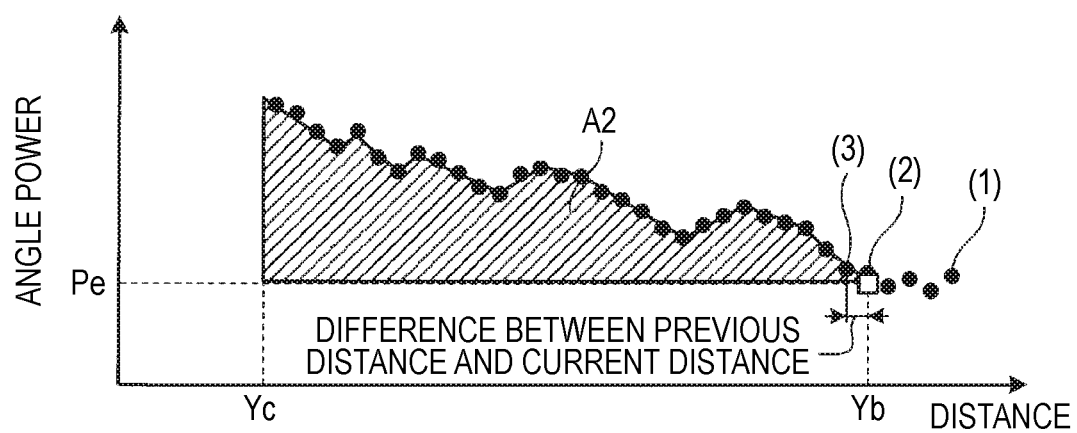
FIG. 22B is a view for explaining the increase-amount area calculating method according to the embodiment.

FIGS. 22A and 22B are views for explaining the method of calculating an increase amount area A2 according to the embodiment. Also, FIGS. 22A and 22B are graphs having horizontal axes indicating distance (detection distance) and vertical axes indicating angle power. Also, FIG. 22A is an example of a graph which may be obtained in the case where a target is an upper object, and FIG. 22B is an example of a graph which may be obtained in the case where a target is a stationary vehicle. Also, FIG. 22A shows an example of a state where the angle power which is obtained in the case where a target is an upper object rarely changes.

First, with reference to FIG. 22B, the method of calculating an increase amount area A2 will be described below. The unnecessary-target removing unit 76 sets a reference value on the basis of angle powers obtained at target detection distances equal to or longer than a predetermined distance Yb.

Specifically, the unnecessary-target removing unit 76 calculates the average of angle powers corresponding to target distances equal to or longer than the predetermined distance Yb, i.e. the angle powers from an angle power corresponding to (1) shown in FIG. 22B to an angle power corresponding to (2) shown in FIG. 22B. Then, the unnecessary-target removing unit 76 sets the average value (referred to as the angle power Pe) as a reference value. In FIG. 22B and FIG. 22A to be described below, reference values are shown by white square marks.

As the predetermined distance Yb, an arbitrary distance may be set. For example, a comparatively long distance, specifically, such a distance that the reference value may be set when the radar device 1 is far from the target may be set.

Subsequently, the unnecessary-target removing unit 76 subtracts the reference value (herein, the angle power Pe) from the angle power obtained in the current process (corresponding to, for example, (3) shown in FIG. 22B), thereby obtaining the difference. Then, the unnecessary-target removing unit 76 obtains the product of the obtained difference and the distance difference between the distance detected in the previous process and the distance detected in the current process (the difference between the previous distance and the current distance). The unnecessary-target removing unit performs such a calculation whenever the angle power of the same target is obtained, and calculates the sum of the results of such calculations as the increase amount area A2.

As shown in FIG. 22B, in the case where the target is a stationary vehicle, as the vehicle gets closer to the stationary vehicle, the angle power increases. Therefore, whenever the process of calculating Expression 15 is repeated, the increase amount area A2 increases. In FIG. 22B, the hatched part represents the increase amount area A2 which is obtained when the target is at a distance Yc.

Meanwhile, as shown in FIG. 22A, in the case where the target is an upper object, since the angle power rarely changes, the increase amount area A2 is more unlikely to increase as compared to the case when the target is a stationary vehicle. More specifically, the unnecessary-target removing unit 76 sets the average (the angle power Pe) of angle powers corresponding to target distances equal to or longer than the predetermined distance Yb, i.e. the angle powers from an angle power corresponding to (1) shown in FIG. 22A to an angle power corresponding to (2) shown in FIG. 22A, as a reference value.

Subsequently, the unnecessary-target removing unit 76 subtracts the reference value (herein, the angle power Pe) from an angle power obtained in the current process (corresponding to, for example, (3) shown in FIG. 22A), thereby obtaining the difference.

Herein, the increase amount area A2 is an index indicating the amount of increase in the angle power as described above. Therefore, in the case where the obtained difference is a negative value, i.e. in the case where the angle power has attenuated, it does not necessarily need to reflect the obtained difference in the increase amount area A2.

Specifically, only when the difference obtained by subtracting the reference value from the angle power obtained in the current process is a positive value, the unnecessary-target removing unit 76 may obtain the product of the obtained difference and the difference between the previous distance and the current distance, and adds the product to the previous increase amount area, thereby obtaining the increase amount area A2.

In FIG. 22A, the angle power shown by (3) is smaller than the reference value (herein, the angle power Pe). Therefore, the difference between them is a negative value. Therefore, this difference is not reflected in the increase amount area A2. Also, in the example of FIG. 22A, when the reference value is subtracted from the angle power shown by (4), the difference is a positive value. Therefore, the unnecessary-target removing unit 76 calculates the product of the obtained difference and the difference between the previous distance and the current distance, and reflects the product in the increase amount area A2. In this way, only the amounts of increase in the angle power are summed up to obtain the increase amount area A2. Therefore, it is possible to improve the accuracy of determination on the target to be described below.

In the example of FIG. 22A, since the angle power rarely changes, even though the angle power temporarily increases to a value larger than the reference value due to the influence of multipath, the increase amount area A2 only slightly increases.

Next, the unnecessary-target removing unit 76 compares the increase amount area A2 calculated as described above, with a threshold A2a, and in the case where the increase amount area A2 is smaller than the threshold A2a, the unnecessary-target removing unit determines that the target is an upper object. Meanwhile, in the case where the increase amount area A2 is equal to or larger than the threshold A2a, the unnecessary-target removing unit 76 determines that the target is not an upper object, i.e. the possibility of being a stationary vehicle is high.

As described above, in the third discriminating process, since the increase amount area A2 representing the amount of increase in the angle power according to the target detection distance, it is possible to determine whether the target is a stationary vehicle or an upper object, with high accuracy.

Also, in calculating the attenuation amount area A1 or the increase amount area A2, as the angle power obtained in the current process, an instantaneous value is used. Therefore, it is possible to improve responsiveness in performing determination on the target. Although instantaneous values of the angle power may be dispersed, since the attenuation amount area A1 or the increase amount area A2 is the sum of instantaneous values, it is unlikely to be significantly influenced by such dispersion.

As described above, in the third discriminating process, the attenuation amount area A1 or the increase amount area A2 is used to perform determination on the target. Therefore, in the case where instantaneous values of the angle power clearly represent that the target is an upper object, regardless of the probability ratio OverAll, it is possible to determine that the target is an upper object.

Therefore, in the third discriminating process, for example, even in the case where it is difficult to clearly determine whether a target is a stationary vehicle or an upper object, on the basis of the probability ratio OverAll, it is possible to perform determination on the target with high accuracy.

Also, in the third discriminating process, both of an attenuation amount area A1 and an increase amount area A2 may be used to perform determination on a target. In this case, it is possible to accurately perform determination on the target.

For a certain reason such as the influence of multipath, the value of the angle power may drastically change. For this reason, even though a target is an upper object, for example, some instantaneous values of the angle power may cause one of the attenuation amount area A1 and the increase amount area A2 not to have a value representing that the target is an upper object.

Even in this case, if the other one of the attenuation amount area A1 and the increase amount area A2 have a value representing that the target is an upper object, it becomes possible to determine that the target is an upper object. In other words, in the third discriminating process, it is possible to reduce the influence of multipath, and thus it is possible to accurately perform determination on a target.

Specifically, although a target is an upper object, if the height of the upper object from the road is less than a certain value, the attenuation amount area A1 may become less than the threshold A1a. In such a case, the value of the increase amount area A2 of the upper object having the height less than the certain value from the road becomes smaller than the threshold A2a. The reason is that since the heights of upper objects from the road are higher than the heights of stationary vehicles, upper objects are unlikely to be influenced by multipath, so the increase amount areas A2 of upper objects are smaller than those of stationary vehicles. As described above, in the case where a target is an upper object, even though the attenuation amount area A1 shows a tendency to change like that of a stationary vehicle does, if the increase amount area A2 is used to perform determination, it is possible to accurately determine the type of the target.

In the case where it is only required to accurately discriminate upper objects, it may be considered to use only the increase amount area A2 is used to determine whether a target is an upper object. However, even in the case where a target is a stationary vehicle (for example, a truck), if the height of the body of the stationary vehicle from the road is equal to or higher than a certain value, the angle power is likely to be influenced by multipath. For this reason, not only determination using the increase amount area A2 having a feature that remarkably appears in the case where a target is a stationary vehicle, but also determination using the attenuation amount area A1 having a feature that remarkably appears in the case where a target is an upper object is performed. In this case, on the basis of the plurality of criteria for determination, targets satisfying all conditions for stationary vehicles are determined as being stationary vehicles.

[Modification of Third Discriminating Process]

Now, a modification of the third discriminating process will be described. In the modification of the third discriminating process, similarly to the modification of the first and second discriminating processes, a value based on the attenuation amount area A1 or the increase amount area A2 may be used as a magnification ratio C by which the certainty of being a stationary vehicle is multiplied.

Specifically, for example, in the case where the attenuation amount area A1 is equal to or larger than the threshold A1a, the magnification ratio C may be set to 0 since it is possible to determine that the target is an upper object. In this case, the certainty of being a stationary vehicle becomes 0. Therefore, it may be possible to prevent the target from being determined as being a stationary vehicle.

Similarly, for example, in the case where the increase amount area A2 is smaller than the threshold A2a, since it is possible to determine that the target is an upper object, the magnification ratio C is set to 0, whereby the certainty of being a stationary vehicle becomes 0. Therefore, it is possible to prevent the target from being determined as being a stationary vehicle.

Although the case where the attenuation amount area A1 or the increase amount area A2 is converted into a magnification ratio C has been described above, the present invention is not limited thereto. For example, the attenuation amount area A1 or the increase amount area A2 may be converted into any other value, for example, a value to be added to or subtracted from the certainty of being a stationary vehicle.

Also, in the above-described third discriminating process, the processes of calculating the attenuation amount area A1 and the increase amount area A2 and the processes of comparing the attenuation amount area A1 and the increase amount area A2 with the thresholds A1a and A2a are performed after the process of calculating the probability ratio OverAll. However, the present invention is not limited thereto. Those processes such as the processes of calculating the attenuation amount area A1 and the increase amount area A2 may be performed before the process of calculating the probability ratio OverAll, or may be performed at the same time as the process of calculating the probability ratio OverAll.

Also, in the third discriminating process, both of the attenuation amount area A1 and the increase amount area A2 which are the second and third indexes are used to perform determination on a target. However, the present invention is not limited thereto. For example, any one of the second and third indexes may be used.

(Fourth Discriminating Process of Discriminating Between Stationary Vehicles and Upper Objects According to Embodiment)

Figure 23A:
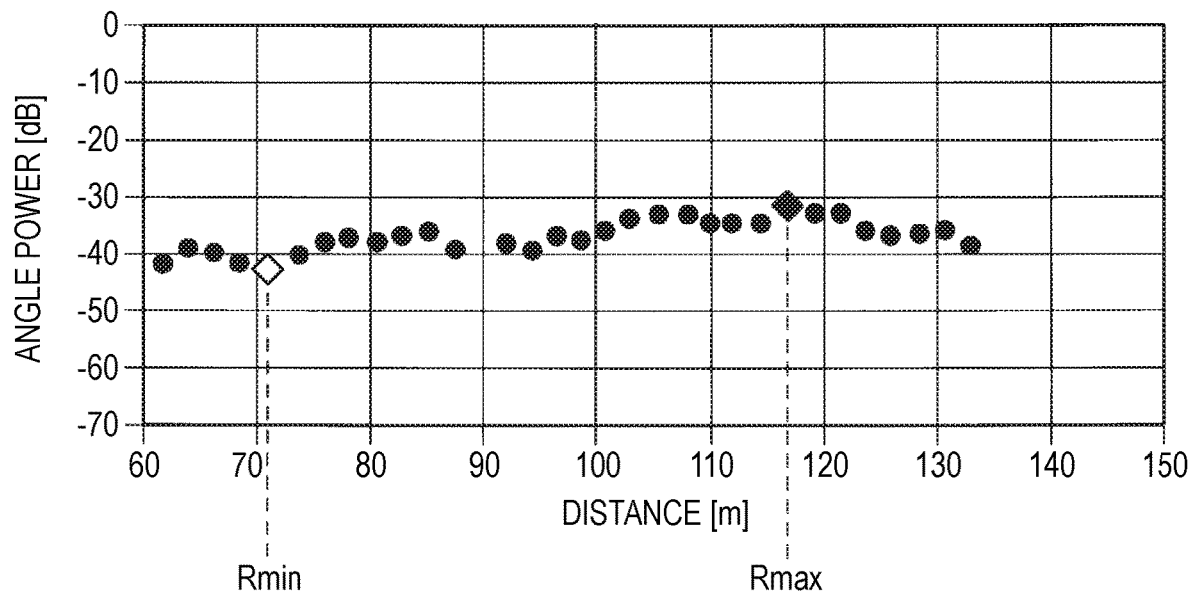
FIG. 23A is a view illustrating the relation between the angle powers and distances of an upper object according to the embodiment.
Figure 23B:
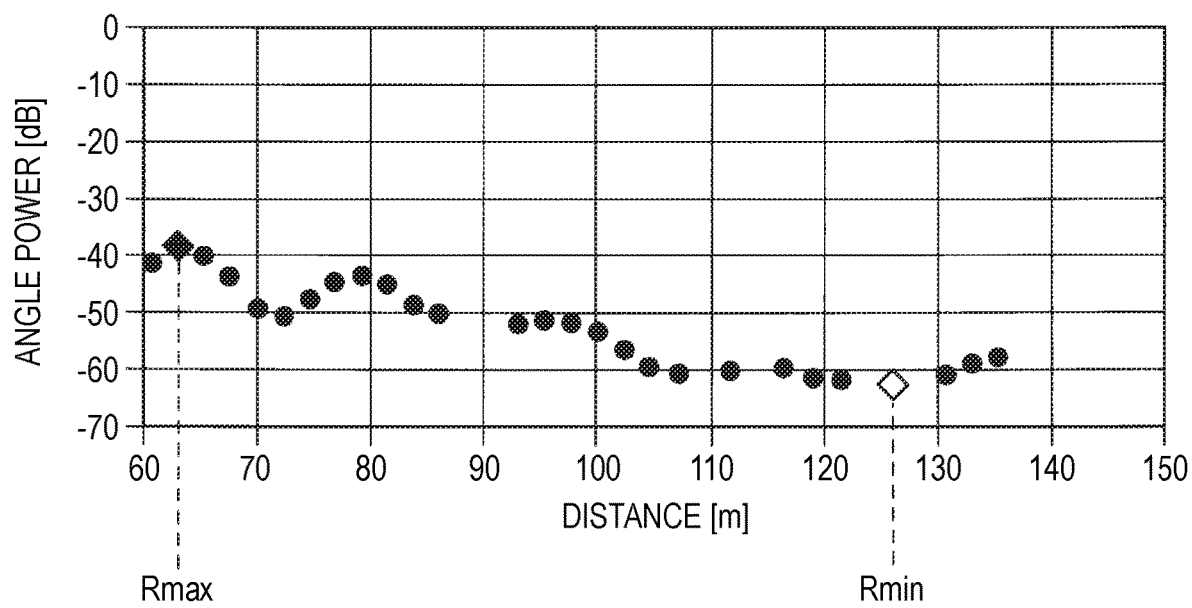
FIG. 23B is a view illustrating the relation between the angle powers and distances of a stationary vehicle according to the embodiment.
Figure 24A:
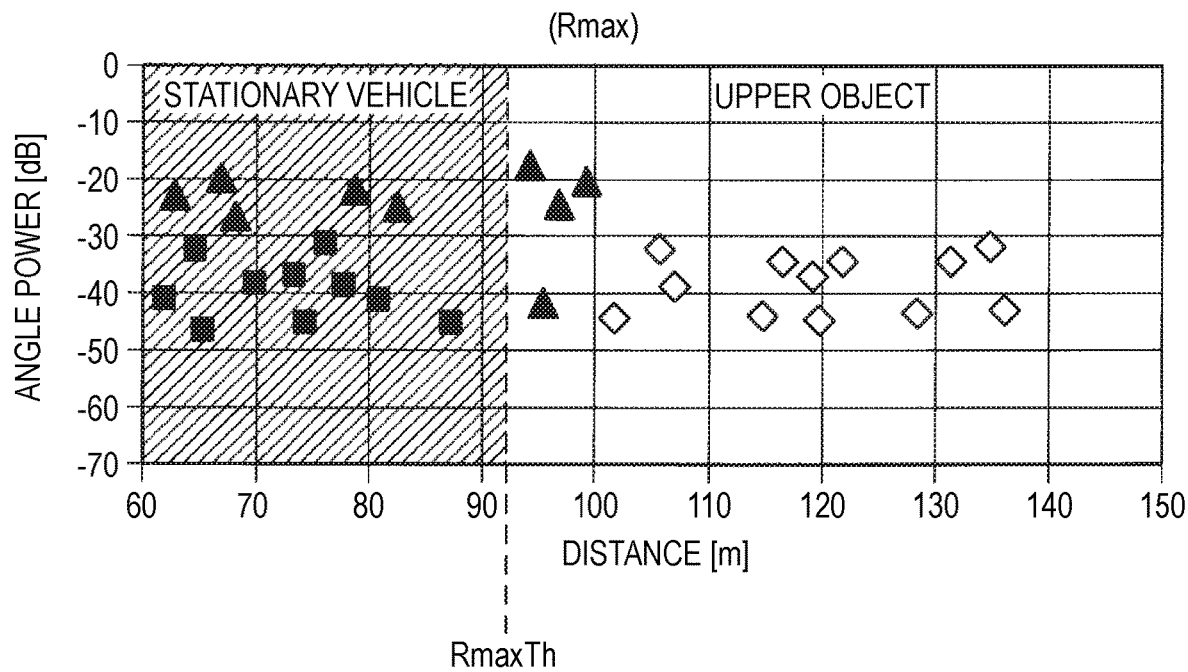
FIG. 24A is a view for explaining an upper-object discriminating method according to the embodiment which is performed on the basis of a distance at which the maximum value of angle powers has been detected and a distance at which the minimum value has been detected.
Figure 24B:
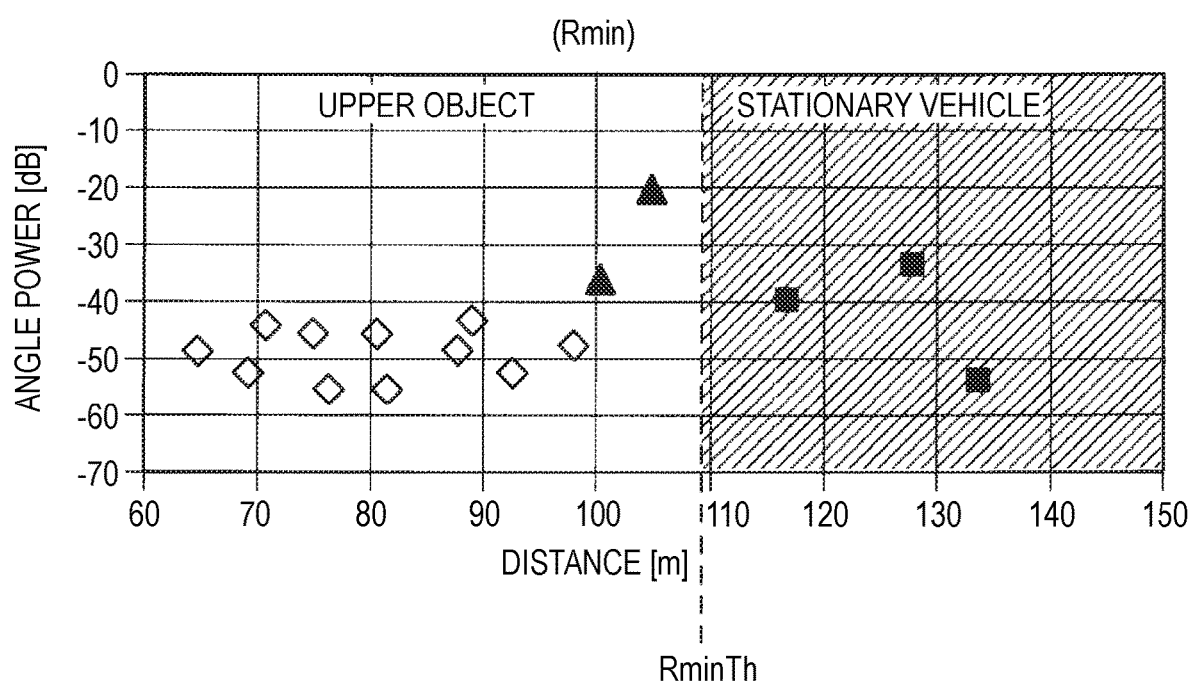
FIG. 24B is a view for explaining the upper-object discriminating method according to the embodiment which is performed on the basis of a distance at which the maximum value of angle powers has been detected and a distance at which the minimum value has been detected.
Figure 24C:
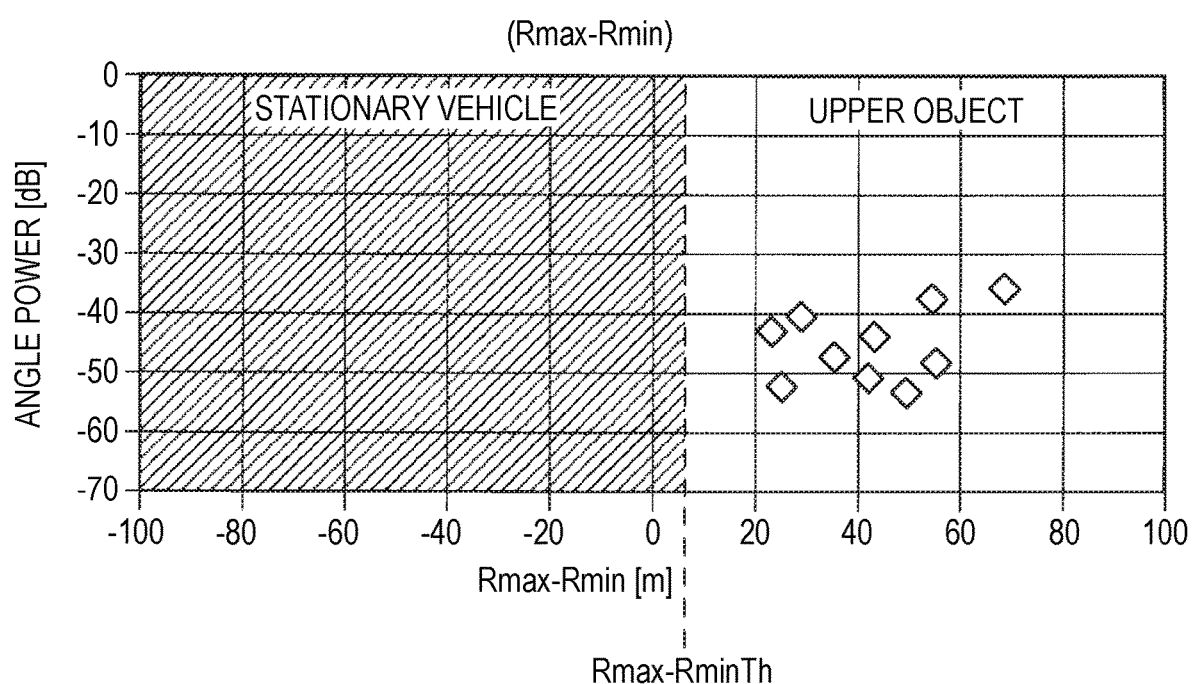
FIG. 24C is a view for explaining the upper-object discriminating method according to the embodiment which is performed on the basis of a distance at which the maximum value of angle powers has been detected and a distance at which the minimum value has been detected.

Now, a fourth discriminating process of discriminating between stationary vehicles and upper objects according to the embodiment will be described with reference to FIG. 23A to FIG. 24C. FIG. 23A is a view illustrating the relation between the angle power and distance of an upper object according to the embodiment. FIG. 23B is a view illustrating the relation between the angle power and distance of a stationary vehicle according to the embodiment. Also, FIG. 24A to FIG. 24C are views for explaining a method of discriminating an upper object on the basis of a distance at which the maximum value of the angle power has been detected and a distance at which the minimum value of the angle power has been detected, according to the embodiment.

In the above-described third discriminating process, whether a target is a stationary vehicle or an upper object is determined by setting a reference power for the angle power, and comparing the amount of attenuation or the amount of increase from the reference power according to the target detection distance, with the threshold.

However, since the amount of attenuation or the amount of increase in the angle power from the reference power depends on the reference power setting method, when a certain value is set as the reference power, the amount of attenuation or the amount of increase may become unintended abnormal values. Also, in the case where the radar device 1 is configured to have improved general-purpose capacities, it becomes difficult to set an appropriate reference power.

For this reason, in the fourth discriminating process, using the angle power which shows a tendency to increase as the detection distance varies in the case where a target is a stationary vehicle but shows a tendency to attenuate as the detection distance varies as described above, whether a target is a stationary vehicle or an upper object is determined by a method different from that in the third discriminating process.

Specifically, as described above, in the case where a target is an upper object, as the detection distance decreases, the upper object gradually disappears from the main transmission range of the transmission wave. Therefore, in the radar device 1, the angle power which is the reception power of the reflected-wave shows a tendency to gradually decrease.

Meanwhile, in the case where a target is a stationary vehicle, as the detection distance decreases, the reflected wave from the stationary vehicle more easily enters the front surface of the receiving units RX. Therefore, the angle power which is the reception power of the reflected-wave shows a tendency to gradually increase.

For this reason, while the vehicle is traveling toward a target, the radar device 1 derives the distance to the target at regular intervals. Further, the radar device 1 subsequently detects the angle powers of the reflected waves from the target received at the derived individual distances.

At this time, the radar device 1 sequentially calculates the moving averages of subsequences of a predetermined number of (for example, 3) angle powers consecutively detected, and uses the smoothened averages as the angle powers of the reflected waves from the target at the individual distances. Therefore, the influence of noise and multipath is removed from the angle power, and the radar device 1 may grasp the original variations in the angle power.

Subsequently, the radar device 1 acquires a distance R max at which the maximum angle power was detected, and a distance R min at which the minimum angle power was detected, from the distances subsequently detected until the distance of the target becomes a predetermined distance (for example, 60 m from the radar device 1).

For example, in the case where distances and angle powers as shown in FIG. 23A have been acquired with respect to a certain upper object, the radar device 1 acquires a distance corresponding to a black rhombus shown in FIG. 23A, as the distance R max, and acquires a distance corresponding to a white rhombus shown in FIG. 23A, as the distance R min.

Also, in the case where distances and angle powers as shown in FIG. 23A have been acquired with respect to a certain stationary vehicle, the radar device 1 acquires a distance corresponding to a black rhombus shown in FIG. 23B, as the distance R max, and acquires a distance corresponding to a white rhombus shown in FIG. 23B, as the distance R min.

As described above, in the radar device 1, in the case where a target is an upper object, the distance R max is longer than the distance R min; whereas in the case where a target is a stationary vehicle, the distance R min is longer than the distance R max.

In other words, in the case where a target is an upper object, the radar device 1 detects a minimum angle power when the target is at a relatively short distance, and detects a maximum angle power when the target is at a relatively long distance. In contrast, in the case where a target is a stationary vehicle, the radar device 1 detects a maximum angle power when the target is at a relatively short distance, and detects a minimum angle power when the target is at a relatively long distance.

In the examples shown in FIG. 23A and FIG. 23B, 100 m is set as a threshold for the distance from the radar device 1. In this case, with respect to a target, if the distance R min is shorter than the threshold and the distance R max is longer than the threshold, it is possible to determine that the target is an upper object, and if the distance R min is longer than the threshold and the distance R max is shorter than the threshold, it is possible to determine that the target is a stationary vehicle.

However, in the case where the same threshold is set for distances R max and distance R min, the radar device 1 may erroneously determine a stationary vehicle as being an upper object. For example, in the case where a target is a large-sized vehicle such as a truck or a bus, even when the target is at a relatively long distance from the radar device 1, the angle power may increase to such an extent that the distance R max becomes longer than the threshold. In this case, the radar device 1 erroneously determines the truck or the bus which is a stationary vehicle, as being an upper object.

For this reason, in the fourth discriminating process, a threshold R max Th for minimum angle powers, and a threshold R min Th for maximum angle powers are separately provided, and each upper object is discriminated on the basis of the result of comparison between the distance R max and the threshold R max Th and the result of comparison between the distance R min and the threshold R min Th.

Also, due to the tendency of angle power described above, the distances R max of upper objects tend to be longer than the distance R min (FIG. 23A). For this reason, in the fourth discriminating process, each upper object is discriminated on the basis of the result of comparison between a difference (R max−R min) obtained by subtracting the distance R min from the distance R max and a difference threshold R max−R min Th.

For example, in the fourth discriminating process, a threshold R max Th, a threshold R min Th, and a threshold R max-R min Th are set as shown in FIGS. 24A, 24B, and 24C, respectively. FIG. 24A, FIG. 24B, and FIG. 24C show verification experiment results obtained by detecting a plurality of targets.

In FIG. 24A, white rhombuses represent the distances R max and angle powers of upper objects, and black squares represent the distances R max and angle powers of small-sized stationary vehicles, and black triangles represent the distances R max and angle powers of large-sized stationary vehicles.

Also, in FIG. 24B, white rhombuses represent the distances R min and angle powers of the upper objects, and black squares represent the distances R min and angle powers of the small-sized stationary vehicles, and black triangles represent the distances R min and angle powers of the large-sized stationary vehicles. Also, in FIG. 24C, white rhombuses represent the distance differences (R max-R min) of the upper objects.

In the fourth discriminating process, as shown in FIG. 24A, in the case where the radar device 1 derives distances to each target in a detection range between 150 m and 60 m, a threshold R max Th shorter than a distance which is the middle point of the detection range (for example, about 100 m) is set.

As a result, in the fourth discriminating process, targets having distances R max shorter than the threshold R max Th are excluded from targets which may be upper objects. In this way, in the fourth discriminating process, it is possible to exclude targets having the high likelihood of being a stationary vehicle having a distance R max shorter than the distance which is the middle point of the detection range, from targets which may be upper objects.

Also, in the fourth discriminating process, as shown in FIG. 24B, in the case where the radar device 1 derives distances to each target in a detection range between 150 m and 60 m, a threshold R min Th longer than a distance which is the middle point of the detection range (for example, about 100 m) is set.

As a result, in the fourth discriminating process, targets having distances R min longer than the threshold R min Th are excluded from targets which may be upper objects. In this way, in the fourth discriminating process, it is possible to exclude targets having the high likelihood of being a stationary vehicle having a distance R min longer than the distance which is the middle point of the detection range, from targets which may be upper objects.

Also, in the fourth discriminating process, as shown in FIG. 24C, a positive value near 0 (for example, a value equal to or smaller than 10) is set as a threshold R max−R min Th. As a result, in the fourth discriminating process, targets having differences (R max−R min) smaller than the threshold are excluded from targets which may be upper objects. In this way, in the fourth discriminating process, it is possible to exclude targets having the high likelihood of being a stationary vehicle having a distance R max longer than a distance R min, from targets which may be upper objects.

The reason which a positive value near 0 is set as a threshold R max−R min Th is that, for example, if the reflected wave from a large-sized stationary vehicle is influenced by noise or multipath, although the corresponding vehicle is a stationary vehicle, the distance R max slightly exceeds the distance R min.

Even in such cases, in the fourth discriminating process, since a positive value near 0 is set as a threshold R max−R min Th, it is possible to exclude large-sized stationary vehicles detected on the basis of reflected waves influenced by noise or multipath, from targets which may be upper objects.

Therefore, in the fourth discriminating process, the targets which have not been excluded from targets which may be upper objects by the three determining processes based on the threshold R max Th, the threshold R min Th, and the threshold R max–R min Th are determined as being upper objects.

In other words, in the fourth discriminating process, targets having distances R max equal to or longer than the threshold R max Th, distance R min equal to or shorter than the threshold R min Th, and differences (R max–R min) equal to or larger than the threshold R max–R min Th are determined as being upper objects. Therefore, the fourth discriminating process may more accurately discriminate upper objects.

For example, in the fourth discriminating process, if only the determining process based on the threshold R max Th is performed, some large-sized stationary vehicles having distances R max close to 100 m (black triangles near 100 m shown in FIG. 24A) may not be excluded from targets which may be upper objects.

Even in such a case where the determining process based on the threshold R max Th couldn't exclude some large-sized stationary vehicles from targets which may be upper objects, in the fourth discriminating process, by performing the determining process based on the threshold R min Th thereafter, it is possible to reduce the number of large-sized stationary vehicles.

Further, in the fourth discriminating process, by performing the determining process based on the threshold R max–R min Th as shown in FIG. 24C, it is possible to finally exclude large-sized stationary vehicles from targets which may be upper objects. Therefore, it is possible to accurately discriminate between stationary vehicles and upper objects.

(Target Information Outputting Process According to Embodiment)

Figure 25A:
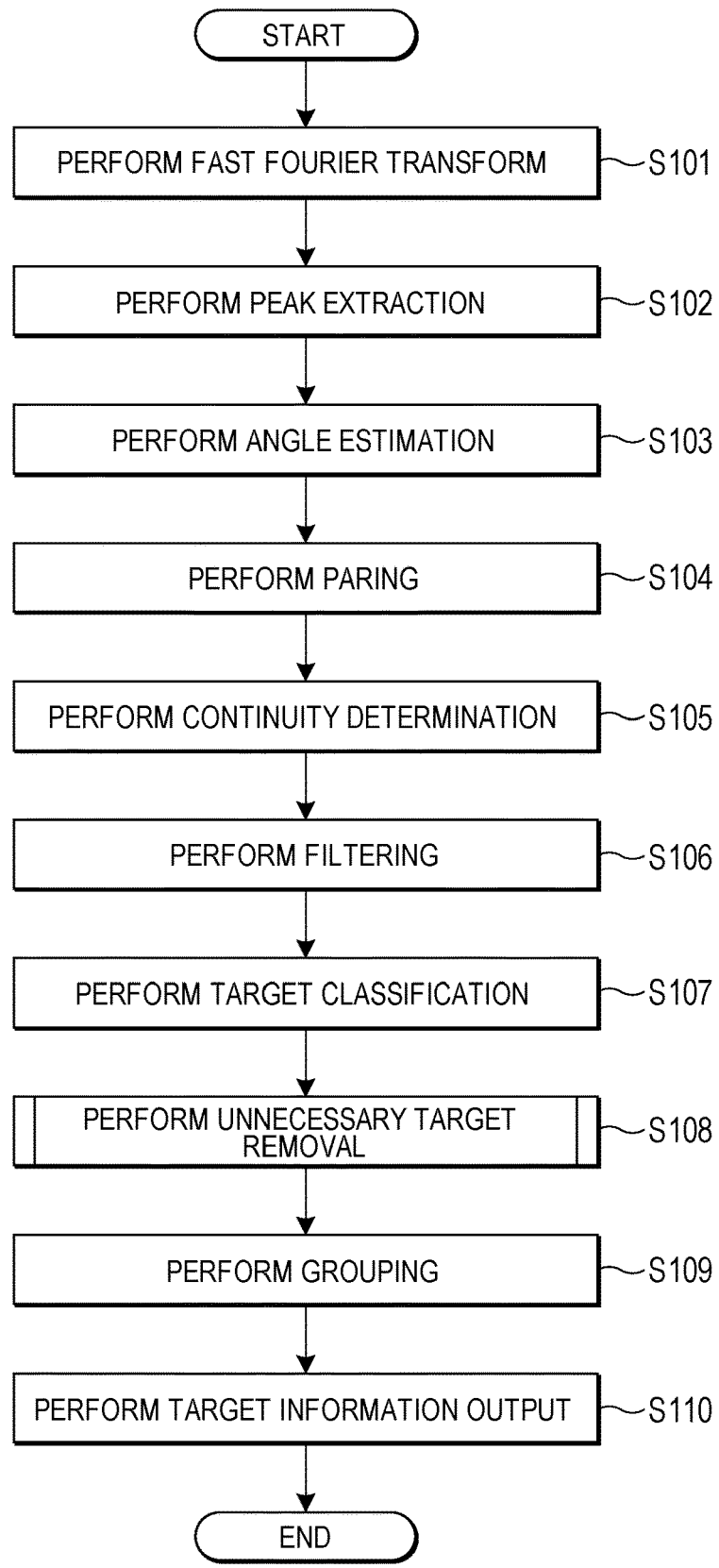
FIG. 25A is a flow chart illustrating a target information outputting process according to the embodiment.

FIG. 25A is a flow chart illustrating a target information outputting process according to the embodiment. The signal processing unit 6 performs a target information deriving process at regular intervals (for example, every 5 sec). The target information deriving process starts if beat signals obtained from reflected waves RW are input from the four receiving units RX to the signal processing unit 6.

First, the Fourier transform unit 62 of the signal processing unit 6 performs fast Fourier transform on the beat signals received from the plurality of individual receiving units 5 (STEP S101). Subsequently, from frequency spectra generated by the Fourier transform unit 62, the peak extracting unit 70 extracts peaks exceeding a predetermined signal level, with respect to each of an up section in which the frequency of the transmission signal increases and a down section in which the frequency decreases (STEP S102).

Next, with respect to each of the up section and the down section, the angle estimating unit 71 separates information items on a plurality of targets existing at the same bin, from each peak-frequency signal, by an azimuth calculating process, and estimates the angles of the plurality of targets (STEP S103).

Next, the pairing unit 72 associates peaks of each of a plurality of targets T existing in front of the vehicle A, with each other, thereby deriving pair data items on the targets T (STEP S104). Next, the continuity determining unit 73 performs determination on continuity, i.e. whether a target data item derived in the past process and a target data item derived in the last process are related to the same target (STEP S105).

Next, the filtering unit 74 smoothes the parameters (the longitudinal distances, the lateral distances, and the relative velocities) of each pair of target data items derived in the past process and the last process, in the time axis direction, thereby deriving a target data item (internal filter data item)

(STEP S106). Next, the target classifying unit 75 classifies the individual targets into preceding vehicles, stationary objects (including stationary vehicles), and oncoming vehicles on the basis of their relative velocities (STEP S107).

Next, the unnecessary-target removing unit 76 determines unnecessary targets such as upper objects, lower objects, rain, and so on, among the individual targets, and excludes the unnecessary targets from output targets (STEP S108). The process of STEP S108 includes a process of excluding upper objects from output targets, which will be described below with reference to FIG. 25B.

Next, the grouping unit 77 groups a plurality of target data items on the same target into one target data item (STEP S109). Next, the target information output unit 78 selects a predetermined number of target data items as output objects from the plurality of target data items derived or estimated by extrapolation, and outputs the selected target data items to the vehicle control device 2 (STEP S110). If STEP S110 finishes, the signal processing unit 6 finishes the target information deriving process.

(Unnecessary-Target Removal According to Embodiment)

Figure 25B:
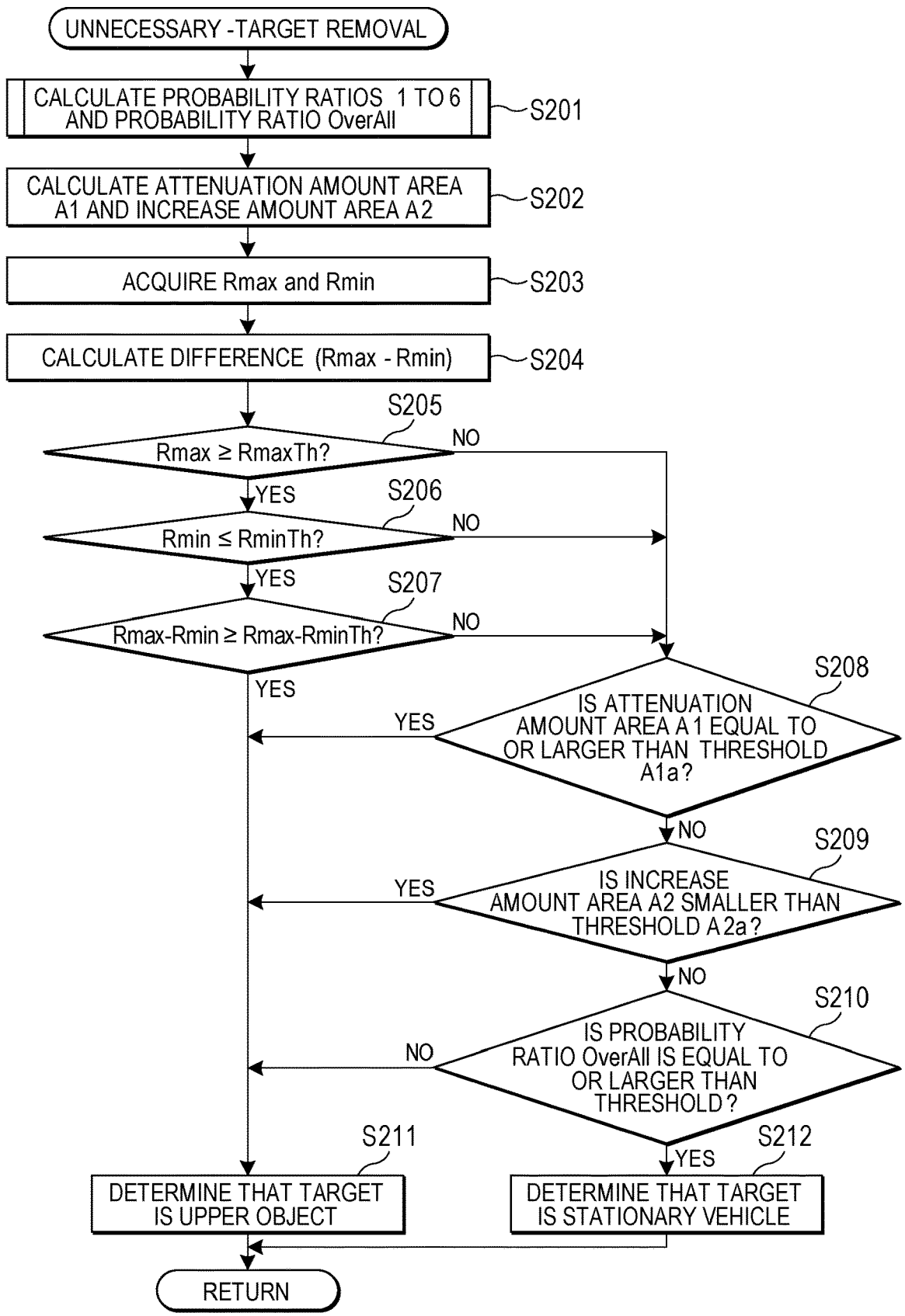
FIG. 25B is a flow chart illustrating a subroutine for unnecessary-target removal according to the embodiment.

FIG. 25B is a flow chart illustrating a subroutine for unnecessary-target removal according to a first embodiment. FIG. 25B shows the flow of the process of removing upper objects according to the embodiment, which is a part of the unnecessary-target removal process of STEP S108 shown in FIG. 25A.

Figure 25C:
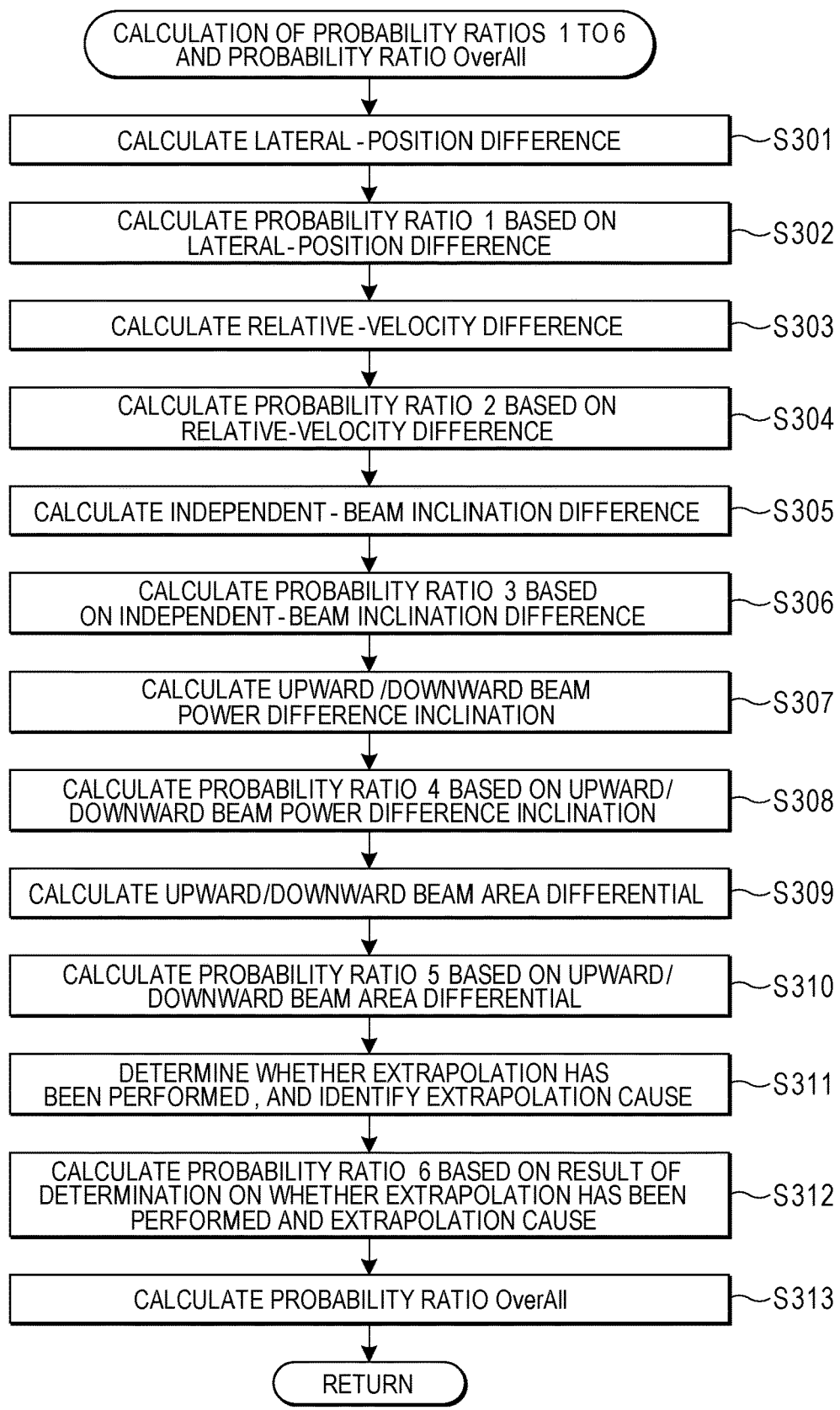
FIG. 25C is a flow chart illustrating a subroutine for calculating probability ratios 1 to 6 and a probability ratio OverAll according to the embodiment.

First, the unnecessary-target removing unit 76 calculates probability ratios 1 to 6 and probability ratios OverAll described above in the first discriminating process. Now, with reference to FIG. 25C, an example of the process of calculating probability ratios 1 to 6 and a probability ratio OverAll will be described. FIG. 25C is a flow chart illustrating a subroutine for calculating probability ratios 1 to 6 and a probability ratio OverAll according to the embodiment.

As shown in FIG. 25C, the unnecessary-target removing unit 76 first calculates the lateral-position difference of a target, on the basis of Expression 2 (STEP S301). Next, on the basis of the lateral-position difference calculated in STEP S301 and Expression 1, the unnecessary-target removing unit 76 calculates a probability ratio 1 based on the lateral-position difference (STEP S302).

Next, the unnecessary-target removing unit 76 calculates the relative-velocity difference of the target on the basis of Expression 3 (STEP S303). Next, on the basis of the relative-velocity difference calculated in STEP S303 and Expression 1, the unnecessary-target removing unit 76 calculates a probability ratio 2 based on the relative-velocity difference (STEP S304).

Next, the unnecessary-target removing unit 76 calculates the independent-beam inclination difference on the basis of Expression 4 (STEP S305). Next, on the basis of the independent-beam inclination difference derived in STEP S305 and Expression 1, the unnecessary-target removing unit 76 calculates a probability ratio 3 based on the independent-beam inclination difference (STEP S306).

Next, the unnecessary-target removing unit 76 calculates the upward/downward beam power difference inclination on the basis of Expression 5 (STEP S307). Next, on the basis of the upward/downward beam power difference inclination calculated in STEP S307 and Expression 1, the unnecessary-target removing unit 76 calculates a probability ratio 4 based on the upward/downward beam power difference inclination (STEP S308).

Next, the unnecessary-target removing unit 76 calculates the upward/downward beam area differential on the basis of Expression 6 (STEP S309). Next, on the basis of the upward/downward beam area differential calculated in STEP S309 and Expression 1, the unnecessary-target removing unit 76 calculates a probability ratio 5 based on the upward/downward beam area differential (STEP S310).

Next, the unnecessary-target removing unit 76 determines whether extrapolation has been performed, and if extrapolation has been performed, the unnecessary-target removing unit identifies the extrapolation cause (STEP S311). Next, on the basis of the result obtained in STEP S311 by determining whether extrapolation has been performed, the extrapolation cause identified in STEP S311, and Expression 1, the unnecessary-target removing unit 76 calculates a probability ratio 6 (STEP S312).

Next, the unnecessary-target removing unit 76 calculates a probability ratio OverAll on the basis of Expression 7 (STEP S313). Thereafter, the unnecessary-target removing unit 76 performs the process shown in FIG. 25B, from STEP S202.

Referring to FIG. 25B again, the unnecessary-target removal will be further described. After calculating the probability ratios 1 to 6 and the probability ratio OverAll, the unnecessary-target removing unit 76 calculates an attenuation amount area A1 and an increase amount area A2 (STEP S202).

Next, the unnecessary-target removing unit 76 acquires the distance R max at which the maximum angle power was detected, and the distance R min at which the minimum angle power was detected (STEP S203), and calculates the difference (R max−R min) by subtracting the distance R min from the distance R max (STEP S204).

Next, the unnecessary-target removing unit 76 determines whether the distance R max is equal to or longer than the threshold R max Th (STEP S205). In the case where it is determined that the distance R max is shorter than the threshold R max Th ("No" in STEP S205), the unnecessary-target removing unit 76 proceeds to STEP S208.

Meanwhile, in the case where it is determined that the distance R max is equal to or longer than the threshold R max Th ("Yes" in STEP S205), the unnecessary-target removing unit 76 determines whether the distance R min is equal to or shorter than the threshold R min Th (STEP S206). In the case where it is determined that the distance R min is longer than the threshold R min Th ("No" in STEP S206), the unnecessary-target removing unit 76 proceeds to STEP S208.

Meanwhile, in the case where the distance R min is equal to or shorter than the threshold R min Th ("Yes" in STEP S206), the unnecessary-target removing unit 76 determines whether the difference (R max−R min) is equal to or larger than the threshold R max−R min Th (STEP S207).

In the case where the difference (R max−R min) is smaller than the threshold R max−R min Th ("No" in STEP S207), the unnecessary-target removing unit 76 proceeds to STEP S208. Meanwhile, in the case where the difference (R max−R min) is equal to or larger than the threshold R max−R min Th ("Yes" in STEP S207), the unnecessary-target removing unit 76 determines that the target is an upper object (STEP S211).

Also, in STEP S208, the unnecessary-target removing unit 76 determines whether the attenuation amount area A1 calculated in STEP S202 is equal to or larger than the threshold A1a. In the case where it is detected that the attenuation amount area A1 is equal to or larger than the threshold A1a ("Yes" in STEP S208), the unnecessary-target removing unit 76 determines that the target is an upper object (STEP S211).

Meanwhile, in the case where the attenuation amount area A1 is smaller than the threshold A1a ("No" in STEP S208), the unnecessary-target removing unit 76 determines whether the increase amount area A2 is smaller than the threshold A2a (STEP S209). In the case where it is determined that the increase amount area A2 is smaller than the threshold A2a ("Yes" in STEP S209), the unnecessary-target removing unit 76 determines that the target is an upper object (STEP S211).

Meanwhile, in the case where the increase amount area A2 is not smaller than the threshold A2a ("No" in STEP S209), the unnecessary-target removing unit 76 determines whether the probability ratio OverAll is equal to or larger than the threshold (STEP S210).

In the case where it is determined that the probability ratio OverAll is equal to or larger than the threshold ("Yes" in STEP S210), the unnecessary-target removing unit 76 determines that the target is a stationary vehicle (STEP S212). Meanwhile, in the case where it is determined that the probability ratio OverAll is smaller than the threshold ("No" in STEP S210), the unnecessary-target removing unit 76 determines that the target is an upper object (STEP S211).

As described above, in the fourth discriminating process, when a target satisfies all of the three conditions, i.e. "[Distance R max]≥[Threshold R max Th]", "[Distance R min]≤[Threshold R min Th]", and "[Difference (R max−R min)]≥[Threshold R max−R min Th]", the target is determined as being an upper object. Therefore, in the fourth discriminating process, it is possible to accurately discriminate upper objects among the plurality of targets detected by the radar device 1.

Also, in the present embodiment, when a target does not satisfy any one of the conditions "[Distance R max]≥[Threshold R max Th]", "[Distance R min]≤[Threshold R min Th]", and "[Difference (R max−R min)]≥[Threshold R max−R min Th]", the first, second, and third discriminating processes are performed on the corresponding target.

Therefore, even though some upper objects are excluded from targets which may be upper objects by the fourth discriminating process, by the determining process of STEP S208 to STEP S210 described above, it is possible to accurately determine whether each target is an upper object or a stationary vehicle.

Herein, the case of determining each target satisfying all of the three conditions "[Distance R max]≥[Threshold R max Th]", "[Distance R min]≤[Threshold R min Th]", and "[Difference (R max−R min)]≥[Threshold R max−R min Th]" as being an upper object has been described; however, this is an example.

In the fourth discriminating process, each target satisfying at least one of the conditions "[Distance R max]≥[Threshold R max Th]", "[Distance R min]≤[Threshold R min Th]", and "[Difference (R max−R min)]≥[Threshold R max−R min Th]" as being an upper object may be determined as being an upper object. Even in this case, it is possible to discriminate upper objects to some degree of accuracy.

The peak extracting unit 70, the angle estimating unit 71, and the pairing unit 72 are examples of a deriving unit. Also, the unnecessary-target removing unit 76 is an example of an acquiring unit, a calculating unit, and a determining unit. Also, stationary vehicles are examples of a target which will collide with the vehicle (for example, a target for which control on the vehicle such as brake control is required), and upper objects are examples of a target which will not collide with the vehicle (for example, a target for which control on the vehicle such as brake control is not required).

Among the processes described in the embodiments, all or some of processes referred to as being automatically performed may also be manually performed. Otherwise, among the processes described in the embodiments, all or some of processes referred to as being manually performed may also be automatically performed by well-known methods.

Also, the integration and distribution of the components described in the embodiments may be appropriately changed depending on the processing load and the processing efficiency. Besides, the process procedures, the control procedures, the specific names, the variety of data, and the variety of information including the parameters can be appropriately changed except for the case where they are specifically mentioned.

Various advantages and modifications may be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A radar device comprising:
a microcomputer having a hardware processor configured to function as a deriving unit, an acquiring unit and a determining unit, wherein
the deriving unit is configured to derive a sequence of detection distances of a target existing in an area near a vehicle equipped with the radar device, based on reception signals acquired over time by transmitting a radar transmission wave to the area near the vehicle and receiving a reflected wave from the target;
the acquiring unit is configured to acquire, from among the sequence of detection distances derived by the deriving unit, a first distance at which a maximum value of reception powers was detected, and a second distance at which a minimum value of the reception powers was detected; and
the determining unit is configured to determine whether the target is an upper object which will not collide with the vehicle, based on the first and second distances acquired by the acquiring unit, wherein
the determining unit determines that the target is the upper object in a case that at least one of the following conditions is satisfied:
(i) the first distance at which the maximum value of the reception powers was detected is equal to or longer than a first threshold for the distance,
(ii) the second distance at which the minimum value of the reception powers was detected is equal to or shorter than a second threshold for the distance, and
(iii) a difference between the first distance at which the maximum value of the reception powers was detected and the second distance at which the minimum value of the reception powers was detected is equal to or larger than a third threshold for the difference.

2. A radar device comprising:
a microcomputer having a hardware processor configured to function as a deriving unit, an acquiring unit and a determining unit, wherein
the deriving unit is configured to derive a sequence of detection distances of a target existing in an area near a vehicle equipped with the radar device, based on reception signals acquired over time by transmitting a radar transmission wave to the area near the vehicle and receiving a reflected wave from the target;
the acquiring unit is configured to acquire, from among the sequence of detection distances derived by the deriving unit, a first distance at which a maximum value of reception powers was detected, and a second distance at which a minimum value of the reception powers was detected; and
the determining unit is configured to determine whether the target is an upper object which will not collide with the vehicle, based on the first and second distances acquired by the acquiring unit, wherein,
in a case (i) where the first distance at which the maximum value of the reception powers was detected is equal to or longer than a first threshold for the distance, (ii) where the second distance at which the minimum value of the reception powers was detected is equal to or shorter than a second threshold for the distance, and (iii) where a difference between the first distance at which the maximum value of the reception powers was detected and the second distance at which the minimum value of the reception powers was detected is equal to or larger than a third threshold for the difference, the determining unit determines that the target is the upper object.

3. The radar device according to claim 1, wherein the third threshold for the difference is set to a positive value near 0.

4. The radar device according to claim 1, wherein the acquiring unit acquires a distance at which a maximum value of moving averages of the reception powers was detected and a distance at which a minimum value of the moving averages was detected.

5. The radar device according to claim 1, wherein the hardware processor is further configured to function as
a calculating unit configured to set a reference value based on reception power of a reflected wave received at a target detection distance equal to or longer than a predetermined distance, and configured to calculate an increase amount of the reception power of the reflected wave by accumulating a product, the product being obtained by calculating a difference by subtracting the reference value from reception power of the reflected wave acquired in a current process and by multiplying the difference by a detection distance difference between a detection distance in a previous process and a detection distance in the current process, wherein,
in a case where the increase amount of the reception power of the reflected wave calculated by the calculating unit is smaller than a threshold for an increase amount, the determining unit determines that the target is the upper object.

6. The radar device according to claim 1, wherein
the deriving unit derives a plurality of parameters with respect to the target based on the reception signals at regular intervals, and
the determining unit determines whether the target is the upper object based on the plurality of parameters and the detection distances derived by the deriving unit and based on likelihood ratios obtained by calculations based on likelihood models representing known correlations between a likelihood of being a target which exists in a traveling direction of the vehicle and will collide with the vehicle if the vehicle runs in the traveling direction and a likelihood of being a target which exists in the traveling direction of the vehicle but will not collide with the vehicle even though the vehicle runs in the traveling direction for each of the detection distances.

7. A radar device control method which a control device of a radar device performs, the method comprising:
   deriving a sequence of detection distances of a target existing in an area near a vehicle equipped with the radar device, based on a reception signal acquired over time by transmitting a radar transmission wave to the area near the vehicle and receiving a reflected wave from the target;
   acquiring, from among the sequence of detection distances that have been derived, a first distance at which a maximum value of reception powers was detected, and a second distance at which a minimum value of the reception powers was detected; and
   determining whether the target is an upper object which will not collide with the vehicle, based on the first and second distances that have been acquired, wherein
   the determining determines that the target is the upper object in a case that at least one of the following conditions is satisfied:
   (i) the first distance at which the maximum value of the reception powers was detected is equal to or longer than a first threshold for the distance,
   (ii) the second distance at which the minimum value of the reception powers was detected is equal to or shorter than a second threshold for the distance, and
   (iii) a difference between the first distance at which the maximum value of the reception powers was detected and the second distance at which the minimum value of the reception powers was detected is equal to or larger than a third threshold for the difference.

8. A radar device control method which a control device of a radar device performs, the method comprising:
   deriving a sequence of detection distances of a target existing in an area near a vehicle equipped with the radar device, based on a reception signal acquired over time by transmitting a radar transmission wave to the area near the vehicle and receiving a reflected wave from the target;
   acquiring, from among the sequence of detection distances that have been derived, a first distance at which a maximum value of reception powers was detected, and a second distance at which a minimum value of the reception powers was detected; and
   determining whether the target is an upper object which will not collide with the vehicle, based on the first and second distances that have been acquired, wherein,
   in a case (i) where the first distance at which the maximum value of the reception powers was detected is equal to or longer than a first threshold for the distance, (ii) where the second distance at which the minimum value of the reception powers was detected is equal to or shorter than a second threshold for the distance, and (iii) where a difference between the first distance at which the maximum value of the reception powers was detected and the second distance at which the minimum value of the reception powers was detected is equal to or larger than a third threshold for the difference, the determining determines that the target is the upper object.

* * * * *